United States Patent [19]

Lehman et al.

[11] Patent Number: 4,796,179
[45] Date of Patent: Jan. 3, 1989

[54] MULTIRATE REAL TIME CONTROL SYSTEM CODE GENERATOR

[75] Inventors: Larry L. Lehman, Palo Alto; Sunil C. Shah, Mountain View; David B. Varvell, Campbell, all of Calif.

[73] Assignee: Integrated Systems, Inc., Palo Alto, Calif.

[21] Appl. No.: 899,031

[22] Filed: Aug. 20, 1986

[51] Int. Cl.[4] ................................................ G06F 1/00
[52] U.S. Cl. ...................................................... 364/300
[58] Field of Search ... 364/200 MS File, 900 MS File, 364/300

[56] References Cited

U.S. PATENT DOCUMENTS 4,130,883 12/1978 Hazelton .............................. 364/900

OTHER PUBLICATIONS

Liu et al., "Scheduling Algorithms for Multiprogramming in a Hard-Real-Time Environment," *Journal of the ACM*, vol. 20, No. 1, Jan-1973, pp. 46-61.

*Primary Examiner*—Raulfe B. Zache
*Attorney, Agent, or Firm*—Flehr, Hohbach, Test, Albritton & Herbert

[57] ABSTRACT

An automatic computer software code generator for multirate real time control systems uses a functional library to define a multiplicity of functional blocks for building a functional description of a control system. For each functional block there is a software template for generating a set of software statements for performing one or more computations each time the software associated with that functional block is executed. A functional description of the control system software to be generated is provided in the form of a catalog database, and the computational relationships to be implemented by the software generated by the invention are defined by specified combinations of the functional blocks in the functional library. A linking software module organizes the catalog database into a plurality of separate subsystems, each subsystem including all the specified functional blocks with a given repetition rate and skew. Finally, a code generation software module generates software for use in the specified control system. The software routines generated generally include: a subsystem software routine for each subsystem, a scheduler program for initiating the execution of the subsystem software routines in accordance with the repetition rate and skew specified for each corresponding subsystem; and a software interface for holding input, output and temporary data values.

8 Claims, 21 Drawing Sheets

FIG.-2 FUNCTIONAL DIAGRAM

SOFTWARE BUS

MEMORY MAP

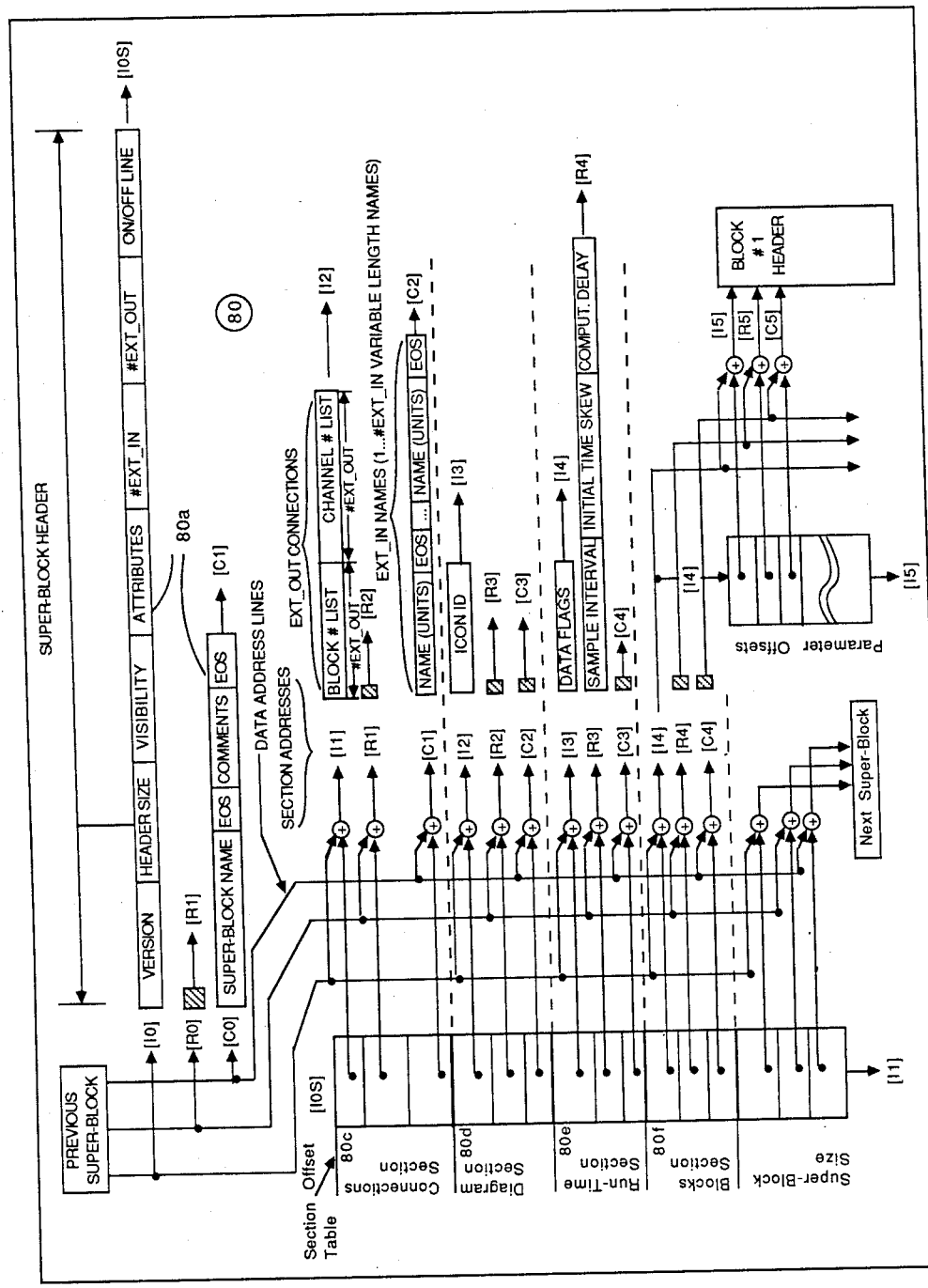
Fig. -8 Super-Block Data Structure

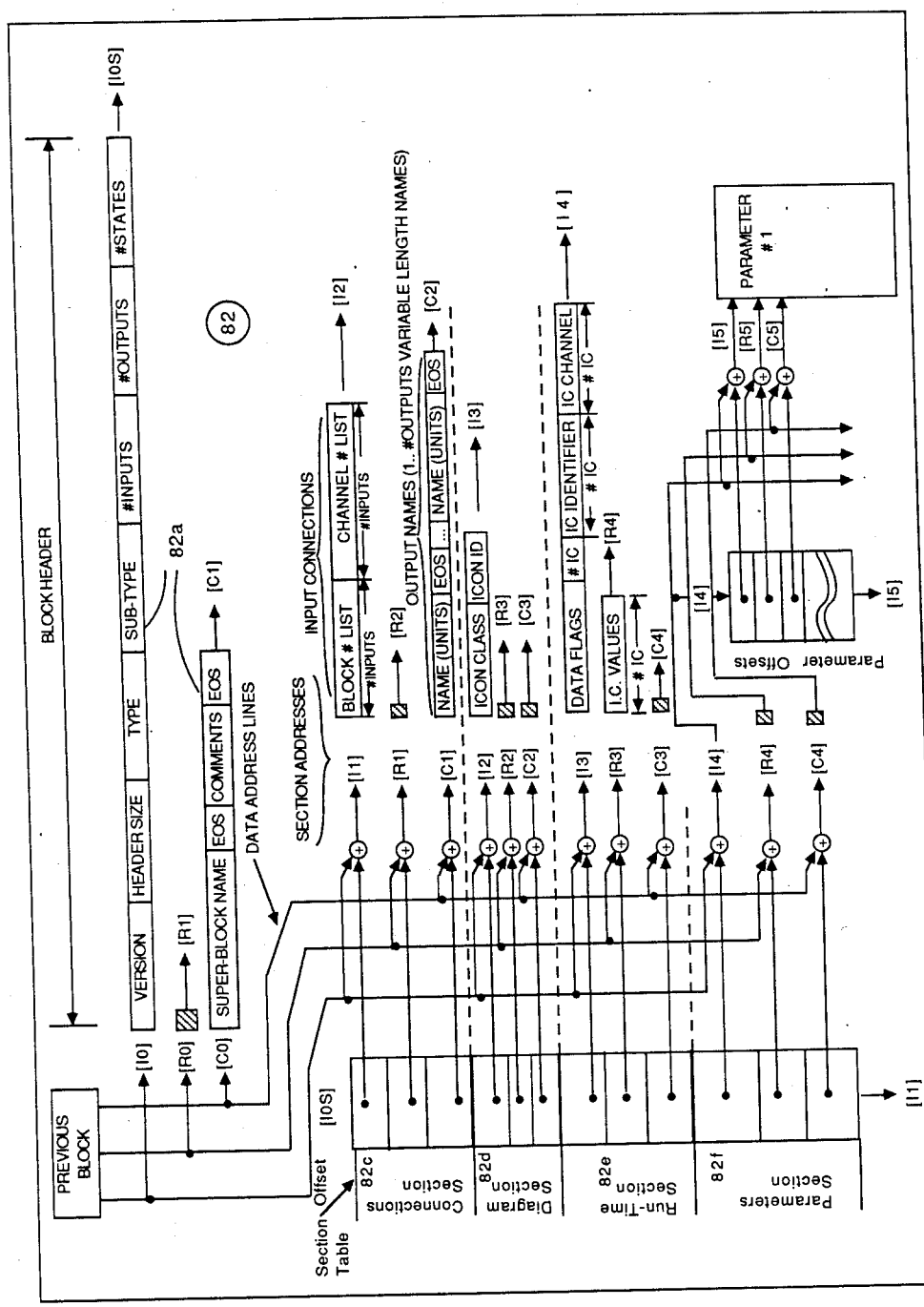
Fig.-9 Block Data Structure

SUBSYSTEM I / O MODEL

MEMORY MAP FOR LINK TIME
DATA STRUCTURES

LINK DATA STRUCTURE

UNIQUE RATE INFORMATION TABLE

OUTPUT LINK RESOLUTION

DATA STRUCTURE RECORD FORMATS

INPUT LINK RESOLUTION

SORTING BLOCKS FOR BEST COMPUTATIONAL ORDER

RELINK PROCEDURE

COMPONENTS OF GENERATED CODE

SCHEDULER FLOW CHART

CODE GENERATOR COMPONENTS

MULTIPROCESSOR CONTROLLER

MULTIRATE REAL TIME CONTROL SYSTEM CODE GENERATOR

The present invention relates generally to systems for controlling real time processes, and particularly to computer systems which generate computer programs for controlling real time processes.

BACKGROUND OF THE INVENTION

The use of computer software to automatically generate computer programs for performing a prescribed process is often called automatic code generation. Depending on the system, the prescribed process can be described by one of a number of "functional languages" rather than a conventional computer language. For instance, in the preferred embodiment of the present invention, control processes are specified by functional diagrams which use logic and circuit-like functional elements to describe the relationship between the system's input signals and its output signals.

Automatic code generators are typically perceived as having two main advantages: (1) they eliminate the need for the user to know the computer lauguage in which the code is written; and (2) they generate reliable code, free from the mistakes typically made by inexperienced, and sometimes even veteran, computer programmers.

The advent of automatic code generation has been spurred primarily by the proliferation of (1) unskilled computer users, and (2) complex real time control problems.

The present invention is specifically directed at generating computer software for complex real time control systems, and particularly multirate systems. A multirate system is a system which needs to simultaneously perform at least two (and typically a multiplicity of) tasks at different rates.

A major difficulty in designing software for a multirate real time system is producing reliable code. In particular, the generated software must react to input signals and generate output control signals in an entirely predictable fashion. Given the potential complexity of multirate systems, the solution to this problem has not been immediate.

The present invention provides a system and method for generating software which will reliably control any multirate real time system. The only constraint is that the computer(s) used to run the generated code must have enough throughput capability to perform the necessary computations. But even here, the code generated by the preferred embodiment automatically detects if the computer(s) running the generated code are not sufficiently fast for the application.

An important feature of the present invention is the division of the software into separate subsystems for each rate in the system, and the provision of a software interface which controls the passing of information between subsystems. In other words, all the software which must run at each rate is collected into a separate unit called a subsystem. The software interface deterministically specifies when the input data for each subsystem is passed from its source(s) to the subsystem.

In particular, the software interface uses a "zero order hold" which insures that the outputs from each subsystem are passed to other subsystems only after all the computations for a particular computation cycle are complete. In other words, the zero order hold ensures that all the outputs from a subsystem are internally consistent and not in a state of flux.

Further, in the preferred embodiment, the zero order hold contains two buffers called BUS0 and BUS1. During each computation cycle one buffer is used to store new output values and the other is used to hold the outputs computed during the previous computation cycle. Then, at the beginning of each new computation cycle the role of these two buffers is switched. Thus the zero order hold makes the outputs of each subsystem piecewise constant—all of the subsystem's output change simultaneously and change only at predefined times.

A second essential aspect of the software interface is a software sample and hold for the inputs to each subsystem. At the beginning of each subsystem's computation cycle all the inputs to that subsystem from other subsystems are "sampled and held", i.e., copied into a buffer. This ensures that these input values do not fluctuate during the time it takes to perform the subsystem's calculations.

The software interface is important in a multirate control system because at any given time more than one subsystem's calculations may be in various stages of completion. The software interface ensures that "half backed" output signals from one subsystem cannot be used as inputs by another because each subsystem's outputs become available for use by other subsystems only after the subsystem's computations are complete. Also, these outputs are updated (i.e., the roles of BUS0 and BUS1 are switched) in accordance with a predefined schedule. Failure to control the flow of signals in this way in a multirate control system can cause unpredictable results—which is clearly undesirable.

An important aspect of division of the generated code is the automatic generation of a scheduler program which controls when each subsystem's code is run and the priority given to each subsystem's computations. In "stand alone" systems, the scheduler can be used as the system's operating system.

Another feature of the present invention is that the code generated by the system is designed to be useable on both single processor and multiprocessor control systems. The software interfaces between subsystems provide a "natural" dividing line between tasks that can be performed on separate processors.

Still another feature of the present invention is that the code portions and equations within each subsystem are automatically ordered to promote reliable computation and proper propagation of data through the subsystem. This is done by classifying the subsystem's elements and then using a predefined algorithm which sorts the subsystem's elements so that, to the extent possible, the code portion for each element is executed only after its input data from other portions of the same subsystem is calculated.

It is therefore a primary object of the present invention to provide a system and method for automatically generating computer software to control multirate real time systems.

SUMMARY OF THE INVENTION

In summary, the present invention is an automatic computer software code generator for multirate real time control systems. The purpose of the code generator is to generate a set of software programs for a specified multirate control system.

The code generator of the present invention uses a functional library to define a multiplicity of functional blocks for building a functional description of a control system. For each functional block there is a software template for generating a set of software statements for performing one or more logical and/or mathematical computations each time the software associated with that functional block is executed.

The user provides the system with a functional description of the control system software to be generated. This functional description takes both a graphical block diagram form viewed by the user, and a computer database form called a catalog. The catalog represents the computational relationships between the external input signals and the required external output signals of a specified multirate real time control system.

The computational relationships to be implemented by the software generated by the invention are defined by specified combinations of functional blocks from the functional library, with specified parametric values and specified computational repetition rates and computational skew periods.

A linking software module organizes the catalog database into a plurality of separate subsystems, each subsystem including all the specified functional blocks with a given repetition rate and skew. Thus there is a separate subsystem being for each unique repetition rate and skew.

A code generation software module generates software for use in the specified control system. The software routines generated include:
- a subsystem software routine for each subsystem for performing the computations specified in the catalog database for that subsystem;
- a scheduler program for initiating the execution of the subsystem software routines in accordance with the repetition rate and skew specified for each corresponding subsystem; and
- a software interface for holding the input, output and temporary data values for the specified control system. This software interface includes:
- a zero order hold for each subsystem, for holding the output values generated by the subsystem during each computational cycle of the subsystem for use as input signals to other ones of the subsystem during the following computational cycle of the subsystem; and
- a sample and hold buffer for each subsystem, and sampling software for copying into the sample and hold buffer the specified input data signals to the subsystem from other ones of said subsystems and the specified external input data signals used by the subsystem.

BRIEF DESCRIPTION OF THE DRAWINGS

Additional objects and features of the invention will be more readily apparent from the following detailed description and appended claims when taken in conjunction with the drawings, in which:

FIG. 8 depicts the catalog data structure for superblocks.

FIG. 9 depicts the catalog data structure for functional blocks.

DESCRIPTION OF THE PREFERRED EMBODIMENT

System Overview

Figure 1:
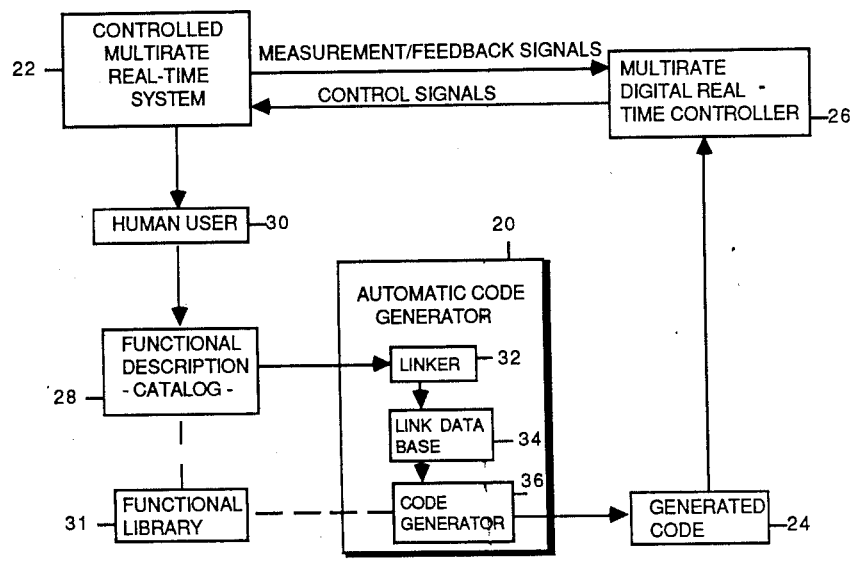
FIG. 1 is a block diagram showing the relationship between the present invention and a multirate real time system.

FIG. 1 depicts the relationship between the automatic code generator 20 of the present invention and a real time multirate system 22. The goal of the code generator 20 is to generate computer software 24 which will enable a multirate, digital, real time control system 26 to control a system 22 in accordance with a specification (called a functional description) 28 generated by the user 30 of the code generator 20.

The functional description 28 is a database for representing the computational relationships between the control system's input and output signals. These computational relationships are defined in terms of functional blocks from a library 31 of such functional blocks. Each functional block in the library 31 defines one or more logical and/or algebraic computations, and the specified combination of functional blocks defines the set of computations which are to be performed by the control system.

In the preferred embodiment, the automatic code generator 20 is a computer with a terminal and software for converting the functional description 28 into code 24 for the control system 26. The major elements of the code generator's software are a linker 32 which generates a second database, called a linked database 34, and a code generator routine 36 which uses both the linked database 34 and the functional description database 28 to generate the code 24 for the control system. The linked database 34 contains information regarding all the connections between the different functional blocks in the control system software, and how these are organized into "subsystems", as described below.

The user builds up a functional description using an authoring program that generates both a functional description database 28 and a corresponding block diagram that the user can view on his computer terminal.

BLOCK DIAGRAM DESCRIPTION

Figure 2:
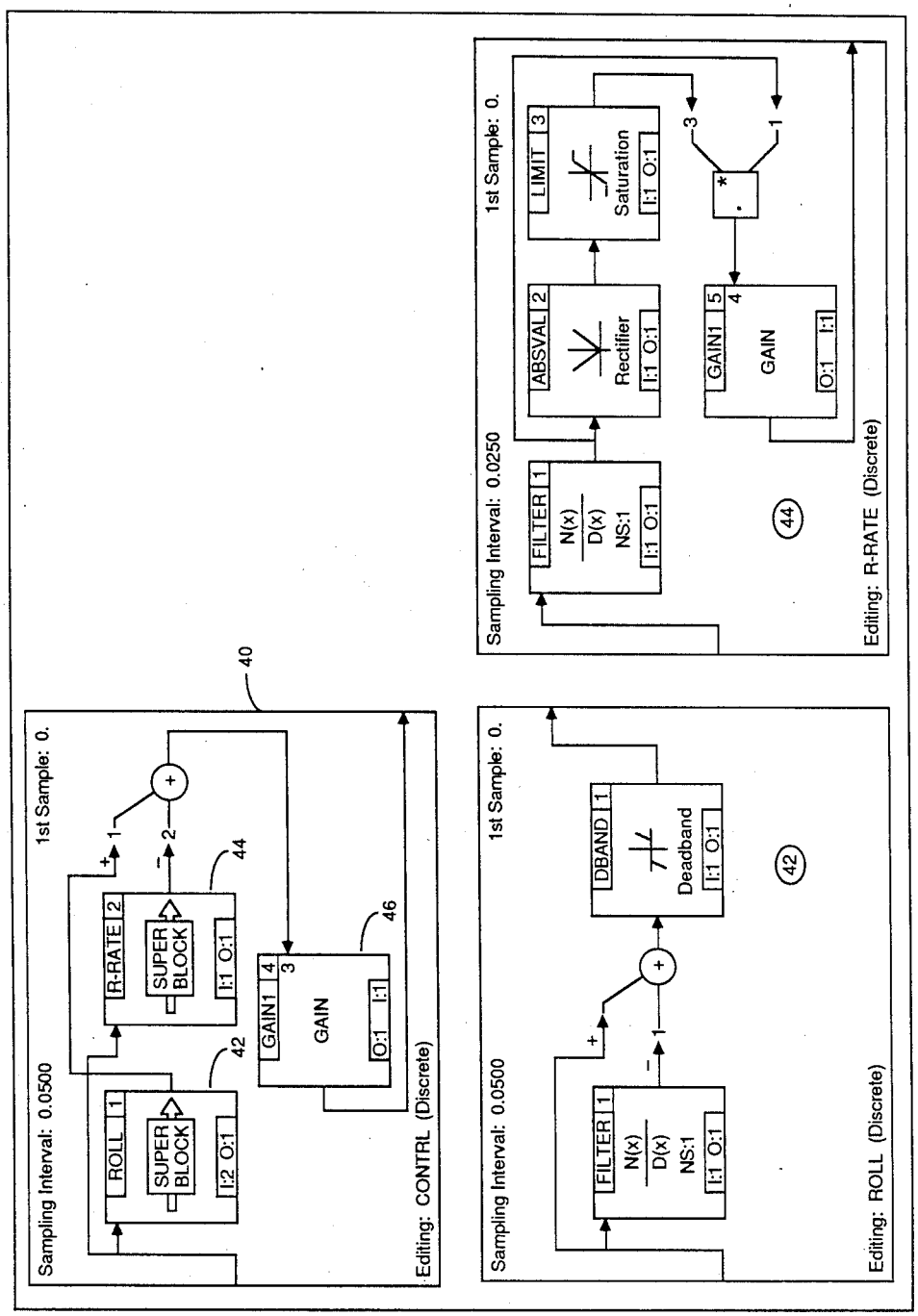
FIG. 2 depicts an example of a functional description for a multirate real time control system.

For example, FIG. 2 depicts a functional block description of the control software for a missile roll control system. The depicted graphic representation has a corresponding data base representation which will be described in detail below. The graphic representation corresponds closely to the database version and is used herein to show the usefulness of this method of specifying computational relationships for a control system.

The diagram in FIG. 2 includes three large blocks 40, 42 and 44, called superblocks. Superblocks are used to organize complicated computations into manageable portions.

Each superblock 40-44 contains one or more descriptive blocks, which can be either library (hereinafter called "functional") blocks) blocks such as the GAIN block 46, or other superblocks such as the ROLL superblock 42 inside the CONTRL superblock 40. All the superblocks except for the main superblock (CONTRL in this example) are used to specify sets of functional blocks for use elsewhere in the functional description.

For each superblock there is specified a timing or sampling interval and a skew (noted as "1st Sample" in FIG. 2). The timing interval specifies both the rate at which the inputs and outputs to the superblock are updated and the rate at which the computations for the functional blocks in the superblock are repeated. The skew specifies the delay before the first sample and first computation cycle for the superblock.

As will be described in more detail below, the functional blocks in the library 31 each define a software template for generating a set of software statements. These software statements perform the functional block's computations when the resulting software is executed.

BASIC CONCEPTS

The following is a short glossary of terms used to describe the present invention.

Control Software. Computer programs used to control, optimize or stabilize the operation of a physical device or process (or a collection of devices and processes) are called control software.

Discrete Time Software. Computer programs which must perform computations or generate output signals only at specific discrete instants of time are called discrete time software.

Digital Controller. A digital controller is a computer or processor that uses discrete time software to control another device or a process.

Multirate Real Time System. A "real time" system is any system which requires control signals to be provided according to a predefined time schedule. Some systems, such as data processing computers, do not need control signals on a timely basis; however, most industrial and commercial systems are "real time" systems. Before the 1970s, most such systems were controlled with mechanical or hard wired electrical or electronic sequencers.

"Real time" computer control systems are computer systems which are specially programmed to provide control signals on a timely basis.

A "multirate" system is one which requires periodic computations at a plurality of different rates. In other words, some computations must be performed at one frequency while others must be performed at other frequencies. There are two general types or criteria which govern the frequency of each computation: (1) the frequency with which new input signals must be processed; and (2) the frequency with which new control signals must be generated.

As defined herein, multirate systems can include both periodic and nonperiodic (herein called "triggered") computations. However, a key aspect of the invention is properly handling the flow of data (or signals) between computations being performed at different rates.

Thus, in the present invention, every computation to be performed by the control system is given either (1) a specified computation repetition rate, or (2) a trigger condition which initiates performance of the computation. Thus the present invention pertains only to "discrete time" systems. Control problems which require continuous computation—i.e., actual computational integration of input signals—are not covered. In virtually all applications, however, the control system's hardware can be configured to allow the use of a discrete time software control method.

Sample or Computational Rate. The rate at which a computation or set of computations must be repeated is called its sample or computational rate. Each time that the set of computations is executed, the input data for the computations is sampled before the computations are begun; hence the repetition rate is often referred to as the sample rate.

The computational rate does not indicate how long a computation will take to perform, it only indicates how often it must be performed. Clearly, however, it is essential that it take less time (at least on average) to perform the computation than the time interval allowed for each computational cycle.

Time Skew. The terms "skew", "computational skew", and "rate skew" are all used to refer to a delay period. When a first computation is specified as being skewed from a second by X amount, it means that the first computation is to be performed X amount of time after the second, but at the same repetition rate as the second computation. For example, a skew can be used to ensure that one computation is finished before a second computation is begun. It can also be used to provide for a case where two computations need to be performed in parallel, but the input to one of the two computations is (or may be) delayed compared to the input to the other.

Subsystem. In the present invention, each set of computations to be performed at a different rate or skew, or in response to a different trigger condition, is treated as a separate "subsystem". In other words, all of the computations for each different "subsystem synchronization condition" (i.e., combination of rate and skew, or trigger condition) are grouped together. Each such grouping, called a subsystem, is treated as a separate entity, as will be described in more detail below.

Subsystem Synchronization Condition. The specification of when a superblock or subsystem's computations are to be performed is called its subsystem synchronization condition, regardless whether this is a combination of rate and skew, or a trigger condition.

Task. A set of computations, such as the computations for one subsystem, which is treated as a separate unit and which can be executed concurrently with other sets of computations is called a "task".

Trigger Task. In the present invention, tasks called "trigger tasks" are performed when a predefined trigger condition is satisfied, rather than being performed periodically. A separated subsystem is defined by the present invention for each such trigger condition.

These subsystems whose computations occur at irregular time intervals are sometimes called triggered subsystems. Subsystems that are computed at regular time intervals corresponding to a specified sample rate are sometimes called periodic subsystems.

Hierarchical Functional Description. In order for an automatic code generator to be useful, the user must be able to specify the control system's functions (i.e., the computations to be performed by the generated code) in a simple manner that avoids the complexities of computer programming. The present invention uses a library 31 of fundamental building blocks, which can be combined in a hierarchical fashion, to specify the relationship between the control system's input signals and its output signals.

Functional Block. Simply stated, the functional descriptions used in the present invention look like simplified, block level, circuit diagrams. The user links together functional "blocks", which perform specified computational functions, to specify the control process.

The functional description used in the present invention is represented in two ways: a graphical representation seen by the user (such as the example shown in FIG. 2), and a corresponding data base. The user combines graphical elements from a functional library 31 to specify control, data acquisition and data analysis algorithms. Each functional element is called a "block". Many blocks have parameters which can be specified by the user. For instance, when using a gain block the user must specify the gain. Polynomial algebraic blocks require the specification of coefficients.

Superblock. Aggregates of blocks are hereinafter called "superblocks". Superblocks are important for several reasons. First, they provide a mechanism for breaking down a complex control system into manageable pieces. Since one superblock can contain other superblocks, a hierarchical functional description can be used. See FIG. 7a. Second, each superblock is given a computation rate and skew or trigger condition. Thus superblocks are the basic computational unit for which a rate and skew or trigger condition are specified.

The graphical representation of such block diagrams is well known in the prior art and is not, as such, part of the present invention. On the other hand, the data structures corresponding to the graphical representation are a part of the present invention and will therefore be described in detail below.

Catalog. The set of data structures used to represent the functional description of a control system is called a catalog. The catalog data structure is called a catalog because it looks like a catalog of data with an entry for each superblock and each functional block in a control system's functional description.

Software Interface. Much like separate circuit subsystems, the software subsystems in the present invention are separated from one another by an interface which uses protocols that guarantee the timely transfer of information between subsystems. In the present invention the interface between subsystems is a "software interface"; that is, the interface comprises a set of software instructions and corresponding data structures. In the event that the code generated by the present invention is used on a multiprocessor control system, the software interface provided by the invention will act as a buffer to the physical interfaces between the system's processors.

Software Bus. Normally, a bus is a physical set of wires or low impedance electrical connections which couple a number of devices to one another. In the present invention a software bus is used to interconnect the control software's subsystems. In essence, the software bus is a buffer or data structure through which all data transfers are passed. For instance, if Subsystem 02 needs certain predefined data from Subsystem 01, the data is copied from a portion of the software bus used to hold Subsystem 01's outputs to a portion of the bus used as an input buffer (called a hold area) by Subsystem 02.

Figure 3:
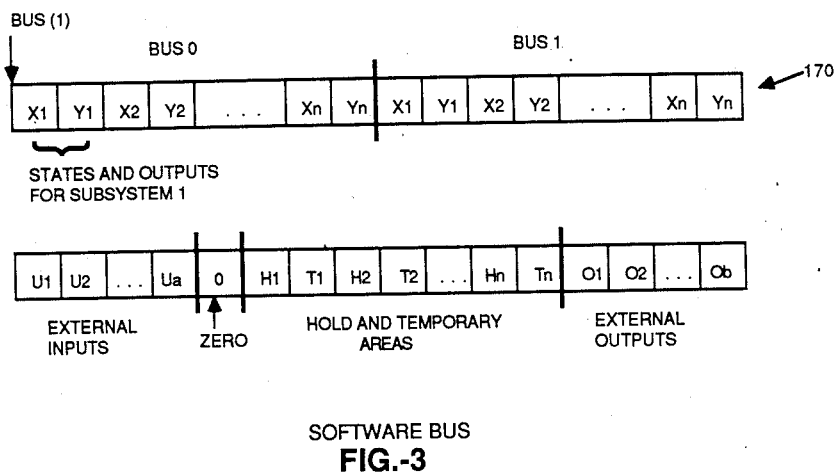
FIG. 3 depicts the software bus data structure used in the software interface of the preferred embodiment.

A map of the software bus used in the preferred embodiment is shown in FIG. 3. As shown, a portion of the bus is allocated for "external inputs", i.e., input signals to the control system, another portion is allocated to "external outputs". The main portion of the bus is divided into separate areas for each subsystem, with two equal size areas, called BUS 0 and BUS 1, for holding the outputs (Y) and states (X) of each subsystem. Another portion of the bus is used as a hold buffer for each of the subsystems. The details of this Figure will be explained as the various features are discussed below.

Zero Order Hold. A zero order hold is a device (i.e., a software technique) used to insure that the outputs from each subsystem are passed to other subsystems only after all the computations for a particular computation cycle are complete. In other words, the zero order hold ensures that all the outputs from a subsystem are internally consistent and not in a state of flux. Thus the zero order hold makes the outputs of each subsystem piecewise constant—all of the subsystem's outputs change simultaneously and change only at predefined times.

Stated technically, zero order holding is a computational process that holds past computed output values as constants in memory until the computation for the next set of these same output values is completed.

In the present invention the zero order hold is implemented by providing two equal size bus portions (called BUS0 and BUS1) for storing the output signals and internal states of each subsystem. A flag, called BusFlag (subsystem #) keeps track of which bus portion is currently being used by each subsystem. For instance, if BusFlag(2)=0, then other subsystems which need to use the outputs generated by subsystem 2 will obtain those outputs from the BUS0 portion of the zero order hold; at the same time, new outputs generated by subsystem 2 will be stored in BUS1. The bus flag for a subsystem is toggled just before the subsystem begins a computation cycle, thereby ensuring that new outputs are always provided to other subsystems in accordance with a fixed schedule.

Software Sample And Hold. At the beginning of each subsystem's computation cycle all the inputs to that subsystem from other subsystems are "sampled and held", i.e., copied into a buffer. This ensures that these input values do not fluctuate during the time it takes to perform the subsystem's calculations. In the present invention, the sample and hold buffer for each subsystem is simply a designated portion of the system's software bus.

Code Generation. Code Generation is the creation of either a high level language (such as Ada, PASCAL or FORTRAN) or assembler source code by tracing through a functional description for a control system and writing the computational expressions, in the selected language, specified by the functional description. Ada is a trademark owned by the United States Government, Ada Joint Program Office.

Source Code. Source code is computer software written in any human readable computer language including high level computer languages and assembler languages used by assembly language programmers. In other words, source code is computer code which can be readily modified by a computer programmer and which needs to be compiled or processed into a machine readable form before it can be executed.

Source Code Templated. Source code templates are sections of source code, or instructions for generating source code, which implement specified computations. In the present invention, each functional block has a corresponding source code template which is used to generate the source code. Each template includes invariant code which defines a computation, and variables for tailoring the source code to use any specified parameters and also to couple the source code to the memory locations for its inputs and outputs.

Preemptive Priority-Based Periodic Scheduling. In the present invention, the code segments associated with each subsystem (i.e., each specified computational rate) must be executed on a periodic basis or in response to a trigger condition. A software routine generated by the present invention, called the Scheduler, controls not only when the execution of each code segment is initiated, but also which code segments should be executed first when two or more code segments are running concurrently.

Periodic scheduling is conducted according to the time line that specifies when each code segment is to sample its inputs and begin execution. By assigning the subsystems with the fastest repetition rates the highest priority, the present invention allows the code segments with the highest sample rate to preempt the execution of slower subsystems. Lower priority code segments resume execution when no higher priority computations are pending.

Application Specific Operating System. The software that controls the preemptive priority-based periodic scheduling of the present invention is sometimes referred to herein as an application specific operating system because it performs the functions characteristic of general purpose multitasking operating systems. The present invention can generate a scheduler routine which will actually replace the control system's operating system if that operating system does not include a preemptive priority-based multitasking capability.

Shortest Remaining Time First Scheduling Discipline. Tasks which need to be completed the soonest (i.e., executed the most rapidly) are assigned the highest execution priority. High priority tasks preempt lower priority tasks running on the same processor. This scheduling methodology, sometimes called a "shortest-remaining-time-first scheduling discipline", maximized utilization of the control system's computing power and helps to insure that all of the control system's tasks are completed on time.

I/O Drivers. Software routines that control the acquisition of external input signals and transmission of output signals are called input/output or I/O drivers. The term "driver" comes from the phrase that "routine x drives (i.e., controls) device y".

Pseudocode. For some of the major processes described herein, a "pseudocode" version of the process is provided. "Pseudocode" is, essentially, a computer language using universal computer language conventions. While the pseudocode employed here has been invented solely for the purposes of this description, it is designed to be easily understandable to any computer programmer skilled in the art.

PROCESS OVERVIEW

Figure 4:
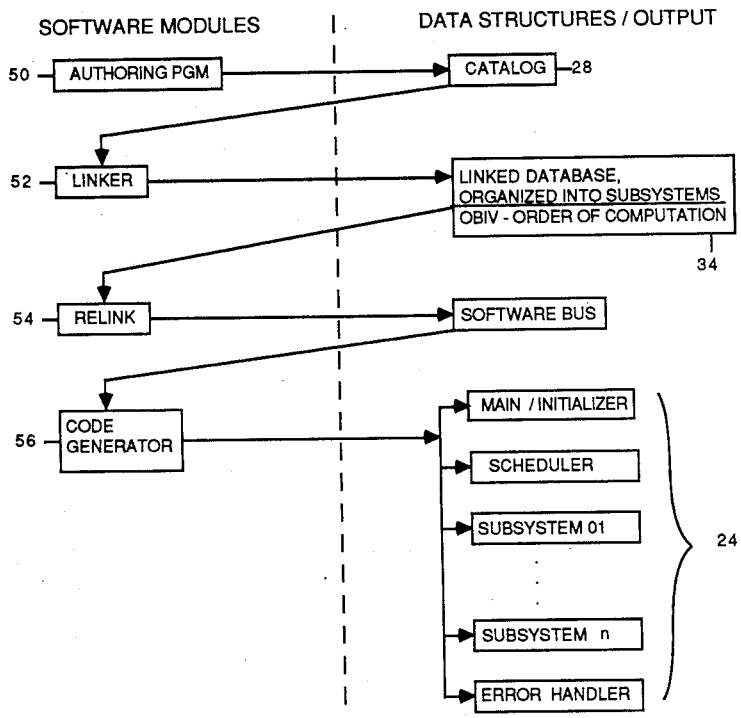
FIG. 4 is a block diagram of the main software components of the code generator of the present invention and data structures generated thereby.
Figure 5:
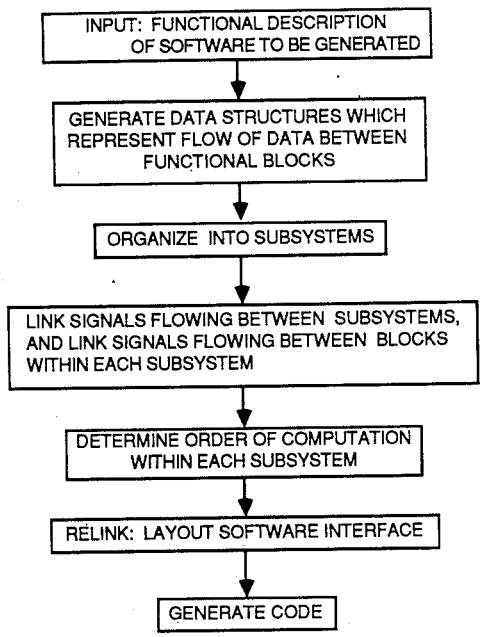
FIG. 5 is a flow chart of the major steps of the process of the present invention.

Referring to FIGS. 4 and 5, the main steps of the process of the present invention are as follows. The starting point or input to the process is a functional description in the form of a catalog database 28. The catalog 28 is typically generated by an engineer using an authoring program 50. The structure of the catalog is described below.

The data in the catalog is processed by a software module 52 called a linker because it traces the connections between the functional blocks in the catalog and generates data structures which represent those connections. In fact, though, the linker 52 first organizes the functional description into subsystems. Each subsystem includes all the computations to be performed at a particular sample rate and skew, or which are triggered by the same trigger condition. Then the linker 52 generates data structures representing the links between each of the subsystems in addition to the links between functional blocks within each subsystem.

Finally, the linker 52 determines the best order of computation for each subsystem's computations and stores a representation of this computational order in an array called OBIV (ordered block index vector).

The relinker 54 module's main purpose is to map out the space needed for each of the subsystems in the software bus (see FIG. 3) to be used by the control software generated by the system. The relinker 54 also generates data structures which are used by the code generator 56 to determine which signals need to be copied into the sample and hold buffers of the various subsystems.

Finally, the code generator module 56 uses the previously generated data structures to generate a set of software modules 24 which together comprise a complete set of control software for the specified control system.

The remainder of this specification is a technical description of the data structures and processes used by the preferred embodiment of the present invention.

MEMORY MAP

Figure 6:
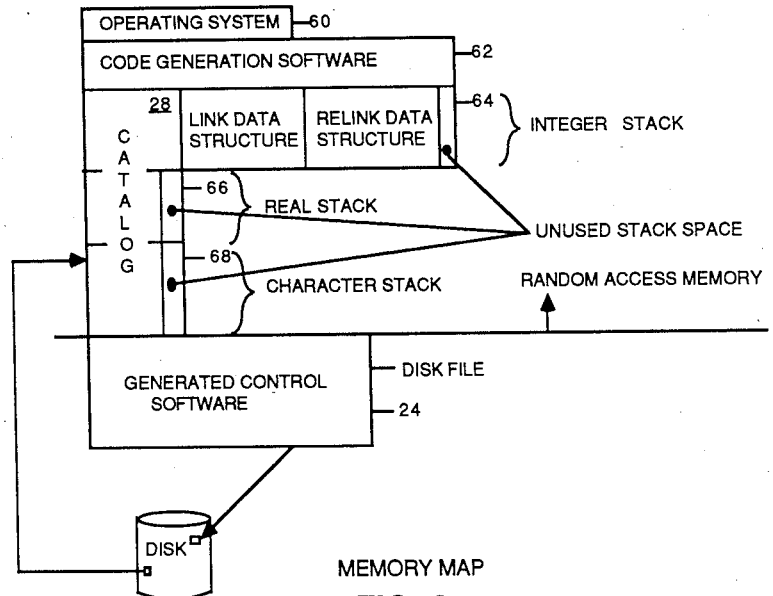
FIG. 6 depicts a memory map of the code generator of the preferred embodiment.

Referring to FIG. 6, there is shown a memory map for a software generation system. A portion of the system's memory is occupied by its operating system and the code generation software 62, which includes the functional library 31 and all the software modules shown in FIG. 4.

A second portion of the system's memory is allocated to three stacks: an integer stack 64 called the I stack, a real number stack 66 called the R stack, and a character stack 68 called the C stack. A third portion of the system's memory (which may be a disk file) is used to store the control software 24 generated by the system 20.

The catalog data structure 28 is stored in a disk file and copied into the stacks 64–68 in random access memory when the code generation process begins.

The link and relink data structures are stored primarily in the integer stack 64. As will be understood by those skilled in the art, the integer stack is used to store whole number (i.e., integer) values, the real stack is used to store parameters which need not have integer values, and the character stack is used to store alphanumeric information. Further, these stacks 64–68 are used to allow dynamic memory allocation, i.e., the building of data structures whose size is not known at the beginning of the code generation process.

In the preferred embodiment, the space for these stacks is allocated at the beginning of the code generation process. Therefore these stacks are deliberately made larger than will be needed—so that the process does not fail for lack of memory space.

CATALOG DATA STRUCTURE

Used to Provide System with Functional Description

Referring to FIG. 1, the user of the system 20 uses an authoring program to generate a catalog data structure 28. Since the authoring program is not part of the present invention, and since a software engineer of ordinary skill in the art could write an authoring program to generate the catalog data structure, only the catalog and not the authoring program is described.

Figure 7:
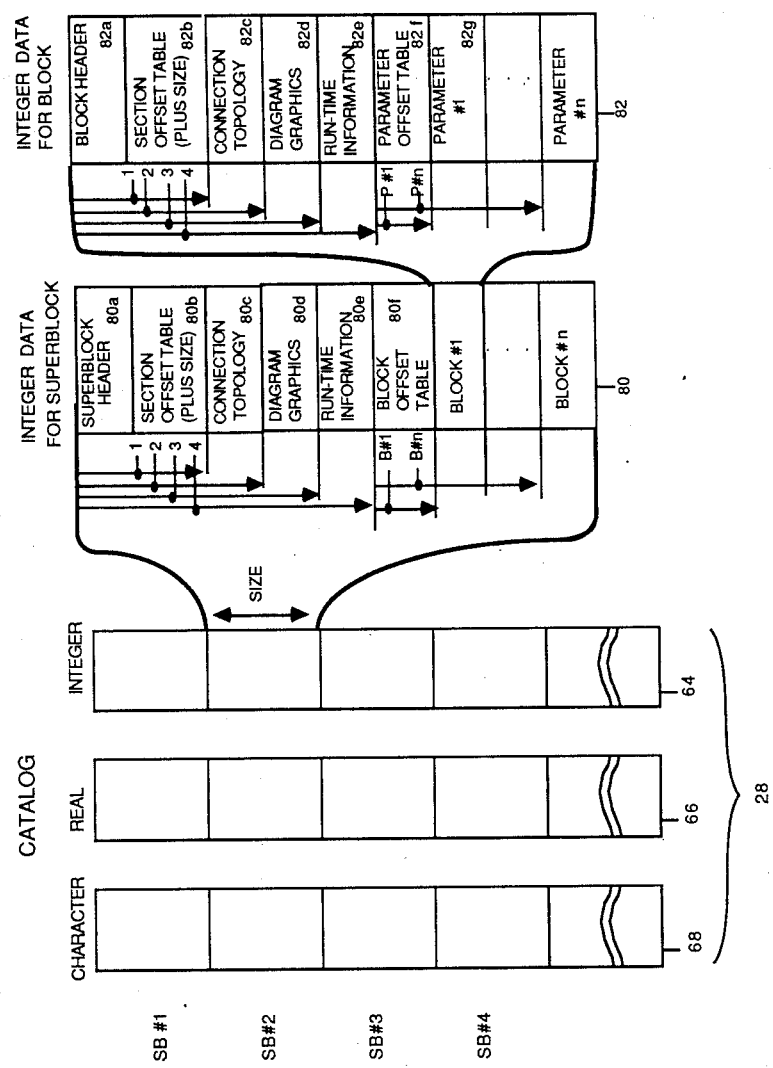
FIG. 7 is a block diagram of the catalog data structure used to represent the functional description of the software to be generated by the present invention.

Referring to FIG. 7, there is shown a block diagram of the catalog 28. In general, the data structures in the catalog 28 have integer, real, and character components. The integer stack 64, however, contains most of the information which controls the code generation process.

As shown in FIG. 7, the catalog normally contains a plurality of superblock data structures, identified as SB#1, SB#2, and so on. Each superblock data structure has integer, real and character components.

The data structure 80 for each superblock is divided into a number of distinct sections. The data for a superblock include data structures 82 for each of the blocks in the superblock.

When the code generation process is initiated, the catalog 28 is copied from a disk file into the system's random access memory. Also, the user identifies which superblock is the highest level superblock of the functional description. This superblock is called the main superblock. The system 20 then generates a set of control software for the control system described by the superblock.

Figure 7A:
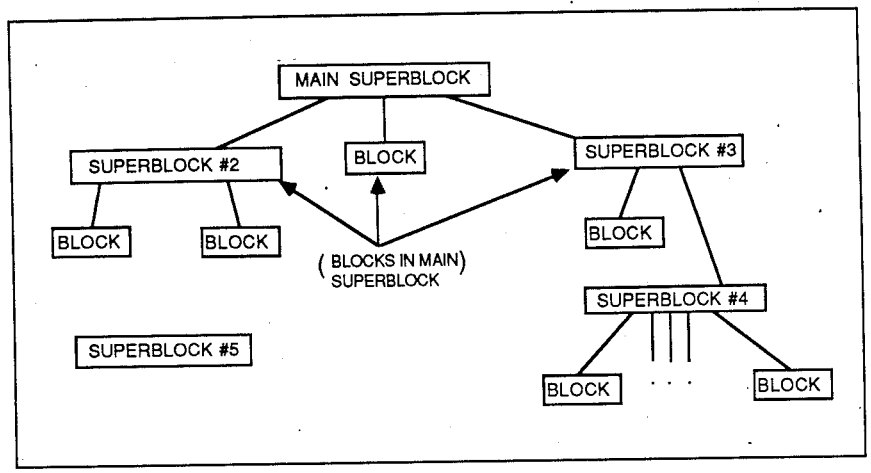
FIG. 7a depicts the hierarchical nature of superblocks in the catalog.

Referring to FIG. 7a, it should be noted that one or more of the blocks in a superblock can be another superblock. In other words, superblocks can be nested to form a hierarchical description of a control system. The superblocks in the catalog 28 are either portions of the control system associated with the identified main superblock 84 (e.g., SB#2–SB#4) or are not used (e.g., SB#5).

As can be seen from FIG. 7, the superblock data structure 80 and the block data structure 82 (which is one section of the superblock) are similar in structure. For instance, each has a header 80a, 82a which identifies the block or superblock and contains information such as the number of inputs and outputs signals associated with the block. Then there is an offset section 80b, 82b which contains pointers to each of the other sections in the superblock and block data structures. Each data structure 80, 82 also has information 80c, 82c regarding how the block or superblock is connected to other blocks in the control system; information 80d, 82d regarding the graphical representation of the data structure; and run time information 80e, 82e.

At the end of the superblock data structure 80 there is a set of block data structures 82 preceded by a block offset table 80f of offset pointers which indicate where the block data structures are located in memory.

At the end of the block data structure 82 there is a set of parameters 82g preceded by a parameter offset table 82f which indicates where the parameters 82g are located in memory.

Importantly, when a block in a superblock is another superblock, the data structure 82 for that block (i.e., lower level superblock) is still in the format of a block data structure. However, there is also a superblock data structure for that superblock in the catalog 28.

In fact, since one superblock must be selected as the top level superblock for which code is to be generated, all the other superblocks used in the control system description will be represented by both superblock and block data structures. The superblock data structures specify the general layout and function of the superblock, while the block data structures specify how that superblock is used within the functional description.

For instance, in the example given in FIG. 2, the ROLL 42 and R-RATE 44 superblocks are blocks in the CONTROL superblock 40. Thus the catalog data structure for FIG. 2 would have block data structures for ROLL 42 and R-RATE 44 in CONTRL superblock data structure, and it would also have a separate superblock data structures for ROLL 42 and R-RATE 44.

SUPERBLOCK CATALOG DATA STRUCTURE

FIG. 8 shows a somewhat more detailed diagram of the superblock catalog data structure 80.

Header. The superblock header 80a contains the following information. The Version parameter is used to indicate which version of the system's software was used to generate this data structure. This facilitates continued use of older generation superblocks not having new features added to subsequent versions of the system.

The header size is simply the length of the I stack portion of the superblock header. The address IOS of the next section of the superblock data structure, Section Offsets, is obtained by adding the header size to the I stack address I0 of the superblock.

The Visibility and On/Off line parameters in the superblock header are used solely during the authoring process and thus not revelant to the present invention. For instance, the On/Off line parameter specifies whether the superblock is currently in random access memory.

The Attributes parameter contains a number of single bit flags, including a Trigger flag used to indicate whether the computations associated with the superblock are automatically executed on a periodic basis, of whether they are triggered by a specified trigger condition.

Superblocks which perform computations in response to a trigger condition are not included in the preferred embodiment, but will be discussed in the section below on alternate embodiments of the invention.

The #Ext.In and #Ext.Out parameters identify the number of "external" input and output signals the superblock has. In other words, the number of data signals from outside the superblock which provide input data to the superblock is #Ext.In, and the number of data signals being transmitted to blocks outside the superblock is #Ext.Out.

In the C stack, there is stored the name of the superblock and any comment text included by the author of the superblock, both of which are individually terminated by an end-of-string (EOS) byte, which is $7C_{16}$ in the preferred embodiment.

Section Offsets. The Section Offset Table 80$b$ is a table having five sets of three parameters used to find the address of the I, R and C stacks for each of the following sections of the superblock data structure, and also for the next superblock in the catalog. For each of the Connection, Diagram, Run Time and Block sections, as well as the next superblock, the Section Offset Table 80$b$ has a set of three integer parameters which when added to the beginning address I0, R0 or C0 for the superblock, point to the beginning of the three stacks for the corresponding data structure section.

Connection Section. The connections between a superblock and other blocks in the control system (i.e., in the functional description) is described partially in the superblock's catalog data structure 80, partially in the block data structure 82 for the superblock when it is used as a block, and partially in the block data for the other blocks to which it is attached in the functional description.

It is important to note that each block in a superblock is identified by a BlockID, which is simply the item number of the block in the list 80$f$ of blocks for the superblock—which is in the Block Offset Table 80$f$.

Also, each funcational block used in the control system description can have multiple input and output signals. Each input and output of a block is identified by a channel number—which is simply an integer specifying the order of these input and output signals in the block's definition.

Each superblock has a set of input and output signals defined by its author. The connection section 80$c$ specifies the source of each output signal for the superblock. It does this by providing for each output signal, the BlockID of the block in the superblock which generates the signal, and also output channel of that block which generates the output signal.

The C stack portion of the connection section 80$c$ can be used by the author, if desired, to assign a name to each if the input signals to the superblock.

Diagram Section. The diagram section 80$d$ identifies the icon used in the graphic representation of the block. The icon is identified simply by an integer which is used to index into a list of the available icons.

Run Time Section. The run time section 80$e$ contains the following information. The Data Flag is reserved for future used. The Sample Interval, as described in the glossary above, specifies how frequently the input data to the superblock is to be sampled and analyzed. It also specifies the rate at which the corresponding computations are repeated. The Initial Time Skew is the delay before the first computation cycle for the superblock.

Note that for superblocks with triggered synchronization conditions use the sample interval parameters only to specify the priority to be given to that superblock's computations.

The Computational Delay parameter is used only when simulating the specified control system; it is not used for code generation.

Block Section. As shown in FIGS. 7 and 8, the block section of the superblock data structure is comprised of a block offset table followed by the block data structures for the blocks in the superblock.

The block offset table 80$f$ is a list of offsets used to find the address of the I, R and C stacks for each of the following block data structures. The block offsets are added to the stack addresses I4, R4, and C4 for the block offset section to obtain the stack addresses I5, R5 and C5 for each block.

The number of blocks in the superblock is derived simply by dividing the I stack offset for the first block by three, since the beginning I4 of the block offset table 80$f$ and the beginning of the I stack I5 for the first block are separated by a table with three entries for each block.

Superblock Size. The address of the next superblock in the catalog 28, i.e., the address of the I, R and C stacks, is obtained by adding the last set of I, R and C parameters in the Superblock Section Offset Table 80$b$ to the I0, R0, and C0 addresses of the current superblock.

BLOCK CATALOG DATA STRUCTURE

FIG. 9 shows a detailed diagram of the block data structure 82. As can be seen, the block data structure 82 is similar to the superblock data structure 80. Thus only the portions of the block data structure 82 which are different from the superblock data structure 80 will be described.

Header. In the header 82$a$ of the block data structure 82 the identity of the block's function is given the Type and SubType parameters. These two parameters point to a specific entry in the functional block library 31, and thereby identify the computations associated with the block.

The #Inputs parameter specifies the number of input signals required by the block, and #Outputs specifies the number of output signals generated by the block. #States identifies the number of internal state variables which are associated with the block. In general, the computations for a block can be written as $$Y_t = F_1(X_{t-1}, I)$$

$$X_t = F_2(X_{t-1}, I)$$

where $F_1$ and $F_2$ are predefined functions of the $X_{t-1}$ and I; I is a vector of input signals; $Y_t$ is a vector of output signals at time t; $X_t$ is the set of internal states for the block computed for time t; and $X_{t-1}$ is the set of internal states for the block previously computed for time $t-1$.

In addition to the BlockID, which identifies the block with respect to its superblock, each block can also be given an alphanumeric block name and an explanatory comment by the author of the superblock.

Section Offset Table. The section offset table 82b is similar in structure to the section offset table 80b for the superblock data structure 80, except that this table 82b has only four sets of entries—there is no block size entry, since this offset data is already available in the block offset table 80f of the block's superblock.

The outputs of each block can be, if desired, given alphanumeric names in the C stack of the connection section 82c. Each output signal name is variable length and is terminated by a units identifier and then an end of string byte.

Connection Section. The connection section 82c of the block data structure 82 defines the input connections to the block. In particular, for each input to the block there is specified the BlockID of the block which is the source of the input signal, and the channel number of that block's output channel which supplies the input signal. Block input signals which are also inputs to its superblock are identified as coming from BlockID=0, and the channel number is just the superblock input channel.

Diagram Section. An icon identifier in the diagram section 82d is used to index into a library of icons for use in functional displays such as the one shown in FIG. 2.

Run Time Section. The run time section 82e can be used to specify initial conditions for the ouputs and states of a block. The Flag parameter is not relevant to the present invention. Looking first at the I stack, the #I.C. parameter specifies the number of initial conditions which are defined. Then for each initial condition, the output or state is identified by an I.C. Identifier (which is equal to 0 for states, and 1 for outputs) and I.C. Channel (an ordinal number specifying the output channel or the state variable). A corresponding set of parameters is contained in the R stack, in the order specified by the list in the I stack.

Parameters Section. The parameters section begins with an offset table 82f that allows the use of parameters which are variable length vectors. However, in most instances, the parameters to a block will be a single vector of real values, and thus the parameter offset table 82f will have just a single entry.

As with the block offset table 80f, the values in the parameter table 82f are offset from the I, R and C stack addresses of the parameter offset table I4, R4 and C4. The number of parameters listed in the table 82f can be determined simply by dividing the first table entry by three because the first entry, which points to the first parameter is equal to the length of the parameter table.

As will be evident to those skilled in the art, and to those who consider the matter carefully, the above described catalog data structures are sufficient to completely describe the computational relationships for a multirate real time control system. Note that the actual computations associated with each functional block are defined by software templates for each functional block in the function library 31, as will be described below.

What the catalog data structures do is define the flow of information between computational blocks in the control system.

LINKING

The First Step in Analyzing the Functional Description

Subsystem Definition

The first step in analyzing the functional description for the specified control system, as specified by the data structures in the catalog 28 as described above, is called the Linking step. The primary tasks of the Linking step are to divide the computations in the control system into appropriate subsystems, and then to perform the initial sorting or tracing of the connections between the blocks within each subsystem and the connections between different subsystems.

As indicated in the glossary, all of the superblocks in the specified control system are divided up into subsystems, with one subsystem being used for each unique sample rate/skew combination. Separate subsystems are also used for each trigger condition used to initiate a trigger task. Thus each set of computations which have identical computation initiation conditions are treated as a subsystem.

Figure 10:
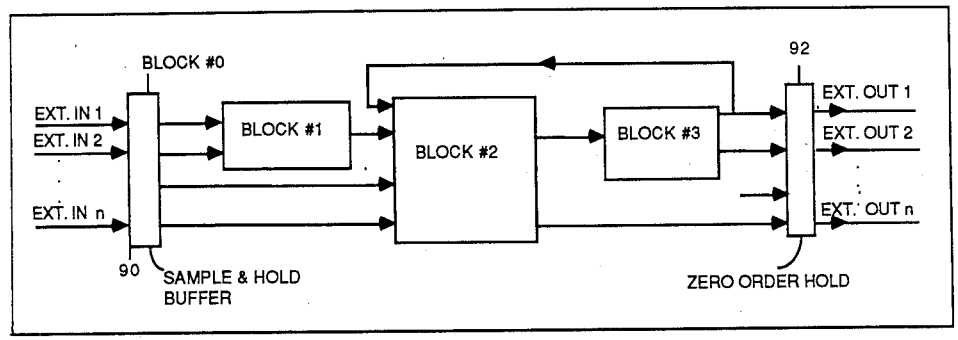
FIG. 10 depicts a model of the input and output signal connections for a subsystem in the present invention.

Subsystem I/O Model. Referring to FIG. 10, each subsystem is treated as though it has an input sample and hold buffer, and an input zero order hold buffer 92.

The corresponding software bus data structures are shown in FIG. 3. The zero order hold buffer for each subsystem is provided by two bus sections, BUS0 and BUS1, having identical size buffers to hold the output signals Y and the states X of each subsystem. Each subsystem has a flag called Busflag which indicates where the currently valid outputs for the subsystem can be found.

The sample and hold buffer for each subsystem (i) is denoted as area $H_i$ in the software bus.

SUPERBLOCK I/O MODEL

While there is no sample and holding for superblocks per se, the inputs to superblocks are treated during the linking process as going through an input interface which is called block B#0 for the purpose of defining block connections.

Since each subsystem is a conglomeration of one or more superblocks, the input and output interface model for subsystems is the same as for superblocks. As will be seen below, the main difference is that some of the signals which are external inputs and outputs for certain superblocks are internal signals for the purposes of the corresponding subsystem. In other words, there is no need to sample and hold those superblock inputs which come from other superblocks in the same subsystem. Nevertheless, the model shown in FIG. 10 is still useful for superblocks because this is the model used during the linking process.

SOFTWARE BUS

As discussed above, the software bus includes sample and hold buffers $H_i$ for each subsystem (i) and also a zero order hold. In addition, there is a temporary use area $T_i$ for each subsystem, which is equal to the maximum number of inputs to any block in the subsystem. There is also space allocated for holding the external inputs $U_i$ (for i=1 to a) and the external output signals $O_i$ (for i=1 to b) for the entire control system.

LINK TIME DATA STRUCTURES

Figure 11:
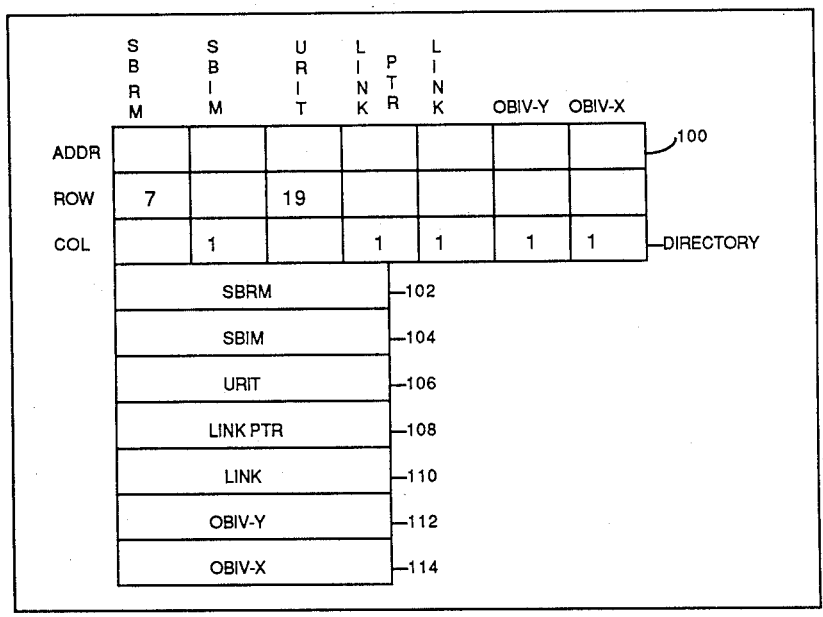
FIG. 11 is a memory map of the run time data structures used in the preferred embodiment.

In FIG. 11 there is shown a memory map of the data structures created during the link process, called herein the Link Time data structures. The first data structure is a Link Time Directory 100 for the Link Time data structures. For each data structure there is a starting address, and a row and column size indicator. For those data structures which are organized as single dimension vectors, the directory entry has a column entry of one and a row entry equal to the length of the data structure.

All of the Link Time data structures 100-114 are arrays of integer parameters. All the real number and character information needed by the code generation system is already contained in the catalog 28.

The general purpose of each of the Link Time data structures is as follows. The SBRM (superblock reference map) 102 provides a map of the superblocks used in the control system. The SBIM (superblock index map) 104 provides pointers, indirectly through the LINK PTR data structure 108, to the LINK data structure 110 which contains information regarding how the blocks within each subsystem are linked to one another.

As its name indicates, the LINK data structure 110 is used to link together all the pieces of each subsystem. The LINK PTR data structure 108 is a set of pointers used to map the SBIM into the LINK data structure. The LINK PTR array 108 is used, later on, to map the OBIV arrays 112 and 114 into the LINK array 110. The use of the LINK PTR 108 will be explained in more detail below.

The OBIV-Y and OBIV-X (Ordered Block Index Vectors) 112 and 114 are used to list the blocks in each subsystem in their order of computation. The OBIV-Y array is used for ordering the output computations for each subsystem, and the OBIV-X array is used for ordering the state computations.

The URIT (Unique Rate Information Table) 106 is used to store information for each subsystem regarding the size and location of various components of the software bus and the OBIV tables for the subsystem.

LINK STEP 1: BUILDING SBRM/CATALOG SEARCH PROCEDURE

At the beginning of the link process, after allocating space for the Link Time Directory 100, the system generates a data structure called the superblock reference map, or SBRM 102, for keeping track of the superblocks in the catalog. The SBRM 102 is built by starting with the superblock identified as the main superblock (i.e., the one which defines the control system) and tracing through the catalog data structure until all the superblocks in the control system have been identified. For each superblock there is generated one column in the SBRM.

Figure 12:
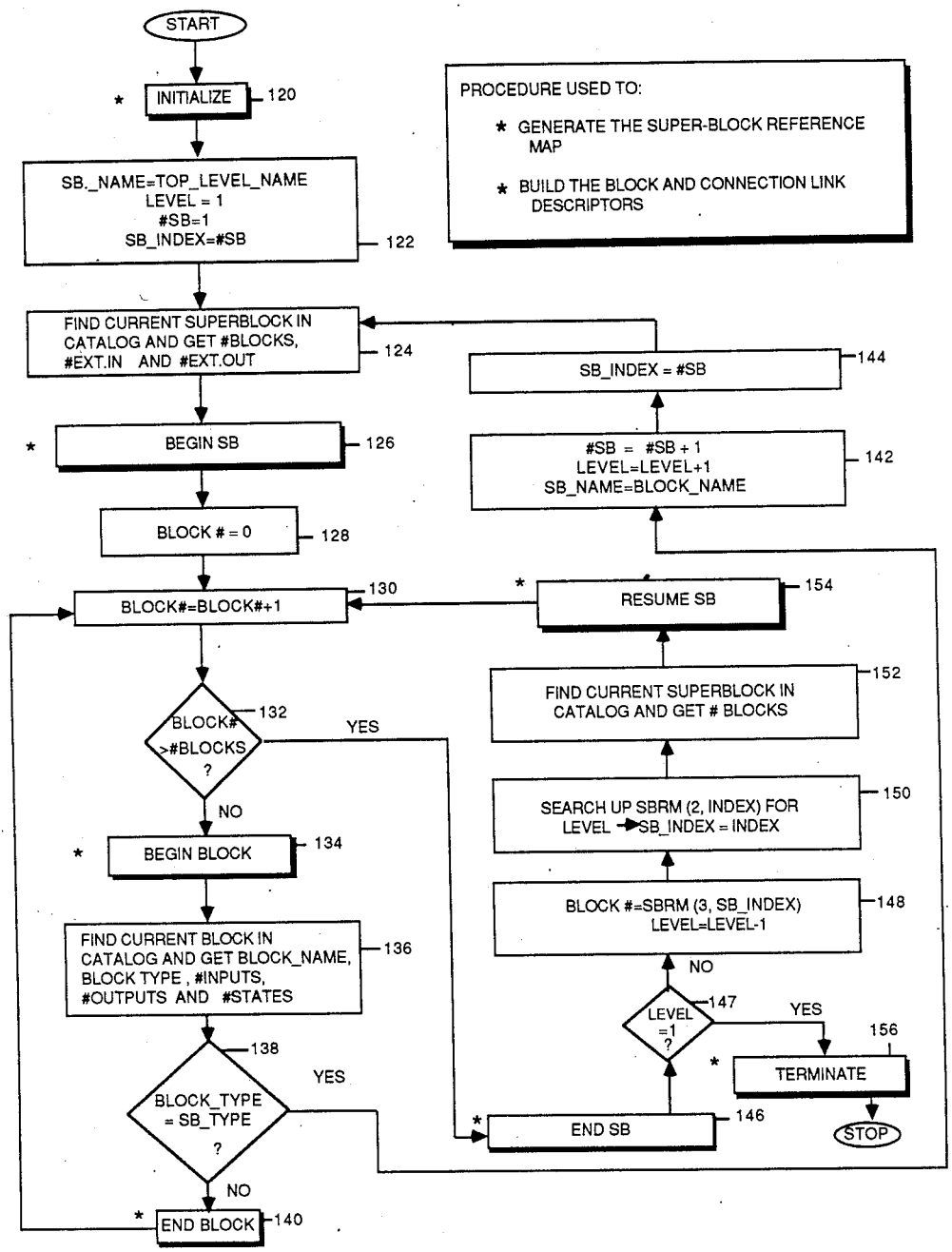
FIG. 12 depicts a generalized flowchart for several processes which involving tracing through the catalog of the preferred embodiment.

FIG. 12 is a generalized flowchart for several processes which involving "tracing through the catalog" 28, including building the SBRM 102. The steps associated with the blocks with an asterisk next to them are changed depending on the process.

Looking at FIGS. 7 and 12, the procedure for building the SBRM 102 and "tracing through the catalog" to find all the superblocks in the identified control system works as follows. The program begins (box 120) by allocating the space needed for the Link Time Directory 100.

Then (box 122) starting with the superblock identified by the user as the top level superblock which defines the control system, the tracing program performs the following steps for each superblock found during the tracing process. First, the currently identified superblock is found in the catalog by stepping through the catalog until a superblock with the specified name is found. Note that each superblock is given a name in its header 80a and that the tracing program can jump from one superblock to the next in the catalog by using the fifth I stack offset in the Section offset table 80b to calculate the address of the next superblock (box 124) in the catalog.

Once the currently identified superblock has been found in the catalog 28, the BEGIN SB step (box 126) is performed. For building the SBRM, this step comprises the following steps. First, the IPTR, RPTR and CPTR parameters in the SBRM are filled in with the addresses of the I, R and C stacks for the superblock.

The Level parameter is set equal to the current superblock Level. Note that the top level superblock has a Level equal to one, and that the Level parameter indicates the depth of the current superblock in the superblock hierarchy.

The Block# parameter in the SBRM is set equal to the BlockID of the current superblock in its parent superblock. For the top level superblock, the BlockID is zero. Otherwise, the combination of the Level and Block# parameters in the SBRM uniquely identify each use of each superblock in the control system.

Next, the SBIM Offset is set equal to the SBIM offset of the previous superblock in the SBRM plus two plus the number of blocks in the previous superblock. (See discussion of the SBIM below.)

Finally, the program checks for "recursive nesting of superblocks" by checking whether any of the parents of the current superblock have the same superblock name.

The RateID parameter is not filed in until the end of the SBRM building process.

Once the SBRM entries for the current superblock have been filled in (box 126), the SBRM builder traces through the blocks of the current SBRM (boxes 128-140). The BEGIN BLOCK and END BLOCK steps (boxes 134 and 140) are used only to add up the number of block references (#Block_Ref) in the BEGIN BLOCK (box 134) step so that the size of the SBIM can be calculated later on; and to add up the actual total number of blocks used in the control system (#Block_Total) so that the size of the LINK PTR array can be calculated.

Whenever a block turns out to be a superblock (box 138) the SB_INDEX and LEVEL variables are incremented, and a new superblock is added to the SBRM.

Once all the blocks in a superblock have been checked (block 132) the procedure "decrements one level" (boxes 146-154) and resumes tracing through the remaining blocks of the parent of the last superblock processed. This continues until the top level superblock has been fully processed (box 147).

In the SBRM building process, the END SB (box 146) and RESUME SB (box 154) steps are not used.

The TERMINATE step 156 of the SBRM building process is used to allocate memory for the SBIM (superblock index map), the LINK PTR data structure, and the URIT (unique rate information table).

Figure 13:
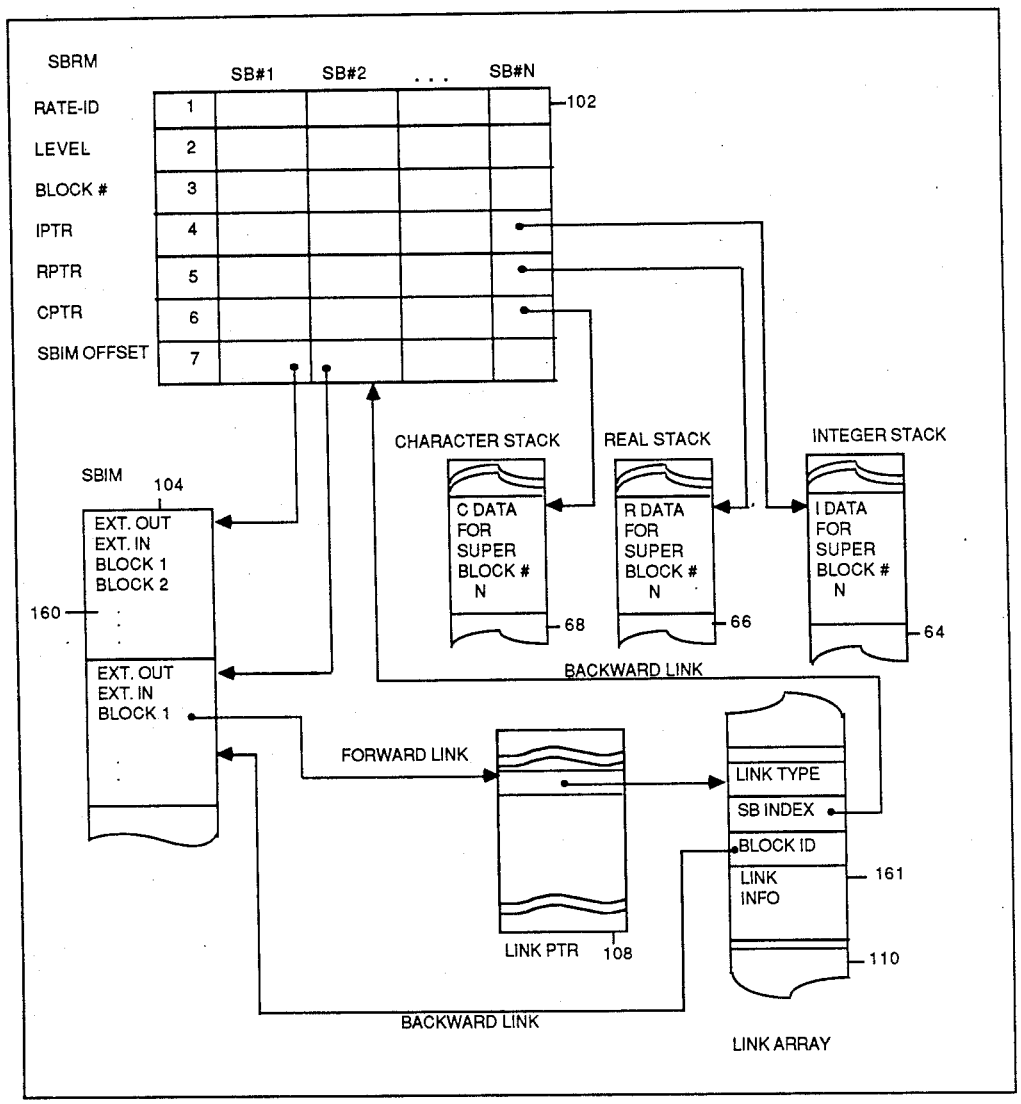
FIGS. 13 and 14 depict the relationship between the SBRM, SBIM, LINK PTR and LINK data structures.

SBIM. Referring to FIG. 13, the purpose of the SBIM (Superblock Index Map) 104 is to store a block of pointers 160 for each superblock in the control system.

Each pointer in the block 160 indirectly points at a "link" data structure in the LINK array 110. Together, the set of pointers 160 in the SBIM point to all the "links" which will be used to organize the flow of data signals to, from and within the superblock corresponding to the pointer 160.

For each superblock, the SBIM array 104 has one pointer for a "superblock input link", one for a "superblock output link", and one for each block in the superblock. Thus the amount of memory space needed for the SBIM 104 is equal to the total number of block references (#Block_Ref) found while building the SBRM 102, plus twice the number of superblocks (#SB) in the SBRM.

SBIM size=#Block_Ref+2*#SB

LINK PTR. The LINK PTR array 108 is used to map the SBIM pointers (and later, the OBIV pointers) into the LINK array 110.

Figure 14:
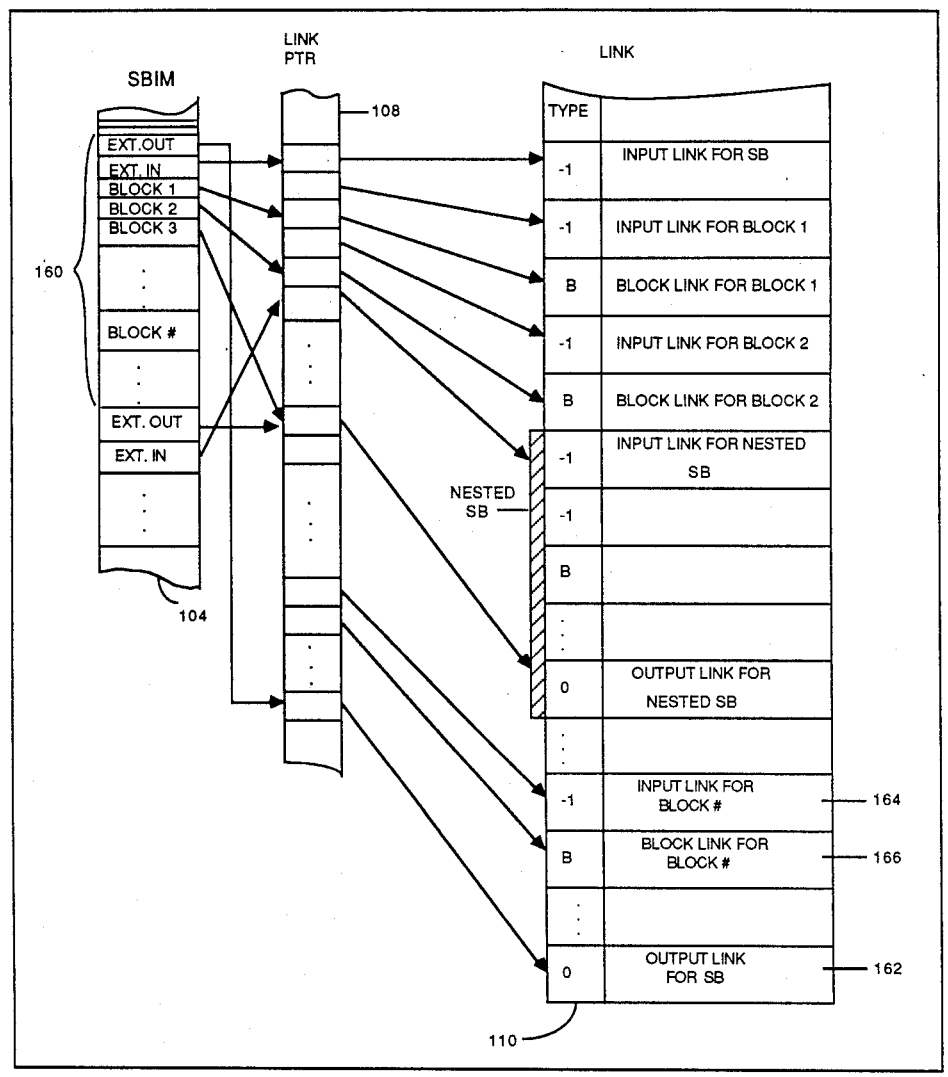

Referring to FIG. 14, there is shown the basic relationship between the SBIM 104, LINK PTR 108 and LINK 110 data structures. The set of pointers 160 in the SBIM 104 for each superblock contains entries labelled Ext.Out, Ext.In, and Block 1 to Block (Last).

The Ext.Out entry in the SBIM points to an entry in the LINK PTR, which points to an Output Link 162 in the LINK array 110. As will be described below, the Output Link 162 specifies the output connections for a superblock.

The Ext.In entry in the SBIM is used to point to the Input Link for the superblock—which is also the Input Link for this block in the parent superblock.

Each Block entry in the SBIM points an entry in the LINK PTR array 108 which, in turn, points to a Block Link 166 if the block is not a superblock, or an Output Link 162 if the block is a superblock. Block Links are always preceded by a corresponding Input Link 164. The structure and use of Links 162, 164 and 166 will be described below.

Since there will be one pointer in the LINK PTR array 108 for each Input Link (i.e., for each block reference), one pointer for each Block Link (i.e., each block reference for a block which is not a superblock), plus one pointer for every superblock Output Link, the amount of memory space needed for the LINK PTR array 108 is LINK PTR
size=#SB+#Block_Ref+#Block_Total This memory space is allocated by the TERMINATE step (box 156) in FIG. 12 for the SBRM creation Process.

Figure 16:
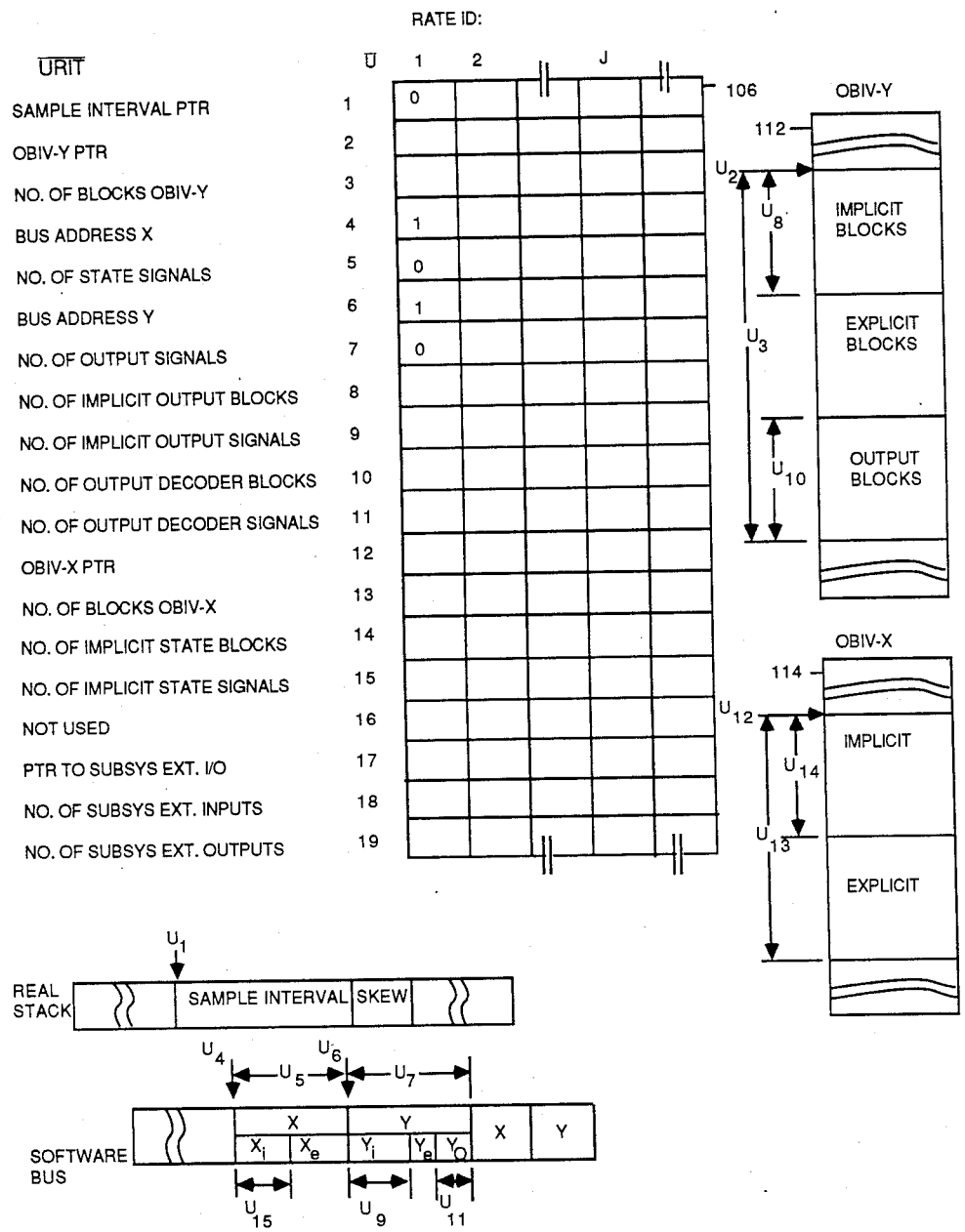
FIG. 16 depicts the URIT (unique rate information table) and related data structures.

URIT. Finally, the TERMINATE step (box 156) in FIG. 12 for the SBRM creation process allocates space for the URIT (unique rate information table) 106 and gives each superblock a RateID. It is during this process that the system identifies subsystems. As shown in FIG. 16, the URIT table 106 is used to keep track of important parameters for each subsystem.

The RateID parameter for each superblock in the SBRM is given a value as follows. Each unique Sample Rate/Skew and Trigger condition is given a unique RateID. As new values are found, an internal counter called #Rate is incremented, starting with a value of two for the top level superblock's RateID, and assigned to the RateID for the current superblock. Thus, as each superblock in the SBRM is inspected, the current superblock's Sample Rate/Skew or Trigger Condition (hereinafter referred to simply as the Sample Rate/Skew) is compared with the Sample Rate/Skews for the RateIDs already in the URIT 106. If the same value is found, then the current superblock is assigned the same RateID as the other superblock(s) with the same Sample Rate/Skew value. If the current superblock's Sample Rate/Skew does not match any of the previous superblocks, then the current superblock is given a new RateID (i.e., #Rate is incremented and this value is assigned to the current superblock's RateID).

Each time #Rate is incremented, space for a new column of the URIT table is allocated (i.e., space for 19 integers). The value of #Rate is the RateID for a new subsystem, and the entries in the new URIT column will be parameters associated with this newly identified subsystem. The first parameter for the new column is a pointer to the R stack parameters in the run time section of the first superblock for the subsystem associated with the new URIT column. Thus this parameter is a pointer to the Sample Rate/Skew for the subsystem.

It should be noted that column 1 of the URIT table is used to save certain parameter totals for the entire control system. The first subsystem, which has a RateID equal to two, uses the second column of URIT.

Due to the structure of the URIT table 106, subsystem 1 has a RateID of 2, subsystem 2 has a RateID of 3, and so on. Thus, the term "RateID—1" is sometimes used to identify the data structures for the subsystem corresponding to the URIT(x,RateID) column in the URIT table 106.

Pseudocode Process Representations

For some of the major processes described herein, a "pseudocode" version of the process is provided. "Pseudocode" is, essentially, a computer language using universal computer language conventions. While the pseudocode employed here has been invented solely for the purposes of this description, it is designed to be easily understandable to any computer programmer skilled in the art. the following are some notes on the syntax of this pseudocode:

Comments. Comments, i.e., nonexecutable statements, begin with "- -". All text on the rest of that line, after a "- -", is a comment.

Multiline Statements. Statements continue from line to line as needed.

If Statement. There are two versions. For the one statement version the syntax is:

If -condition- Then -statement-.

For the block statement version the syntax is:

| If -condition- Then | |
|---|---|
| -block of statements- | |
| Else | - optional |
| -block of statements- | - optional |
| Endif | |

Loops. Loops can be of the following forms. For loops using an incrementing or decrementing counter the syntax is:

Loop for I = 1 to X
-block of statements

```
                    -continued
                    End_Loop
```

For loops which run until a specified condition is not satisfied the syntax is:

```
                    Loop While -condition-
                        -block of statements
                    End_Loop
```

The use of the instruction LoopNext causes the program to jump to the top of the loop and continue. If inside a nested loop, the LoopNext causes the program to jump to the top of the loop at the current loop level.

The use of the instruction LoopExit causes the program to exit the current loop (i.e., at the current loop level) and to continue execution with the first instruction after the end of the loop.

Overlay. The Overlay instruction is used to superimpose one data structure (such as a predefined template) on another data structure so that the superimposed data structure can be used to access the elements in the other.

The pseudocode representation of the process for building the SBRM, for identifying subsystems and for allocating memory space for the SBIM and LINK_PTR arrays is shown in Table 1, in conjunction with the code sections noted in FIG. 12.

LINK STEP 2: BUILDING BLOCK AND CONNECTION LINKS

Figure 15:
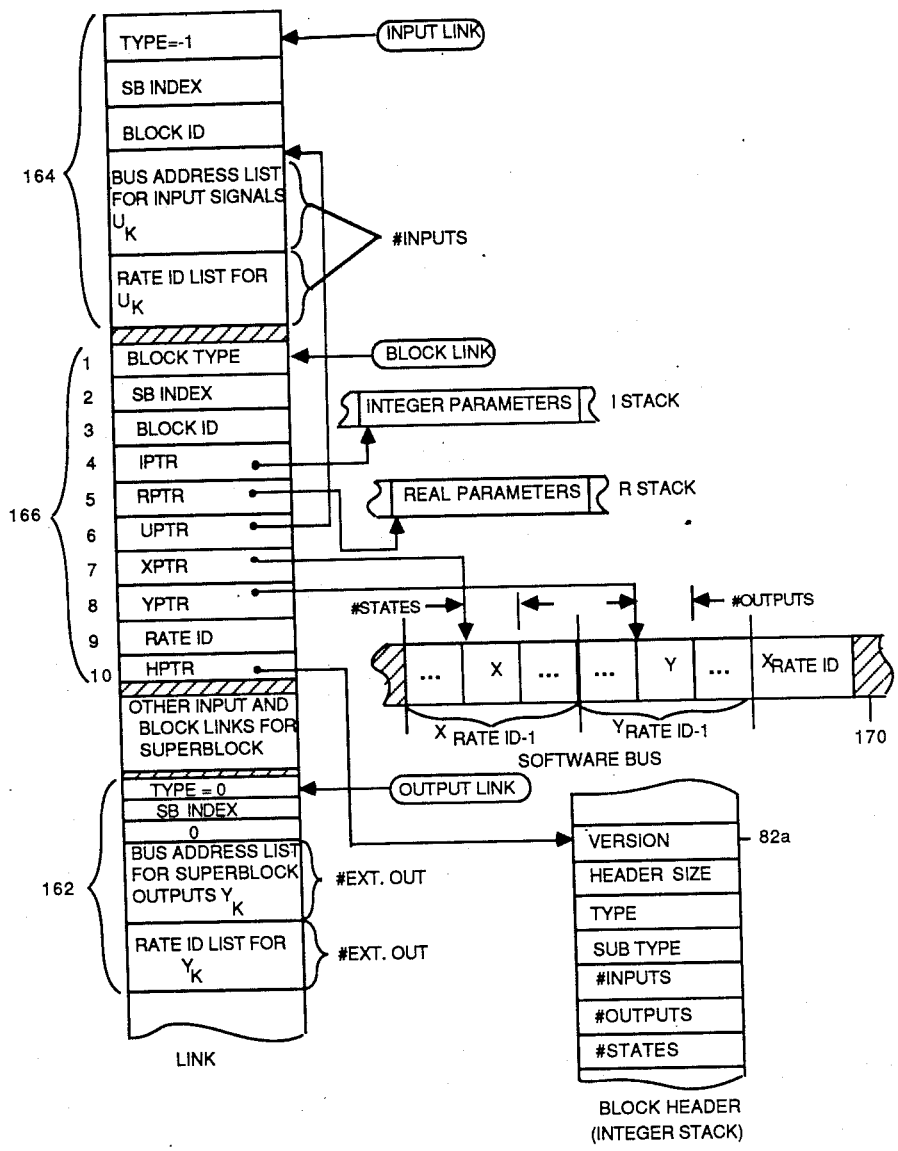
FIG. 15 is a detailed block diagram of the Link data structures used in the preferred embodiment.

Data structures called block and connection links are used for resolving the connections between the blocks in each subsystem. FIGS. 13, 14 and 15 show the relationships between the LINK, LINK_PTR, catalog and software bus data structures.

Referring to FIG. 13, each Link 161 begins three parameters: a Link Type, an SB_Index and a BlockID.

The Link Type is equal to −1 for Input Links 164, 0 for superblock Output Links 162, and the block type (which is an index into the functional block library and is always greater than 0) for Block Links 166.

The SB_Index parameter identifies the corresponding superblock by identifying the column of the SBRM 102 for the superblock. The BlockID is simply the Block's BlockID in its parent superblock. Output Links have a BlockID of zero.

Together, the SB_Index and the BlockID act as a backward link, linking the Link back to the SBIM: the SB_Index can be used to index into the SBRM to find the address of the SBIM block 160 for the corresponding superblock, and the BlockID can be used as an offset from the address of the SBIM to find the SBIM entry for the Link.

Referring to FIG. 15, for each block in the control system the link process creates an Input Link 164 and a Block Link 166.

Block Link. The Block Link 166 is an array of ten parameters which identify the block corresponding to the Link 166. IPTR and RPTR point to the location of the block's integer and real parameters in the I and R stacks, respectively. UPTR points to the Input Link 164 for the block.

XPTR and YPTR give the addresses for the block's states and outputs, relative to the beginning of the X and Y portions of the software bus for the RateID subsystem. In other words, XPTR and YPTR are relative pointers to the portions of the software bus used to (zero order) hold the blocks's states and outputs.

Finally, HPTR points to the block's header in the I stack.

Input Link. The Input Link 164 for each block contains, for each input to the block, the software bus address of the input signal and the input signal's RateID. Note that the RateID of a signal is the RateID of the block (i.e., superblock) that generated that signal.

Output Link. Also, for each superblock an Output Link 162 is generated. The superblock Output Link 162 is identical in structure to the block Input Link 164 except that: the first parameter (Link Type) is a zero; the BlockID parameter is zero; and for each output signal (rather than each input signal) of the superblock there will be listed a bus address and RateID.

Link Building. The process of building these links does not resolve the connections between blocks—it only allocates space in the LINK array for the data structures needed to resolve these connections. The processes for resolving these connections is described below, after the process for building the links has been described.

The pseudocode representation of the process for building the links is shown in Table 2 which must be read in conjunction with the flow chart shown in FIG. 12.

The process of building the links follows the steps shown in FIG. 12 for tracing through the catalog data structure.

A block diagram of the URIT (unique rate information table) 106, which is one of the key information storage structures for subsystems, is shown in FIG. 16. The link process begins to fill in the information in the URIT 106 required for code generation.

First, it should be noted that the goal of this procedure is to build a set of links for each superblock, including an SBIM block 160, and a corresponding set of pointers in LINK PTR array 108. Thus the procedure is to trace through the hierarchy of superblocks, building links for each block as it is encountered.

INITIALIZE. To initialize the process (box 120 in FIG. 12), the SBIM array 104 is zeroed, and so are the second through the 19th rows of URIT (the unique rate information table).

The variable Link_Space, initially set to zero, is used to point to end of the last completed Link, and is thereby used as a dynamic memory allocator for the Link array 110.

The variable Link#, initialized to zero, is used to count the number of links built so far. Link# is also used as an index into the LINK PTR array 108.

BEGIN SB. As each new superblock is encountered during the procedure, the SBIM address for the superblock is obtained from the SBRM. Also, the SBIM entry for external inputs (Ext.In) is set equal to Link#, which is the LINK PTR entry for the input link to the block, at the next level up, which is the current superblock.

BEGIN BLOCK. As each new block is encountered, an Input Link is created. This is done by filing in the first three parameters of the Link and leaving the rest of the Link empty. Empty space is allocated in the Link simply by advancing the Link_Space pointer. A pointer to the new Input Link is put in the next sequential slot in the LINK PTR array, but there is no SBIM entry for Input Links.

END BLOCK. For blocks which are not superblocks, a Block Link is created simply by allocating ten memory spaces in the LINK array 110 and filling it in with the information noted in FIG. 16 and discussed above.

The Block Link is connected to the SBIM as follows. The SBIM entry for the block is set equal to the next available LINK PTR slot, and the address of the Block Link is put in that LINK PTR slot.

The number of states and outputs for the current block are added to the State and Output accumulators, URIT(5,RateID) and URIT(7,RateID) for the subsystem associated with the block.

Note that if the current block is a superblock (box 138), the routine does not create a Block Link. Instead it pops down a level and starts processing this superblock (boxes 142–144 and 124–126). Thus the Links for a superblock which contains other superblocks will not be in sequential order in the LINK array 110.

END SB. To finish processing a superblock (box 146) an Output Link is created. Like an Input Link, the Output Link is created by filing in only the first three parameters and then allocating two spaces for each superblock output signal. Output Links, however, are linked to the SBIM. Therefore, the SBIM's Ext.Out entry for the superblock is set equal to the next available LINK PTR slot, and the address of the Output Link is put in that LINK PTR slot.

RESUME SB. To resume processing (box 154) a higher level superblock after the processing of a lower level superblock has been finished, the process reestablishes the SBIM_Off address for the current superblock. It also puts the address for the Output Link of the lower level superblock which has just been created in the SBIM slot for that block for the current superblock. Thus SBIM entries for blocks which are superblocks point, through the LINK PTR, to the Output Link for that block. The process then resumes processing the current superblock with the next block in the superblock.

TERMINATE. The Link Building process is completed by calculating the relative X and Y bus addresses for each of the subsystems. The X bus address for the first subsystem is defined as being at relative bus address 1. Then for each subsystem, bus space is serially allocated for its state signals URIT(5,RateID) and output signals URIT(7,RateID). The resulting relative bus addresses are stored in URIT(4,RateID) and URIT(6,RateID).

LINK STEP 3: RESOLVING OUTPUT LINKS

The next procedure in the Linking process is to fill in the Output Links with bus addresses indicating the source of each Output signal for each superblock in the control system.

Figure 17:
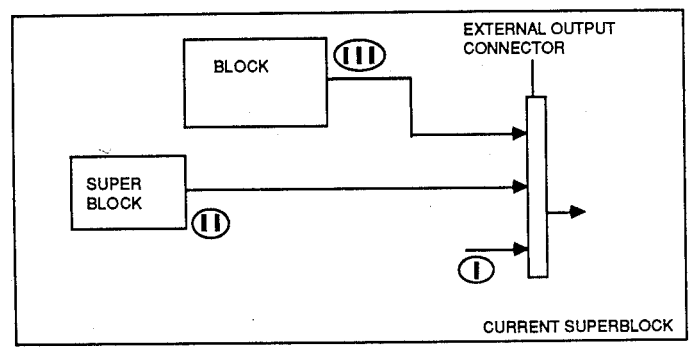
FIG. 17 depicts three different situations involved in resolving output links.

Referring to FIG. 17, there is shown a schematic of the three different situations which are handled by this procedure: (1) output signals which come from a disconnected channel (i.e., with no signal source), (2) output signals from a superblock within the current superblock, and (3) output signals from a functional block within the current superblock.

The pseudocode representation of the process for resolving Output Links is shown in Table 3. Note that this procedure does not follow the tracing pattern shown in FIG. 12.

Figure 18:
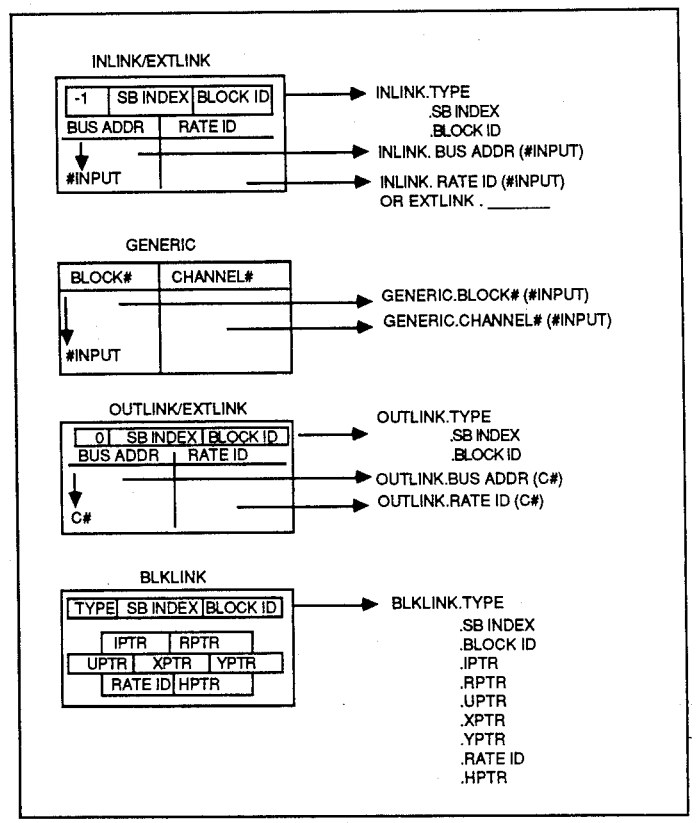
FIG. 18 depicts four data structure templates used in the pseudocode description of some of the procedures used in the present invention.

Data Structure Templates and Notation for Pseudocode. FIG. 18 shows a set of four data structure templates INLINK, GENERIC, OUTLINK and BLKLINK which are used in the process of resolving Input and Output Links. These data structure templates are used as overlays or templates which are "placed over" other data structures, such as links, as a window—thereby providing a convenient mechanism for generically addressing the elements of these data structures. The notation used in conjunction with these data structure templates is as follows. The term Window_Name.Section_Name refers to the element called "Section_Name" of the Window_Name data structure (template). For example, the expression

H=BLKLINK.HPTR assigns the value of the HPTR element of the BLKLINK data structure to the variable H.

Similarly, for window elements which are vectors, the term

Window_Name.Section_Name(#a)

refers to sub-element #a of the element called "Section_Name" of the Window_Name data structure.

This form of notation will also be used with the other data structures already discussed above. For instance, the term SBRM(4,#SB) is equivalent to the term SBRM.IPTR(#SB).

The basic procedure for resolving Output Links is to sequentially inspect all of the links in the LINK array, in the order specified by sequentially moving through the LINK PTR array. If the current link is an Output Link then the link is processed as follows.

First, the OUTLINK template is overlayed on the Ouput Link and the GENERIC template is overlayed on the connection section for the superblock corresponding to the Output Link.

Then the process loops through all the entries, i.e., outputs, in the GENERIC connection section. If the output is a disconnected channel, the corresponding OUTLINK entry is set equal to the zero on the software bus.

If the output comes from a superblock within the current superblock, the EXTLINK template is overlayed on the Output Link for the referenced superblock. Then the OUTLINK entry is copied from the specified channel of the EXTLINK.

Finally, if the output comes from a functional block within the current superblock, the BLKLINK template is overlayed on the Block Link for the reference block. Then the OUTLINK entry's bus address is set equal to the bus address for the specified output channel of the reference block, and the OUTLINK entry's RateID is set equal to the RateID of the referenced block.

LINK STEP 4: RESOLVING LINKS

The next procedure in the Linking process is to fill in the Input Links with bus addresses indicating the source of each input signal to each block in the control system.

Figure 19:
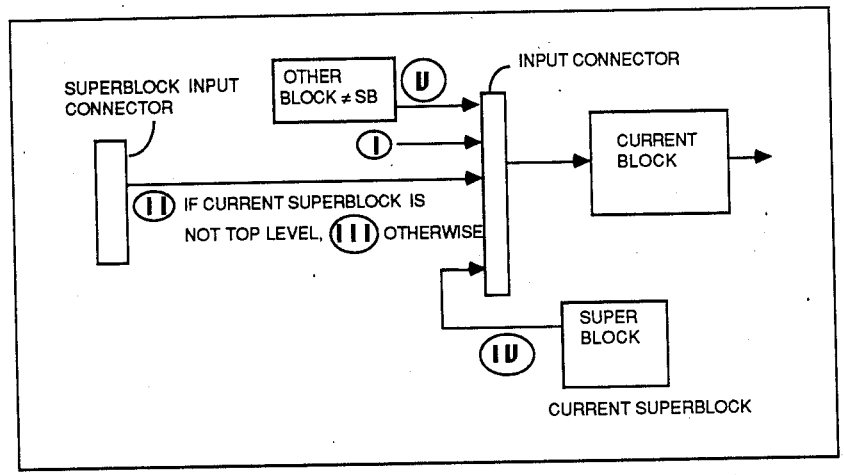
FIG. 19 depicts five different situations involved in resolving input links.

Referring to FIG. 19, there is shown a schematic of the five different situations which are handled by this procedure: (1) input signals which come from a disconnected channel (i.e., with no signal source), (2) input signals from outside the current superblock—if the current superblock is not the top superblock, and (3) if the current superblock is the top level superblock, (4) input signals from a superblock within the current superblock, and (5) input signals from another functional block within the current superblock.

The pseudocode representation of the process for resolving Input Links is shown in Table 4. Note that this procedure follows the same basic outline as the process for resolving Output Links—and therefore does *not* follow the tracing pattern shown in FIG. 12.

The basic procedure for resolving Input Links is to sequentially inspect all of the links in the LINK array, in the order specified by sequentially moving through the LINK PTR array. If the current link is an Input Link then the link is processed as follows.

First, the INLINK template is overlayed on the Input Link and the GENERIC template is overlayed on the connection section for the block corresponding to the Input Link.

Then the process loops through all the entries, i.e., inputs, in the GENERIC connection section. If the input is a disconnected channel, the corresponding INLINK entry is set equal to the zero slot on the software bus.

If the input comes from outside the current superblock, there are two different possible situations. If the current superblock is the top level superblock, then the input signal is an external input signal to the control system and the input's bus address is simply the bus address of the external input, and its RateID is zero. However, if the current superblock is not the top level superblock, then the EXTLINK template is overlayed on the Input Link for the current superblock. Then the INLINK entry is copied from the specified channel of the EXTLINK template.

If the input comes from a superblock within the current superblock, the OUTLINK template is overlayed on the Output Link for the referenced superblock, and the INLINK entry is copied from the specified channel of the OUTLINK template.

Finally, if the input is from a functional block within the current superblock, the BLKLINK template is overlayed on the Block Link for the referenced block, and the INLINK entry's bus address is set equal to the bus address for the specified output channel of the reference block, and the INLINK entry's RateID is set equal to the RateID of the referenced block.

LINK STEP 5: ORDERING THE BLOCKS FOR COMPUTATION

When code is generated for the specified control system, the computations for each subsystem must be performed in the best possible order.

The next procedure in the Linking process is to create the OBIV-Y and OBIV-X (ordered block index vector) data structures and to fill these with pointers to the block links for each subsystem in the order that the computations for these blocks should be executed in the code generated by the system.

The OBIV-Y array is a set of subarrays, one per subsystem, with pointers to each block in the subsystem. The OBIV-X array is a similar set of subarrays, with pointers to each block in the subsystem that has at least one internal state.

Generally, the generated code will first perform the output signal generating computations in the order indicated by the OBIV-Y array, and then will perform the internal state updating computations in the order indicated by the OBIV-X array.

This portion of the Linking Process is represented in pseudocode in Tables 5, 6, 6A, 6B, 6C, and 6D.

Generating OBIV-Y

Figure 20:
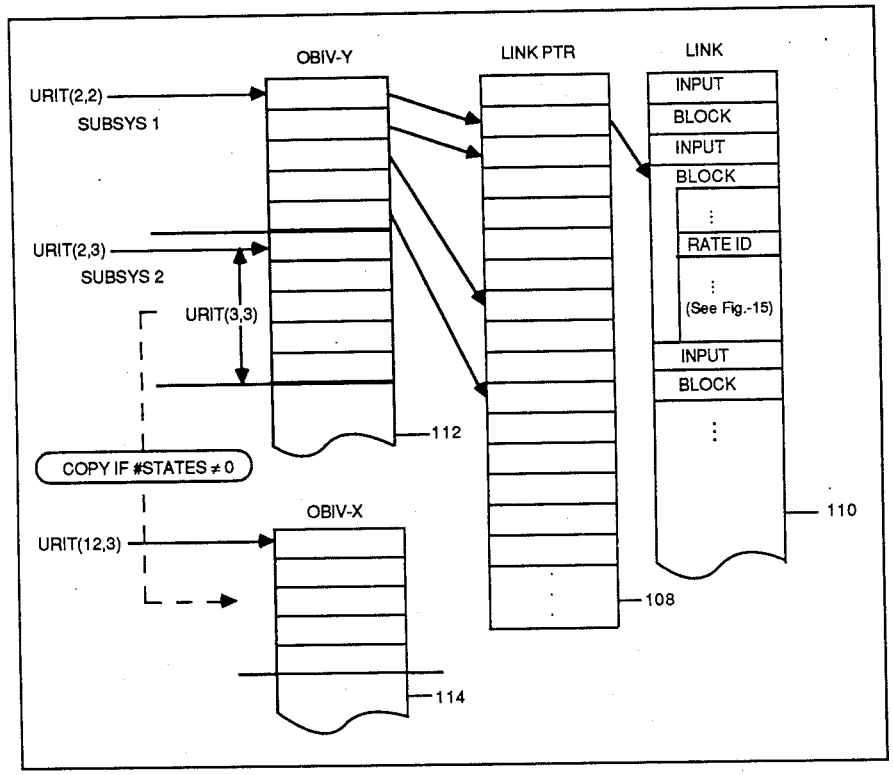
FIG. 20 depicts the relationship between the OBIV-Y array and the LINK PTR, LINK and OBIV-X arrays.

Referring to FIG. 20, the first step (see Table 5) is to create the OBIV-Y data structure. This is done by repeating the following process for each subsystem: inspecting all the links in LINK and placing pointers sequentially into the OBIV-Y array for all the block links for blocks in the subsystem.

For each subsystem, the process stores in the URIT array a pointer to the beginning of the OBIV-Y subarray for each subsystem, and the total number of blocks associated with the subsystem.

Ordering the Computations for Each Subsystem

The next step (see Table 6) is to order the block references for each subsystem in OBIV-Y in the order that it would be best to perform the computations associated with the blocks in the subsystem. The underlying goal of this step is to order the (block) computations so that, to the extent possible, the signals needed for each computation are computed before they are needed as input signals by other computations.

It is sometimes not possible to order the computations for a subsystem to meet this goal. This happens because of "hard" feedback loops. In the terminology used by the inventors of the present invention, these are called "algebraic loops".

In order for a discrete time control system to perform the computations for such a subsystem, an implied "delay" must be added in one or more places in the subsystem. The goal of the IMPLICIT routine (see Table 6C) is to minimize the number of such delays added to any subsystem. The effect of such implicit delays is to feed input signals to computational blocks one or two discrete computation cycles later than indicated by the functional description for the subsystem.

In general, it is better for the user of the code generation system to specify the placement of any signal delays in feedback loops than to have the code generator decide where to put the delays. The reason is that no method of adding implicit delays will be the best one for every engineering situation.

In the preferred embodiment, the user is warned whenever an "algebraic loop" is found and the name of the block and superblock which are treated as "implicit dynamic blocks" are identified so that the user can identify the portion of the functional description which is causing the generation of implicit delays.

Note that the following steps for ordering the blocks to OBIV-Y are repeated for each subsystem.

Figure 21:
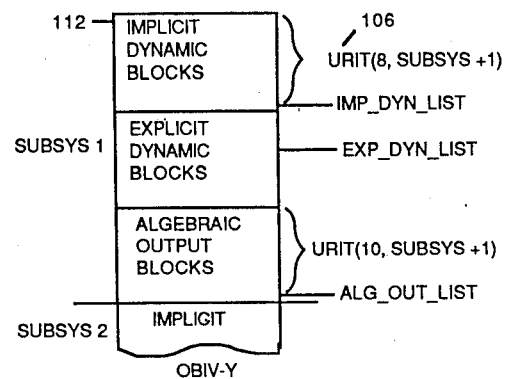
FIG. 21 is a block diagram of a subarray for one subsystem in OBIV-Y after it has been sorted in accordance with the preferred order of computations for the subsystem.

See FIG. 21 for a depiction of the Imp_Dyn_List, Exp_Dyn_List and Alg_Out_List block lists. Imp_Dyn_List is the portion of the OBIV-Y subsystem array which contains Implicit Dynamic blocks (as defined below). Exp_Dyn_List is the portion of OBIV-Y which contains Explicit Dynamic blocks. Alg_Out_List is the portion of OBIV-Y which contains Algebraic Output blocks.

As shown in FIG. 21, the blocks are ordered in OBIV-Y in the following order: Imp_Dyn_List, Exp_Dyn_List and Alg_Out_List.

Algebraic Output Blocks

The first step in ordering the blocks in OBIV-Y is to identify and order the current (R) subsystem's "Algebraic Output blocks". These are blocks with no internal states and whose outputs go only to either other subsystems or to other algebraic output blocks. Stated somewhat more technically, Algebraic Output blocks are sequentially selected by finding blocks with no internal states whose outputs affect (either directly or indirectly) only blocks in other subsystems and/or previously selected Algebraic Output blocks in the same subsystem.

The Algebraic Output block selection procedure is to look through the blocks for the current subsystem until an Algebraic Output block is found, and then to add it to the top of the Alg__Out__List, which is at the bottom of the OBIV-Y subarray for the current subsystem.

Algebraic Output blocks are identified by looking for blocks which have no internal states and whose outputs go only to either other subsystems or to other algebraic output blocks. Each time an Algebraic Output block is found, it is added to the top of the Alg__Out__List in OBIV-Y, and then the process resumes searching, restarting at the top of OBIV-Y, for other Algebraic Output blocks.

The Algebraic Output search procedure terminates when no additional Algebraic Output blocks are found in a pass through the entire set of blocks in OBIV-Y.

Explicit Dynamic Blocks

An Explicit Dynamic block is a block whose outputs can be generated using only the block's internal states and "well defined" input signals—i.e., input signals which come from other subsystems, and thus are well defined because they have been synchronized through the software bus interface; and input signals from blocks in the same subsystem that are computed before this block is computed.

Stated in a different way, Explicit Dynamic blocks are the blocks in a subsystem for which there exists an explicit block execution sequence that will provide the correct solution. The explicit block execution sequence may not be unique and may start on any block whose inputs (a) do not have a direct effect on any of its outputs, (b) come from block in other subsystems, (c) come from the system external input, or (d) come from the "Implicit Dynamic blocks".

When a part of the subsystem contains a loop where every block in the loop has an input that is directly affected by one of its inputs, then an "algebraic loop" is said to exist. The solution to this loop is "implied" to exist although no explicit block execution sequence can provide it. If one of these blocks is taken out and put in the Imp__Dyn__List list, then there may exist an explicit block execution sequence for the other blocks in the loop.

Explicit Dynamic blocks are added to the end of the Exp__Dyn__List in OBIV-Y as they are identified.

An Implicit Dynamic block is a block selected for computation when an Explicit Dynamic block can't be found. These are added to the end of the Imp__Dyn__List as they are identified.

Thus the procedure to ordering the remaining blocks in OBIV-Y for the current subsystem, i.e., those not in Exp__Out__List, is to repetitively look through the remaining unassigned blocks (i.e., those not yet assigned to Imp__Dyn__List, Exp__Dyn__List, or Alg__Out__List) for a block all of whose outputs are a function only of the blocks internal states and inputs which come from other subsystems or blocks already in Imp__Dyn__List or Exp__Dyn__List:

If a complete pass through the remaining unassigned blocks fails to find an Explicit Dynamic block, then the present inventions selects an Implicit Dynamic block and adds it to the end of the Imp__Dyn__List. Then the process for selecting Explicit Dynamic blocks resumes.

Note, that as discussed above, each time an Implicit Dynamic block is selected, an implied signal delay is generated because the inputs to the Implicit Dynamic blocks which come from other blocks in the same subsystem will be effectively delayed by two discrete computational cycles.

Implicit Dynamic Blocks

The procedure for identifying the best block to select as an Implicit Dynamic block is as follows.

The procedure is to loop through the blocks in OBIV-Y which are not already in the Imp__Dyn__List, Exp__Dyn__List, or Alg__Out__List. As these blocks are inspected, the procedure selects, from among the blocks which, if selected would allow the Explicit Dynamic search routine to find at least one more Explicit Dynamic block, the one with either the fewest output signals and, if there is a "tie" between two or more such blocks, the one with the most input signals.

If an entire pass through the available blocks finds no blocks which, if selected would allow the EXPLICIT routine to find at least one more Explicit Dynamic Block, then, as a last resort, the topmost block in the list of available is blocks is arbitrary selected.

Finally, the selected block is added to the end of Imp__Dyn__List. Also, the procedure keeps a record (in the URIT 106) of the number of Implicit Dynamic blocks selected, and the number of output signals in these blocks.

Generating OBIV-X

Referring to FIG. 20, once the OBIV-Y subarray for every subsystem has been sorted, the OBIV-X array 114 is generated simply by copying all the pointers in the OBIV-Y array 112 which point to blocks with at least one internal state. This procedure also keeps a record (in the URIT) of the number of Implicit Dynamic blocks in the OBIV-X subarray for each subsystem, and the number of output signals in these blocks.

RELINKING

Preparation for Code Generation

The purpose of the Relinking process is to prepare the system for generating code. The primary task involved is to resolve the actual software bus address to be used for every input, output, state, and temporary signal.

In the preferred embodiment, the catalog and Link Time tables (i.e., the Directory, SBRM, SBIM, LINK, LINK__PTR, URIT, and OBIV data structures) are stored on disk after the linking step. The Catalog and Link Time tables could be used to generate code in any computer language, such as ADA, PASCAL or FORTRAN.

When the user of the system 20 requests the generation of control software, the catalog and Link Time table are read back into the system's memory and the code generation process begins with the relinking step, as described below.

It should be understood that the software bus 170, which is organized as shown in FIG. 3, is a data structure which is used by the generated control software.

The software bus 170 is not used, as such, by the code generator.

The relinking process is shown in pseudocode in Table 7.

Figure 22:
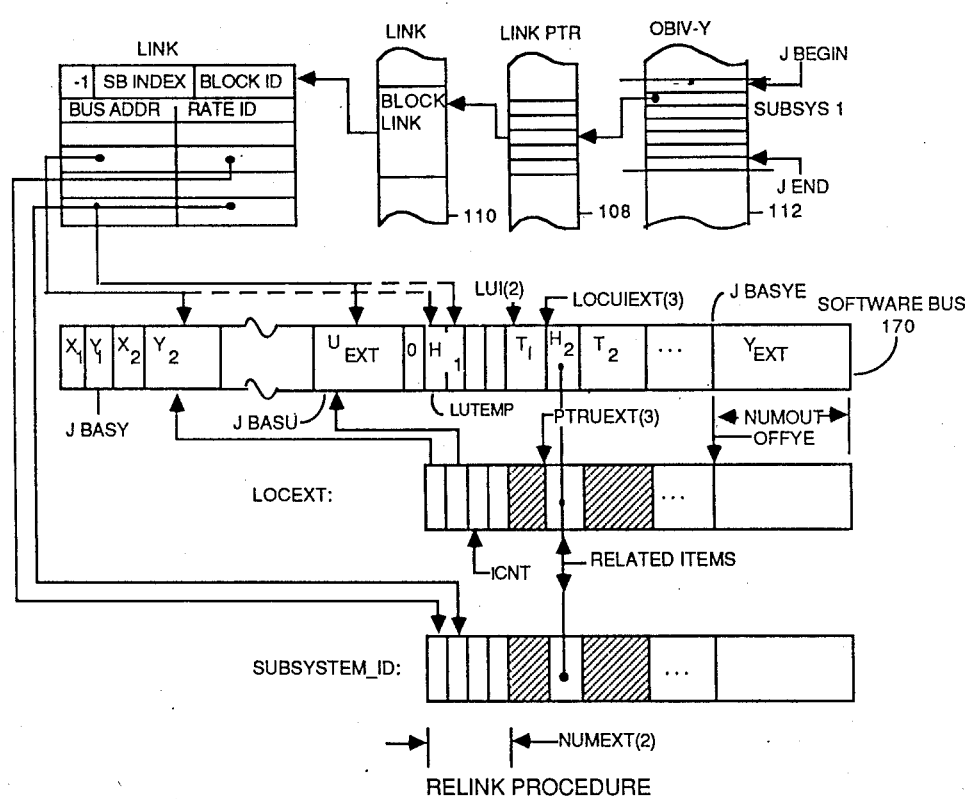
FIG. 22 is a block diagram of the data structures involved in the relink procedure of the preferred embodiment.

Referring to FIG. 22, the relink process works as follows.

The first step is to order the subsystems by sample rate, with the fastest subsystems at the top of the list. This order, represented by an array called RATE (1 to #subsystems), will be used to prioritize the computations in the generated code: the fastest subsystems will be given the highest priority.

Next, the wakeup times for each subsystem are calculated. These times are calculated in terms of integer multiples of a base time period—which is the sample time period for the fastest subsystem in the preferred embodiment. Thus for each subsystem there is an integer count IC(subsystem#) for the number of discrete time cycles between repetitions of the computations for the subsystem, and there is an integer offset IOFF(subsystem#) for the number of discrete time cycles before execution of the subsystem's calculations is first initiated.

The relink procedure checks that all specified sample rates and skews are within one percent of an integer multiple of fastest subsystem sample rate.

Referring to FIG. 3, the structure of the software bus 170 is as follows. The top of the bus contains the zero order hold buffers for all the subsystems. These are labelled $X_i$ and $Y_i$ for the state signal and output signal buffers, respectively, of subsystem i. Furthermore, this portion of the software bus is duplicated, so that the outputs from one computation cycle are not disturbed during the next. For each subsystem, there is a pointer called BusFlag(subsystem#) which indicates whether the outputs from the current computation cycle go to the Bus0 or Bus1 portion of the zero order hold.

Next, the $U_{ext}$ portion of the bus hold the external inputs to the control system. The last slot of this area is called the Zero slot—and this is where all disconnected inputs and outputs in the control system are mapped.

After the external input buffer is the sample and hold (H) and temporary (T) buffers for each subsystem. The inputs to each subsystem from other subsystems and from $U_{ext}$ are copied into the corresponding sample and hold buffer before execution of the subsystem's computations is initiated. The temporary buffers are used by individual blocks as a scratch pad memory in which to collect a contiguous set of inputs for "user blocks".

Finally, the end of the software bus 170 is an external output buffer $Y_{ext}$ for holding the control signals generated by the control system.

To determine the size (BusSize) of the portion of the software bus for holding state (X) and output (Y) signals for the entire system, the number of state and output signals in all the subsystem is totaled. This space is then allocated in the software bus 170.

Referring to FIG. 22, the location in the software bus where storage of external inputs begins is called JBASU.

JBASU=1+2*BusSize

Space is then allocated for the external inputs to the control system, and one space is allocated for the "zero" space on the bus—used as the address for disconnected input and output signals. The number of external inputs is called NumIn.

The base location in the bus for Hold and Temporary areas, which come right after the "zero" space, is called LUTEMP. Its bus address is LUTEMP=1+JBASU+NumIn Data Structures and Pointers Used in Relink The LocExt array is used to hold the bus address for output signals which are copied into Hold areas by the software bus interface in the generated code. Note that the LocExt array is "parallel" to the Hold areas of the software bus, but skips over the Temporary hold areas $T_i$.

The SubSystem_ID array, which is parallel to the LocExt array, identifies the subsystem associated with each item in the LocExt array.

ICNT is the pointer used to keep track of the next available slot in the LocExt, and SubSystem_ID arrays.

LHOLD is a pointer to the first slot in the Hold area of the bus for the current subsystem.

PTRUEXT(S#+1) points to the first slot in the LocExt array for subsystem S#.

NUMEXT(S#+1) is used to store the size of (i.e., number of slots in) the Hold area for subsystem S#.

LOCUIEXT(S#+1) is used to store the bus address for the first slot of the Hold area for subsystem S#.

LUI(S#+1) is used to store the bus address for the first slot of the Temporary area for subsystem S#.

Process for Relinking Input Signals

Referring to the pseudocode in Table 7, the following steps of the Relink process are repeated for each subsystem in order to relink each subsystem's input signals.

Pointers to the LocExt array and the Hold area of the bus for the current subsystem are calculated.

PUEXT=PTRUEXT(Subsys)+NUMEXT(Subsys)

PTRUEXT(Subsys+1)=PUEXT

LHOLD=LUTEMP+ICOUNT

LOCUIEXT(Subsys+1)=LHOLD

URIT(17,Subsys+1)=LHOLD where ICOUNT is the number of Hold and Temporary bus slots which have been previously allocated to other subsystems.

Also, the bus address JBASY of the base of the output signal portion of the bus for the current subsystem is obtained from the URIT (Unique Rate Information Table).

The relink involves processing all of the input links for all of the blocks in the current subsystem. As depicted at the top of FIG. 22, these blocks are located by using the block link pointers for the subsystem in OBIV-Y.

For each block in the current subsystem, the following steps are repeated. Using the Input Link for the block, each input signal to the block is inspected. If the input signal is from the current subsystem, the entry for the Kth input signal in the Input Link is replaced with its "absolute bus address":

LTEMP=JBASY+INLINK.BusAddr(K)−1

INLINK.BusAddr(K)=LTEMP where the INLINK template (see FIG. 18) has been overlayed on the Input Link for the current block.

In the input signal is either an external input to the control system or an input from another subsystem, then this input is mapped into the Hold area—if this same input hasn't already been mapped into the Hold area for this subsystem.

If the Kth input signal is an external input to the control system (with a RateID of zero) then the bus address of its source, in the External Input signal portion of the bus, is LTEMP=JBASU+INLINK.BusAddr(K)−1 where JBASU is the bus address of the first slot of the external input $U_{ext}$ portion of the software bus.

If the Kth input signal is an input from another subsystem, then the bus address of its source in the output signal portion of the bus for that subsystem is:

LTEMP=URIT(6,INLINK.RateID(K))+IN-LINK.BusAddr(K)−1

Before a new slot in the Hold area of the bus is allocated for this input signal, the relink process looks for redundant use of this input signal. In other words, if this input signal has already been allocated a slot in the Hold area of the bus for the current subsystem, then the previously allocated Hold slot is used as the address for this input signal.

Otherwise (if this input signal has not already been mapped into the Hold area of the bus for the current subsystem) the input signal is mapped into the Hold area as follows.

First, the RateID of the source signal is put in SubSystem_ID(ICNT). The bus address of the source signal LTEMP is stored in LocExt(ICNT). Also, the address of the Hold slot being allocated is stored in the bus address slot of the Input Link for this input signal.

Then the ICNT pointer is incremented, as is the running total of Hold slots allocated to the current subsystem:

NUMEXT(Subsys+1)=NUMEXT(Subsys+1)+1

ICNT=ICNT+1

For the purpose of sizing the Temporary hold area of the current subsystem, the relink process finds the block with the most input signals and keeps the number of its inputs stored in a variable called MaxIn. After all the blocks for the current subsystem have been processed, the bus address of the current subsystem's Temporary hold area is calculated:

LUI(Subsys+1)=LOCUIEXT(Subsys+1)-+NUMEXT(Subsys+1)

The number of external inputs to the subsystem is stored in the URIT:

URIT(18,Subsys+1)=NUMEXT(Subsys+1).

Finally, the counter ICOUNT for the number of Hold and Temporary bus slots already allocated is increased by NUMEXT(Subsys+1)+MaxIn.

Relinking External Output Signals

The last major relinking task is to relink the external output signals for the control system. To do this, the bus address of the source of each external output signal is stored in the corresponding slot of the LocExt array, and the RateID of the output signal is stored in the corresponding slot of the SubSystem_ID array.

Finally, the total storage space required for the software bus and for the relink arrays is computed as follows:

BUS_STORAGE=2*BusSize+NumIn+-1+ICOUNT+NumOut

RELINK_STORAGE=ICNT−1 where NumIn is the number of external input signals, NumOut is the number of external output signals, and ICNT is the pointer to the next available slot in the LocExt array.

Code Generation

Figure 23:
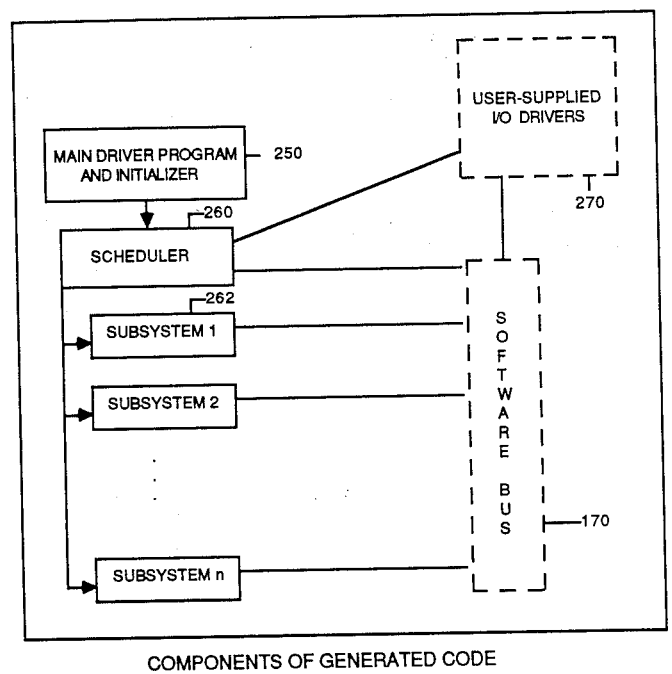
FIG. 23 is block diagram of the components of the code generated by the present invention.

FIG. 23 is block diagram of the components of the code generated by the present invention. The Main Program Driver and Initializer 250 is a program which declares data types, loads constant parameters into memory (i.e., of the control system), and creates and initializes the Scheduler 260 and other Tasks 262. It also initializes the BusFlag and Ready arrays. BusFlag(S#) indicates whether subsystem S# is currently using Bus0 or Bus1 as its zero order hold output buffer. Ready(S#) is true whenever the Task for subsystem S# has completed its computations and is ready to begin executing again.

Finally, the Main program 250 starts the Scheduler 260 running. Note that in some implementations, such as the one shown in Table 12, the functions of the Main Program can be handled by two or more separate programs, such as one for declaring data types and loading constant parameters, and another for performing the rest of the Main Program Driver functions previously mentioned.

The Scheduler 260 is the heart of the generated code, since it includes the software interface between the subsystems and controls the initiation of execution of the subsystem tasks.

Finally, the subsystem tasks 262 are separate modules for performing the computations associated with each subsystem in the control system. In the preferred embodiment, each of the subsystem modules 262 is configured as a separate task that is assigned a priority and is treated as a separate entity by the controller's multitasking operating system. In embodiments where the controller does not have a multitasking operating system, each subsystem module 262 is a configured as a subroutine called by the Scheduler 260.

The software bus 170 is not a software module—it is a data structure used by the other modules in the generated control software.

Also, the I/O drivers 270 are generally input and output driver programs supplied by the user of the system. These are not generated by the code generator of the present invention.

Scheduler

Figure 24:
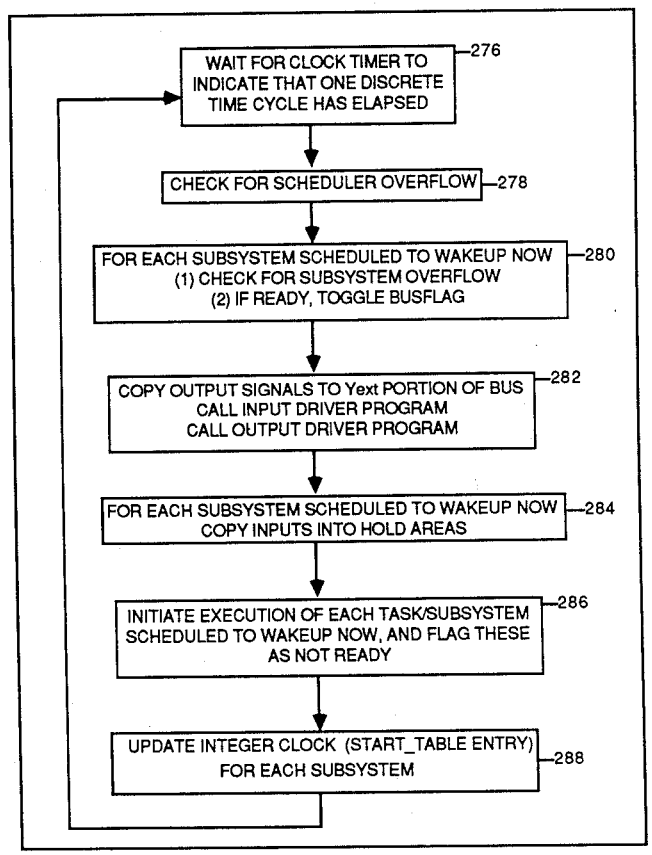
FIG. 24 is a block diagram and flow chart of the scheduler program or module generated by the present invention.

Referring to FIG. 24, there is shown a flow chart of the scheduler program or module 260 generated by the present invention. Table 8 shows a pseudocode representation of the scheduler program generated by the preferred embodiment. The following a section by section review of Table 8 and FIG. 24.

Discrete Interval Timer. Referring to FIG. 24, the scheduler wakes up (box 276) once for each time cycle, which in the preferred embodiment is equal to the time cycle for the fastest subsystem. The first thing it does is to check for "scheduler overflow"—which happens when the scheduler program itself uses more than a full time cycle to complete its tasks. Clearly, the control system cannot work if even the scheduler program alone overloads the system's computer.

Referring to Table 8, the scheduler uses the Clock() command to get the current time, and then uses the "delay" command to put itself to sleep until the next "clock tick". If, however, the current time is already past the time for the next clock tick, the program aborts because the scheduler task is unable to complete its computations in one clock tick (a condition called "Scheduler Overflow").

Check for Subsystem Overflow. Next, (box 280 in FIG. 24) for each subsystem that is scheduled to begin execution at this time (i.e., to wake up) the program checks for subsystem overflow (to see if the subsystem has completed the computations from the last time its execution was initiated) and, if the subsystem is ready, its BusFlag is toggled.

Referring to Table 8, the scheduler normally marks scheduled tasks (i.e., tasks with a Start_Table value of zero) as Not Ready before they begin execution. Also, the BusFlag for the subsystem is toggled. The BusFlag is used to indicate which half of the zero order hold (i.e., BUS0 or BUS1) other subsystems should use when using the outputs of this subsystem. It also is used to control where new outputs and state values are stored. For example, if BusFlag(2)=0, the other subsystems using outputs from subsystem 2 will get those outputs from BUS0, and subsystem 2 will write its next set of new outputs into BUS1.

However, if a scheduled task is already Not Ready (i.e., not done with the previous computation cycle) an error message or indicator is generated and the wakeup call for that task is rescheduled so that it completely skips the currently scheduled computation cycle. The wakeup call for the overflowed task is rescheduled for the next normally scheduled computation cycle for that task.

Note that completely missing a computation cycle could be disastrous in some control systems, and thus this type of error handling for subsystem overflow is shown here only to demonstrate that the control system need not shut down if subsystem overflow occurs. In alternate embodiments of the invention, the handling of Subsystem overflow could be made different for different subsystems. The scheme shown here insures that even if a subsystem "overflows", it will always perform its computations (and thus sample its inputs) only at scheduled times.

Note that the Rate array, which was generated by the Relinker, is used to determine which subsystem corresponds to each task number (1 to NTASK). In other words, the Rate array lists the subsystem tasks in the order of their priority. Thus, if Task 3 is scheduled to being execution, Rate(3) is used to identify the subsystem corresponding to Task 3 so that the subsystem's BusFlag can be toggled.

Copy Outputs to Software Bus Output Buffer. Every time the scheduler runs, all of the control system's output signals are copied into the software bus output buffer (see box 282 in FIG. 24). Both the source and destination address of these signals were calculated by the Relinker, as described above.

Referring to Table 8, the bus address for the output buffer is JBASYE. The number of output signals is NumOut. The address and subsystem of the source of each output signal is stored in the LocExt and Subsystem_ID arrays, starting at address OFFYE. However, an offset must be added to the source address to account for whether the source signal is in BUS0 or BUS1. Thus each signal is addressed by using the address value in LocExt and adding to it an offset equal to the BusFlag value for the subsystem that generated the signal multiplied times the size of BUS0 (BusSize).

Call External Input and Output Drivers. The external input driver and the external output drivers are called every time the scheduler runs (see box 282 in FIG. 24). By repeating the output copying and the calling of the External I/O Drivers every scheduler cycle, the scheduler insures that all I/O signals are transmitted in a timely fashion.

In the preferred embodiment, the input program is called before the output program to decrease the chances that transients induced by outputs signals could result in the receipt of incorrect inputs signals, which could lead to the generation of incorrect control signals.

Copy Sample and Hold Inputs for Scheduled Subsystems. Before initiating execution of the subsystem tasks, the scheduler program copies the external inputs for each scheduled subsystem into the corresponding sample and hold area in the software bus (box 284).

Referring to Table 8, for each scheduled subsystem, the scheduler locates the corresponding Hold buffer (using the LOCUIEXT array) and the list of signals to be copied—using the PTRUEXT array to point to the starting point of the list in the LocExt array. Then, in the same way as described above with respect to the copying of output signals into the output buffer, the scheduler copies the each input signal into the Hold Buffer. For each such signal it adds an offset to the source signal address so that the signal is copied from BUS0 or BUS1 in accordance with the BusFlag for the subsystem that generated the signal, and copies the signal into the Hold Buffer.

Initiate Execution of Scheduled Subsystem Tasks. The penultimate step of the Scheduler program loop is to initiate the execution of each subsystem task scheduled to wake up at this time, and these subsystem's are flagged as being "not ready" (box 286). When each subsystem task completes its computations, it toggles its own ready flag to indicate that it is then ready for the next computation cycle.

Referring to Table 8, each scheduled task (i.e., those with Start_Table(Ntsk)=0) is marked as being NOT Ready, and is given a wake up call—i.e., execution of the task is initiated. Note that this scheduler works only if the control system has a preemptive priority based multitasking operating system which allows one task to initiate the execution of other tasks.

In control systems with a multitasking operating system the scheduler merely assigns each subsystem task a priority in accordance with its sample rate and wakes up each subsystem task at the appropriate time. Then the operating system handles the sharing of the computer's resources for performing the subsystem tasks.

In control systems which do not have a multitasking operating system, the scheduler is written as an application specific operating system with the preemptive priority based multitasking function built into the scheduler's code. An example of such a scheduler program is shown in Table 9, and is discussed in more detail below.

Subsystem Timer. The last step of the scheduler's program is to update the integer clocks (i.e., Start Table entries) for all of the subsystems (box 288). This means that a counter for each subsystem is decremented, unless the counter is already equal to zero—in which case the counter is reset to its integer cycle period value. Then the scheduler goes to sleep until the end of the current discrete time cycle (box 276).

Referring to Table 8, every entry in the Start_Table array is updated: if the entry is zero, it is reset to the sample period (as stored in the Scheduling_Count array) for the corresponding subsystem; otherwise the entry is decremented.

In summary, the scheduler handles all or virtually all of the tasks required to keep the control system synchronized with its specified timing requirements, and it also includes the active portion of the software interface—the portion which implements the sample and hold buffers and the zero order hold buffers for each subsystem (i.e., all aspects of the software interface except the software bus data structure itself—which is also used by all of the subsystem tasks).

Table 9 represents in pseudocode a "stand alone" scheduler program for a control system that does not have a multitasking operating system. This is for "bare bones" controllers. All that is required is that the control system's computer include an interrupt handling mechanism for handling interrupts initiated by a clock with a programmable timing period.

Since the scheduler in Table 9 is similar to the scheduler in Table 8, only the differences between them will be discussed.

First, the stand alone scheduler does not have a discrete interval timer section because the basic timing cycle is handled by the system's clock which calls the scheduler through the system's interrupt handler.

Second, the Subsystem Timer section is at the beginning of the scheduler program rather than its end.

Third, the section which checks for Subsystem Overflow marks scheduled tasks as NOT Ready, a job handled by the execution initiation section in the multitasking scheduler.

Fourth, and this is the main difference between the two schedulers, the subsystem tasks are subroutines and the scheduler assigns each subsystem task a priority, keeps track of the priority of any tasks running when the scheduler is called, and calls scheduled tasks if they have a higher priority than any tasks interrupted by the scheduler. In contrast, in the multitasking version, the priorities of the subsystem tasks are assigned by the Main Program Driver and are handled by the multitasking operating system.

In the pseudocode shown, tasks are given a priority equal to the task's task number, and thus the highest priority tasks have the lowest priority numbers. As will be understood by those skilled in the art, it would be just as easy to implement a system with the higher priority tasks having higher priority numbers (e.g., with Priority for task N=NTASK−N).

A list of the priorities of the interrupted tasks is kept in an array or stack called OldPrio. Each time a new task is called, the priority of the currently running task is pushed onto the OldPrio stack. When the current task is finished, the last value in the OldPrio stack is popped off the stack and restored into the Priority indicator.

While the scheduler is running, interrupts are disabled, except while a subsystem task called by the scheduler is running. This prevents the scheduler from interrupting itself, except while running a subsystem task.

Each interrupted task automatically resumes running when the scheduler which interrupted it exits (i.e., returns). Note that several layers of scheduler interrupts could occur during the execution of a long subsystem task. The control system's interrupt handling mechanism takes care of resuming the execution of interrupted tasks.

Source Code Generation for Subsystem Tasks

Figure 25:
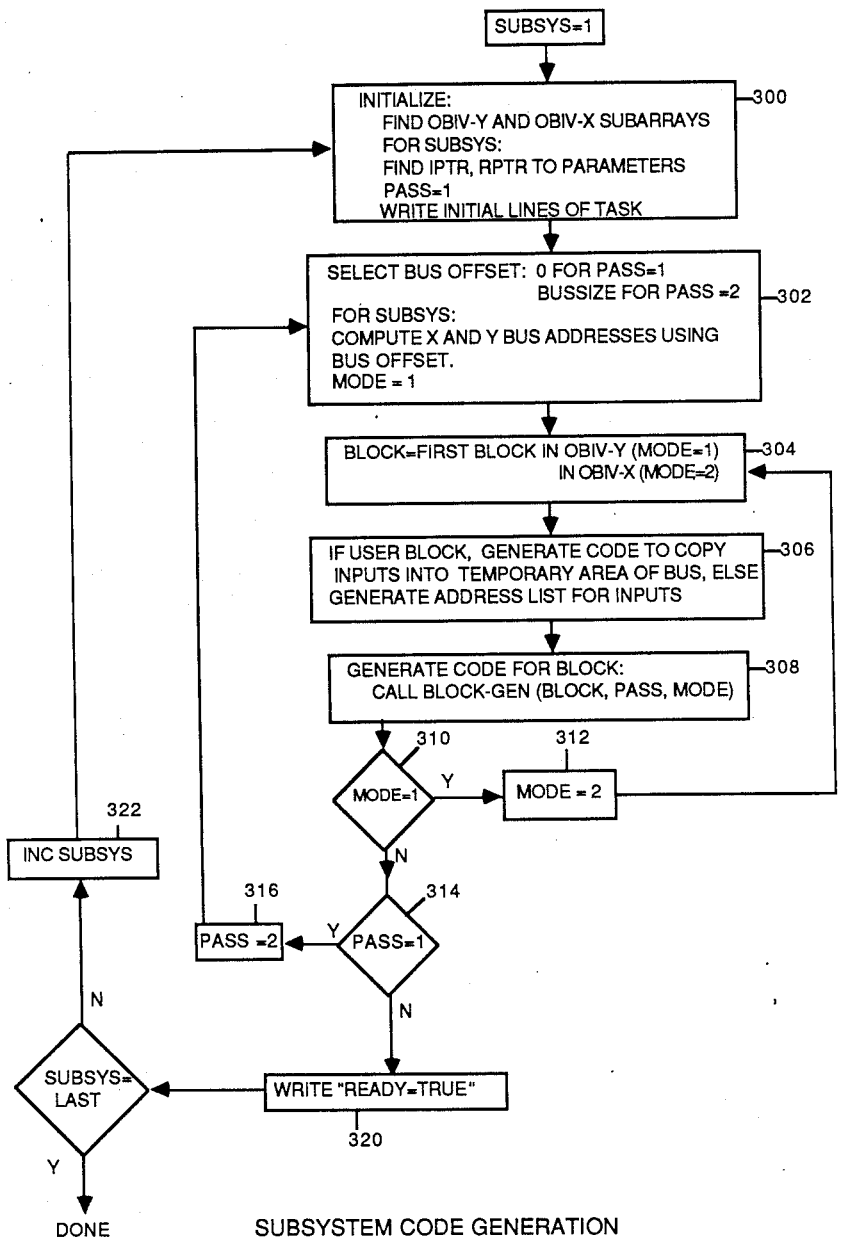
FIG. 25 is a flow chart of the process for generating code for each subsystem in the specified control system.

FIG. 25 is a flow chart of the process for generating code for each subsystem in the specified control system. Basically, the procedure is to use the OBIV-Y and OBIV-X arrays to find the blocks for each subsystem (boxes 300 and 304)) and to use the Link Time tables to compute the bus addresses used by each subsystem (box 302). Then for each subsystem the following code for a subsystem task module is generated.

First, for certain types of functional blocks, called User Blocks, the code generator requires that the input signals be located in a contiguous block of slots in the software bus. For such blocks, the subsystem task includes code for copying inputs for that block into the subsystem's temporary buffer (box 306). For all other blocks, the system generates a list of the bus addresses of all the input signals for the current block.

Next (boxes 308–316), four code sections are generated for each block: an output computation section and a state computation section for when the subsystem uses BUS0 and two similar sections for when the subsystem uses BUS1. Separate code sections are used for alternate time cycles, corresponding to the alternating use of BUS0 and BUS1, because the generated code uses absolute bus addresses to facilitate speed of execution.

The last code section for each subsystem task sets the subsystem's Ready flag to true (box 320). Then the procedure moves onto generating code for the next subsystem task (box 322).

Table 10 contains pseudocode representing the subsystem task generator which is shown in flowchart form in FIG. 25, and which is shown in the Ada language in Table 12B.

This pseudocode representation shows how the information in the OBIV-Y array and in the LINK, LINK_PTR and Catalog data structures are all used to obtain the information needed for generating the computer software for each subsystem task. In essence, the whole purpose of the task generator is to organize all the information needed for the block code generator (i.e., the program which generates the computer software for handling the computations associated with each block in the current subsystem). Thus the task generator computes or finds pointers to all the parameters and bus sections potentially needed by the block code generator.

The only part of this process not discussed above with respect to FIG. 25 is the generation of an input address list for each block. The input address list (called Ilist) is an array of bus addresses which tell the block code generator where to find each of the input signals for the current block. While this information is in the Input Link for the block, the addresses in the Input Link cannot account for which half of the zero order hold buffer is being used by the other subsystems which generate the input signals. Thus the task generator computes a list of input signal bus addresses which maps the inputs from the current subsystem into BUS0 or BUS1, depending on the current value of the subsystem's Bus-Flag. This array is passed as a parameter to the block code generator.

Table 11 shows a pseudocode representation of an exemplary portion of the block code generator. The actual Ada code for the block code generator used in the preferred embodiment is shown in Tables 12D and 12E.

Essentially, the block code generator for virtually any type of block can always be described as a sequence of instructions of the type:

```
Write - invariant code section -
X = parameter value or bus address
Write X
Write - next invariant code section
X = parameter value or bus address
Write X
``` and so on. This format can be used not only for simple calculations such as the one shown in Table 11, but also for differential equations and iterative loops. Further, it can be shown that parameter values are always obtained as follows:

Real Parameter $N = Rstack(Rparm + N - 1)$

Integer Parameter $N = Istack(Iparm + N - 1)$ and that bus address values are obtained as follows:

Old State $N = X\_old + N - 1$

New State $N = X\_new + N - 1$

New Output $N = Yptr + N - 1$

Input $N = Ilist(N)$.

where Rparm, Iparm, X_old, X_new, Yptr and Ilist are parameters passed to the block code generator by the task generator program.

Finally, if the number of inputs is variable—such as for a summing junction, a parameter passed to the block code generator, called #input, is used to determine how many input addresses are listed in the Ilist array.

Example of Ada Source Code Generator

Figure 26:
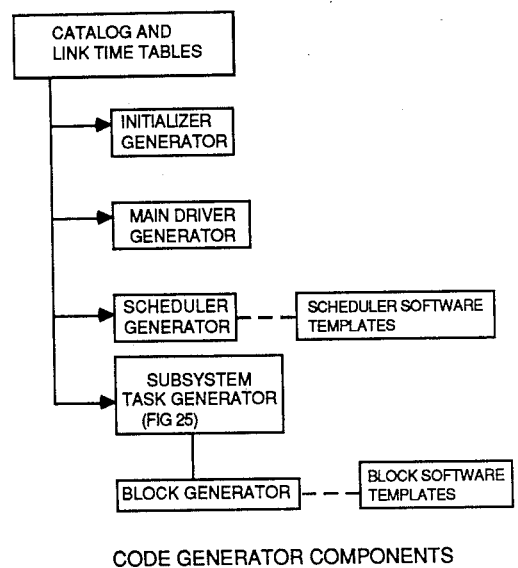
FIG. 26 is a block diagram of the code generating components of the preferred embodiment.

FIG. 26 is a block diagram of the code generating components of the preferred embodiment. A preferred embodiment of each of these code generating components, written in Ada, is shown in Tables 12–12E.

Table 12 shows a side by side comparison of the preferred embodiment of the code generator and the code generated thereby for the control system shown in FIG. 3.

Table 12A shows the preferred embodiment of the code generator for generating the code of the Initializer portion of the Main Driver Program and Initializer 250.

Table 12B shows the preferred embodiment of the task generator program for generating program modules for each subsystem in the control system.

Table 12C shows the software templates used in the preferred embodiment to generate the Scheduler module 260 and certain portions of the Main Driver Program 250.

Table 12D shows the preferred embodiment of the routine which generates the code for each block in each subsystem.

Table 12E shows the software templates used in the preferred embodiment to generate code for the control system shown in FIG. 3.

Multiprocessor Implementation of Control System

The present invention is intentionally designed to allow the generation of code for both single CPU (central processing unit) and multiple CPU controllers. This versatility is due primarily to the provision of a unified interface (i.e., the software bus 170) between the different tasks generated by the code generator, and the use of a single task (i.e., the scheduler) for coordinating all the activities of the controller. As a result of this design, it makes little difference where computations are performed as long as the results are deposited in the proper slots of the software bus with the specified time constraints.

The primary reasons for using a multiprocessor controller is to allow more than one set of computations to be performed at a time. The present invention provides a natural boundary for dividing up the control software for a control system: each subsystem task can be allocated to a different CPU without having to take into concern how that task will interface with the others.

Figure 27:
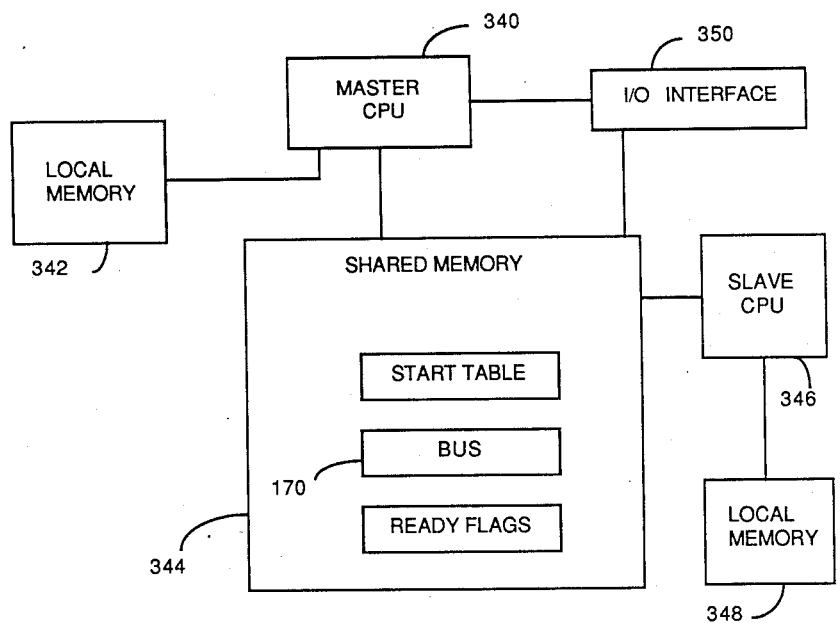
FIG. 27 is a block diagram of a multiprocessor implementation of a control system using control software generated by the present invention.

Referring to FIG. 27, there is shown a multiprocessor implementation of a control system using control software generated by the present invention. In this example, there is a master CPU 340 which is used to run the scheduler, the I/O External Driver programs (for reading in input signals and transmitting output signals through the I/O interface 350), and possibly one or more subsystem tasks. The master CPU 340 can have a local memory 342 in addition to memory 344 shared with the other (slave) CPUs 346. Each slave CPU can also have a local memory 348 in addition to being able to use the shared memory 344.

The assignment of subsystem tasks to either the master CPU 340 or to a slave CPU 346 is completely dependent on the expected computational burden that each subsystem task will put on a CPU, and how these burdens can be best distributed.

The scehduler task controls the execution of tasks in the slave CPU(s) 346 merely by updating the Start_Table—which is in the shared memory 344. The slave CPU 346 is programmed to look at the Start_Table and to initiated execution of any of its assigned subsystem tasks which have a Start_Table entry equal to zero. When the slave CPU 346 computes new outputs and states it puts these in the software bus 170, and upon completion it sets the Ready flag for the completed subsystem task to True. Thus, at a minimum, the shared memory 344 need only include the Start_Table, the software bus 170, and the Ready flag array.

Alternate Embodiments of the Invention

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Determining Order of Computation. For instance, in the block ordering portion of the linking process, the selection and treatment of Implicit Dynamic blocks could be handled in a variety of different ways. For instance, the computation ordering process could be changed so that when an Implicit Dynamic block needs to be selected, the process selects the block with the fewest inputs that are not "well defined".

Zero Order Hold. As will be understood by those skilled in the art, a zero order hold can be implemented in a number of different ways. For instance, the use of two identical buffers, such as BUS0 and BUS1 in the preferred embodiment, can be replaced with a "public buffer" plus a mechanism for updating the contents of that buffer at specified times.

Pseudorate Scheduler. In the preferred embodiment, the scheduler's discrete time interval, or clock tick rate, is equal to the sample period of the fastest subsystem in the control system. Further, all sample periods and skews must be an integer multiple of the scheduler's basic time interval. In alternate embodiments, however, the scheduler could run at a faster rate than the fastest subsystem, so that the control system can include subsystems which have sample periods not equal to the an integer multiple of the fastest subsystem's sample period. For instance, the scheduler could have a discrete time interval of 20 milliseconds and the two fastest subsystems could have sample periods of 40 milliseconds and 60 milliseconds.

Handling Trigger Tasks. While trigger tasks have been discussed above, the preferred embodiment does not handle trigger tasks. However, the addition of trigger tasks to the preferred embodiment would be done as follows. First, superblocks would be flagged as using either a trigger condition or a periodic computation rate. The sample period parameter would still be specified to indicate the priority that should be given to the subsystem task incorporating the superblocks using the trigger condition. The skew parameter would be used to specify the trigger condition for the subsystem by providing an index into a library of available trigger conditions. The main other change needed would be to upgrade the scheduler to test for trigger conditions and to initiate the execution of triggered subsystem tasks. The Start_Table mechanism could be expanded, or a separate array for triggered subsystems could be provided, to indicate when triggered subsystems are to begin execution.

TABLE 1

PSEUDOCODE FOR SBRM BUILDING PROCESS
see process steps in Figure 12

```
INITIALIZE
Allocate 3 by 7 memory array for Directory
Directory.SBRM.Addr = next available memory location
                      after Directory

#Block_Ref  = 0           -- Refs to SBs and basic Bs
#Block_Total = 0          -- Total # of basic Bs
SBIM_Off = 0              -- index into SBIM
Block# = 0

BEGIN SB
SBRM(2,SB_INDEX) = LEVEL
SBRM(3,SB_INDEX) = Block#     -- BlockID of Block in parent SB
SBRM(4,SB_INDEX) = I ptr      -- SB Header address
SBRM(5,SB_INDEX) = R ptr
SBRM(6,SB_INDEX) = C ptr
SBRM(7,SB_INDEX) = SBIM_Off
SBIM_Off = SBIM_Off + 2 + #BLOCKS --Check for Recursive nesting of SBs by looking for SB name at
--two different levels in the same SBRM branch
L = LEVEL - 1
Loop: Do for I = SB_INDEX - 1 to 1 by -1
    IF (SBRM(2,I) = L) Then
        -- Check SB name against name pointed at by SBRM(6,I)
        IF current SB name = Cstack( SBRM(6,I) ) Then
            Error (recursive nesting)
        Else
            L = L - 1
        Endif
    Endif
End_Loop --Check for I/O dimension mismatch for the current SB
```

```
If LEVEL > 1 Then
    If #inputs (Block Reference in Parent SB) < #Ext.In (SB)
    Then
        Error (too few inputs)
    Endif
    If #outputs(Block Reference in Parent SB) > #Ext.Out(SB)
    Then
        Error (too few outputs)
    Endif
Endif END SB
- null -
RESUME SB
- null -

BEGIN BLOCK
#Block_Ref = #Block_Ref + 1

END BLOCK
#Block_Total = #Block_Total + 1

TERMINATE
Directory.SBRM.Row = 7
Directory.SBRM.Col = #SB

Allocate Memory for SBIM: #Block_Ref + 2 * #SB
Directory.SBIM.Addr = Directory.SBRM.Addr +
                      Directory.SBRM.Row * Directory.SBRM.Col
Directory.SBIM.Row = #Block_Ref + 2 * #SB
Directory.SBIM.Col = 1

--Identify unique rates (i.e., subsystems) and allocate URIT
Directory.URIT.Addr = Directory.SBIM.Addr +
                      Directory.SBIM.Row * Directory.SBIM.Col

#Rates = 1
URIT(1,#Rates) = 0

Loop: Do for I = 1 to #SB
    Locate SuperBlock I in the catalog using SBRM(4-6,I)
    Samp_Ptr = R stack ptr to Run Time section of SuperBlock I
    If (Sample Interval and Skew of Superblock I matches any of
    those stored at URIT(1,R) for R = 2 to #Rates) Then
        SBRM(1,I) = R
    Else
        #Rates = #Rates + 1
        URIT(1,#Rates) = Samp_Ptr
        SBRM(1,I) = #Rates
    Endif
End_Loop
Directory.URIT.Row = 19
Directory.URIT.Col = #Rates Allocate Memory for LINK_PTR: #SB + #Block_Ref + #Block_Total
Directory.LINK_PTR.Addr = Directory.URIT.Addr +
                          Directory.URIT.Row * Directory.URIT.Col
Directory.LINK_PTR.Row = #SB + #Block_Ref + #Block_Total
Directory.LINK_PTR.Col = 1
```

TABLE 2

PSEUDOCODE FOR CREATING SBIM, LINK PTR AND BUILDING BLOCK AND CONNECTION LINKS
see process steps in Figure 12

```
INITIALIZE
Directory.LINK.Addr = Directory.LINK_PTR.Addr +
                  Directory.LINK_PTR.Row * Directory.LINK_PTR.Col
Zero SBIM array
Zero rows 2 through 19 of URIT array
Link_Space = 0                      -- Ptr to end of LINK array
Link# = 0

BEGIN SB
SBIM_Off = SBRM(7,SB_INDEX)
SBIM(SBIM_Off + 2) = Link#

END SB
-- Build External Output Link: Link Type = 0
Link# = Link# + 1
LINK_PTR(Link#) = Link_Space + 1

-- Get current SB's #Ext_Out
#Ext_Out = #Ext.Out from Header of current SuperBlock
LINK(Link_Space + 1) = 0            -- Link Type
LINK(Link_Space + 2) = SB_INDEX
LINK(Link_Space + 3) = 0            -- BlockID
Link_Space = Link_Space + 3 + 2 * #Ext_Out -- Put pointer to Output Link in SBIM
SBIM_Off = SBRM(7,SB_INDEX)
SBIM(SBIM_Off + 1) = Link#          -- LINK PTR for this LINK RESUME SB
-- Put pointer to Lower Level SB Output Link in SBIM for BLOCK#
SBIM_Off = SBRM(7,SB_INDEX)
SBIM(SBIM_Off + 2 + BLOCK#) = Link#

BEGIN BLOCK
-- Create Block Input Link: Link Type = -1
Link# = Link# + 1
LINK_PTR(Link#) = Link_Space + 1

#Inputs = #Inputs from Block Header of current Block
LINK(Link_Space + 1) = -1
LINK(Link_Space + 2) = SB_INDEX
LINK(Link_Space + 3) = BLOCK#
Link_Space = Link_Space + 3 + 2 * #Inputs
END BLOCK
-- Create Block Link
Link# = Link# + 1
-- Put address of Block Link in LINK_PTR array
LINK_PTR(Link#) = Link_Space + 1

#Outputs = #Outputs from Block Header of current Block
#States  = #States  from Block Header of current Block
Iptr = pointer to integer parameters for current Block
Rptr = pointer to real parameters for current Block
Hptr = pointer to header for current Block RateID = SBRM(1,SB_INDEX)
```

```
Last_Link# = Link# -1
LINK(Link_Space + 1) = BLOCK_TYPE     -- of current Block
LINK(Link_Space + 2) = SB_INDEX
LINK(Link_Space + 3) = BLOCK#
LINK(Link_Space + 4) = Iptr
LINK(Link_Space + 5) = Rptr
-- Pointer to Input Link for the current block:
LINK(Link_Space + 6) = LINK_PTR(Last_Link#) + 3
-- Pointer to States section of Software Bus
LINK(Link_Space + 7) = URIT(5,RateID) + 1
-- Pointer to Outputs section of Software Bus
LINK(Link_Space + 8) = URIT(7,RateID) + 1
LINK(Link_Space + 9) = RateID
LINK(Link_Space + 10) = Hptr
Link_Space = Link_Space + 10

-- Increment State and Output Software Bus pointers
URIT(5,RateID) = URIT(5,RateID) + #States
URIT(7,RateID) = URIT(7,RateID) + #Outputs -- Put LINK PTR reference for Block Link in SBIM
SBIM_Off = SBRM(7,SB_INDEX)
SBIM(SBIM_Off + 2 + Block#) = Link#

TERMINATE
-- Compute Software Bus Addresses for State (X) and Output (Y)
-- components of zero order hold for each subsystem
URIT(4,1) = 1
URIT(6,1) = 1

Loop: Do for RateID = 2 to #Rates
    URIT(4,RateID) = URIT(6,RateID - 1) + URIT(7,RateID - 1)
    URIT(6,RateID) = URIT(4,RateID)     + URIT(5,RateID)
End_Loop Directory.LINK.Row = Link_Space
Directory.LINK.Col = 1
```

TABLE 3

PSEUDOCODE FOR RESOLVING OUTPUT LINKS
see
case model for Output Links in Figure 17
and
data structure templates in Figure 18

```
-- Loop through Links and process Output Links
Loop for LINK# = 1 to Directory.LINK_PTR.Row     -- = last link
    Type = LINK(LINK_PTR(LINK#))

-- Proceed to next link if this is not an Output Link
    If Type ≠ 0 Then LoopNext Adr =  LINK_PTR(LINK#)
    Overlay OUTLINK on LINK(Adr)
    SBIndex = OUTLINK.SBIndex -- Find (in Catalog) Connection Section for Superblock
    -- corresponding to this Output Link, and Overlay GENERIC on
    -- it
    SB_header = SBRM.IPTR(SBIndex)
    #OUT = SB_header.#Ext.Out
    SB_ConnList = SB_header + SectionOffset(Connection,Istack)
    Overlay GENERIC on SB_ConnList
```

```
-- Process each output connection for the block
Loop For chan# = 1 to #OUT
    B# = GENERIC.Block#(chan#)
    C# = GENERIC.Channel#(chan#)

-- Case I: Disconnected Channel
    -- Connect output to permanent 0 on bus, which is at the
    -- end of the External Input portion of the bus.
    -- #Ext.In = # of external inputs to top level SB.
    If (B# = 0 and C# = 0) Then
        OUTLINK.BusAddr(input#) = #Ext.In + 1
        OUTLINK.RateID(input#)  = 0
        LoopNext
    Endif -- Locate Link corresponding to output#
    SBIM_offset = SBRM(7,SBIndex)
    LPTR_ndx    = SBIM(SBIM_offset + 2 + B#)
    Adr         = LINK_PTR(LPTR_ndx)
    LINK_type   = LINK(Adr)

-- Note that B# will always be greater than zero because
    -- the authoring system will not allow external outputs
    -- to be connected directly to external inputs
        -- Case II: External Output from SB
        If LINK_type = 0 Then
            Overlay EXTLINK on LINK(Adr))
            OUTLINK.BusAddr(chan#) = EXTLINK.BusAddr(C#)
            OUTLINK.RateID (chan#) = EXTLINK.RateID (C#)
            LoopNext
        Endif -- Case III: Output From a Block
        If LINK_type > 0 Then
            Overlay BLKLINK on LINK(Adr)
            OUTLINK.BusAddr(chan#) = BLKLINK.YPTR + C# -1
            OUTLINK.RateID (chan#) = BLKLINK.RateID
            LoopNext
        Endif
    End_Loop
End_Loop
```

TABLE 4

PSEUDOCODE FOR RESOLVING INPUT LINKS
see
case model for input links in Figure 19
and
data structure templates in Figure 18

```
-- Loop through Links and process Input Links
Loop for LINK# = 1 to Directory.LINK_PTR.Row    -- = last link
    Type = LINK(LINK_PTR(LINK#))

-- Proceed to next link if this is not an input link
    If Type ≠ -1 Then LoopNext -- Find Block Header for this Input Link
    Adr =   LINK_PTR(LINK#)
    Overlay INLINK on LINK(Adr)
    SBIndex = INLINK.SBIndex
    BlockID = INLINK.BlockID
```

```
SB_header  = SBRM.IPTR(SBIndex)
BLKs       = SB_header + SectionOffset(Block,Istack)
BLK_header = BLKs + BlockOffset(BlockID,Istack)
IN        = BLK_header.#inputs -- Point to Connection List for Block and Overlay GENERIC
BLK_ConnList = BLK_header + SectionOffset(Connection,Istack)
Overlay GENERIC on BLK_ConnList -- Process each input connection for the block
Loop For input# = 1 to #IN
    B# = GENERIC.Block#(input#)
    C# = GENERIC.Channel#(input#)

-- Case I: Disconnected Channel
    -- Connect input to permanent 0 on bus, which is at the
    -- end of the External Input portion of the bus.
    -- #Ext.In = # of external inputs to top level SB.
    If (B# = 0 and C# = 0) Then
        INLINK.BusAddr(input#) = #Ext.In + 1
        INLINK.RateID(input#)  = 0
        LoopNext
    Endif -- Case II: Top-Level External Input
    If (B# = 0 and INLINK.SBIndex = 1) Then
        INLINK.BusAddr(input#) = C#
        INLINK.RateID(input#)  = 0
        LoopNext
    Endif
        -- Locate Link corresponding to input#
        SBIM_offset = SBRM(7,SBIndex)
        LPTR_ndx    = SBIM(SBIM_offset + 2 + B#)
        Adr         = LINK_PTR(LPTR_ndx)
        LINK_type   = LINK(Adr)

-- Case III: B# = 0, External Input to SB
        If LINK_type = - 1 Then
            Overlay EXTLINK on LINK(Adr))
            INLINK.BusAddr(input#) = EXTLINK.BusAddr(C#)
            INLINK.RateID (input#) = EXTLINK.RateID (C#)
            LoopNext
        Endif -- Case IV: External Output from SB
        If LINK_type = 0 Then
            Overlay OUTLINK on LINK(Adr)
            INLINK.BusAddr(input#) = OUTLINK.BusAddr(C#)
            INLINK.RateID (input#) = OUTLINK.RateID (C#)
            LoopNext
        Endif -- Case V: Output From a Block
        If LINK_type > 0 Then
            Overlay BLKLINK on LINK(Adr)
            INLINK.BusAddr(input#) = BLKLINK.YPTR + C# -1
            INLINK.RateID (input#) = BLKLINK.RateID
            LoopNext
        Endif
    End_Loop
End_Loop
```

TABLE 5

PSEUDOCODE FOR CREATING OBIV-Y
see
data structures in Figure 20

```
#RateID = Directory.URIT.Col           -- = max RateID
Link   = Directory.LINK_PTR.Row       -- = number of links --Step A: Generate OBIV-Y
Directory.OBIV-Y.Addr = Directory.LINK.Addr +
                       Directory.LINK.Row * Directory.LINK.Col
OBPTR     = 1

Loop for R = 2 to #RateID

URIT(2,R) = OBPTR

-- Loop through Links and process Block Links
    Loop for LINK# = 1 to #Link
        Adr  = LINK_PTR(LINK#)
        Type = LINK(Adr)

-- Proceed to next link if this is not a Block Link
        If Type < 1 Then LoopNext -- Proceed to next link if this Block's RateID ≠ R
        Overlay BLKLINK on LINK(Adr)
        If R ≠ BLKLINK.RateID Then LoopNext -- Place pointer for Block Link in OBIV-Y
        OBIV(OBPTR) = LINK#
        OBPTR = OBPTR + 1
        URIT(3,R) = URIT(3,R) + 1
    End_Loop
End_Loop
Directory.OBIV-Y.Row = OBPTR - 1
Directory.OBIV-Y.Col = 1
```

TABLE 6

PSEUDOCODE FOR ORDERING OBIV-Y AND OBIV-X

```
#RateID = Directory.URIT.Col           -- = max RateID

Loop for R = 2 to #RateID

-- Segregate out and sort all "Algebraic Output Blocks".
    -- These are blocks with no internal states, and
    -- which have no outputs which affect any
    -- non-algebraic output blocks in the same subsystem.
    -- Blocks are ordered so that signals flow from input
    -- of subsystem to output.

CALL ALGEBRAIC (R)          --  See Table 6A

-- Next, segregate out and order Explicit and Implicit
Blocks.
    -- Explicit Dynamic Blocks are blocks whose outputs can be
    -- generated using only the block's internal states and
    -- "well defined" input signals - i.e., input signals which
    -- come from other subsystems, and thus are well defined
```

```
    -- because they have been synchronized through the software
    -- bus interface; and inputs signals from blocks in the same
    -- subsystem that are computed before this block is computed.

-- Implicit Dynamic Blocks are blocks that are removed from
    -- loops in the subsystem where each block in the loop has
    -- inputs that directly affect outputs.  These are called
    -- "implicit" blocks because in discrete control systems they
    -- generate implicit timing delays in the propogation of
    -- signals through the subsystem.

CALL EXPLICIT (R)             -- See Tables 6B and 6C

End_Loop

-- Resulting OBIV-Y is ordered as follows:
    -- Implicit Blocks / Explicit Blocks / Algebraic Blocks CALL OBIV-X          -- Copy relevant portions of OBIV-Y
                     -- See Table 6D
```

TABLE 6A

PSEUDOCODE FOR "ALGEBRAIC" ROUTINE
for
selecting "ALGEBRAIC" blocks in OBIV-Y

```
Parameters: R

First = URIT(2,R)
Last  = URIT(2,R) + URIT(3,R) - 1
Alg#  = 0
Sig#  = 0

Flag = True

Loop: Do While Flag

-- Loop through OBIV-Y for RateID = R and
    -- and select blocks not in Alg_Out List with #state = 0
    -- Loop terminates when no Algebraic Output blocks are
    -- found in an entire pass through the subsystem.
    Flag = False
    Loop for I = First to Last
        LINK# = OBIV-Y(I)
        Adr = LINK_PTR( LINK# )
        Overlay BLKLINK on LINK(Adr)
        BLK_HDR = BLKLINK.HPTR
        If BLK_HDR.#states = 0 Then
            If ( (BLK_HDR.#outputs = 0)
                 OR (none of the output channels of this block go
                 to other blocks in this subsystem not in the
                 Alg_Out_List) ) Then
                -- Add LINK# to Alg_Out_List:
                Loop for J = I to Last-1
                    OBIV-Y(J) = OBIV-Y(J+1)
                End_Loop
                OBIV-Y(Last) = LINK#
                Last = Last - 1
                Flag = True
                Alg# = Alg# + 1
                Sig# = Sig# + BLK_HDR.#outputs
            Else
```

```
            LoopNext
        Endif
    Endif
End_Loop
End_Loop

URIT(10,R) = Alg#        -- Number of Algrebraic Decoder Blocks
URIT(11,R) = Sig#        -- Number of Algrebraic Decoder Outputs
```

TABLE 6B

PSEUDOCODE FOR "EXPLICIT" ROUTINE
for
selecting "EXPLICIT DYNAMIC" blocks in OBIV-Y Parameters: R

```
First = URIT(2,R)
Last  = URIT(2,R) + URIT(3,R) - 1 - URIT(10,R)
#Exp  = 0

Flag = True

Loop: Do While Flag
    If First = Last Then
        LINK# = OBIV-Y(First)
        Call AddExp(First,Last,#Exp,LINK#)
        LoopExit
    Endif
    -- Loop through nonalgebraic blocks in OBIV-Y for RateID = R
    -- which are not already in the Imp_Dyn_List or Exp_Dyn_List.
    -- Select blocks which have outputs which are a function only
    -- of their internal states and inputs from (a) other
    -- subsystems or blocks already in Imp_Dyn_List or
    -- Exp_Dyn_List.  Add these blocks to the end of
    -- Exp_Dyn_List.
    -- If an entire pass through the available blocks finds no
    -- blocks to add to Exp_Dyn_List, then call IMPLICIT to
    -- select the best implicit block to add to Imp_Dyn_List.
    Flag = False
    Loop for I = First to Last
        LINK# = OBIV-Y(I)
        Adr = LINK_PTR(LINK#)
        Overlay BLKLINK on LINK(Adr)
        BLK_HDR = BLKLINK.HPTR
        If (BLK_HDR.#inputs = 0) Then
            Call AddExp(I,Last,#Exp,LINK#)
            Flag = True
            LoopExit
        Endif
        If (none of the outputs of this block are a direct
            function of the inputs to the block) Then
            Call AddExp(I,Last,#Exp,LINK#)
            Flag = True
            LoopExit
        Endif
        -- If every input of a block satisfies at least one of
        -- the following three conditions, then the block can be
        -- added to the Exp_Dyn_List:
        --   1. The input comes from a block with a different --
              Rateid than the current block.
```

```
            -- 2. No output of this block is a direct function of --
                  this input .
            -- 3. The inputs comes from a block already in --
                  Imp_Dyn_List or Exp_Dyn_List
            Overlay INLINK on LINK( BLKLINK.UPTR - 3 )
            OkayFlag = True
            Loop for K = 1 to BLK_HDR.#inputs
                If ( INLINK.RateID(K) ≠ BLKLINK.RateID
                     OR (no output of this block is a direct function
                         of the Kth input (i.e., INLINK.BusAddr(K)) )
                     OR (the Kth input comes from the output of a
                         block already in Imp_Dyn_List or
                         Exp_Dyn_List) )
                    Then
                        LoopNext
                Else
                        OkayFlag = False
                        LoopExit
                Endif
            End_Loop
            If OkayFlag Then
                    Call AddExp(I,Last,#Exp,LINK#)
                    Flag = True
                    LoopExit
            Endif End_Loop
    -- If no Explicit Dynamic Blocks were found in a pass through
    -- the entire list of blocks, call IMPLICIT
    If NOT Flag Then Call IMPLICIT(R,First,Last)
    Flag = True
End_Loop Subroutine: AddExp(I,Last,#Exp,LINK#)
-- Add block at I to end of Exp_Dyn_List and
-- moves the other blocks in OBIV-Y up one position.
Loop for J = I to Last-1 + #Exp
    OBIV-Y(J) = OBIV-Y(J+1)
End_Loop
OBIV-Y(Last) = LINK#
Last = Last - 1
#Exp = #Exp + 1
```

TABLE 6C

PSEUDOCODE FOR "IMPLICIT" ROUTINE
for
selecting "IMPLICIT DYNAMIC" blocks in OBIV-Y Parameters: R, First, Last -- Methodology: Loop through the nonalgebraic blocks in OBIV-Y
-- for RateID=R which are not already in the Imp_Dyn_List or
-- Exp_Dyn_List. Select, from among the blocks which, if selected
-- would allow the EXPLICIT routine to find at least one more
-- Explicit Dynamic block, the one with either the fewest output
-- signals or the one with the most input signals.
-- Add this block to the end of Imp_Dyn_List.
-- If an entire pass through the available blocks finds no blocks
-- which, if selected would allow the EXPLICIT routine to find at

```
-- least one more Explicit Dynamic Block, then, as a last resort,
-- just add the topmost block in the list to the end of
-- Imp_Dyn_List.

Sub_optimal_block = 0              -- Pts to block to add to Imp
Max_U = 0                          -- #inputs in best block which
                                   -- could be added to Imp_Dyn_List
Min_Y = URIT(7,R)                  -- #outputs in best block which
                                   -- could be added to Imp_Dyn_List Loop for I = First to Last
    LINK# = OBIV-Y(I)
    Adr = LINK_PTR(LINK#)
    Overlay BLKLINK on LINK(Adr)
    BLK_HDR = BLKLINK.HPTR
    If (EXPLICIT routine would find at least one additional
        Explicit Dynamic block, if this block were added to
        Imp_Dyn_List) Then
        If ( (BLK_HDR.#outputs < Min_Y)
        OR (    (BLK_HDR.#outputs  =   Min_Y)
            AND (BLK_HDR.#inputs  > Max_U) ) )
            Then
            Min_Y = BLK_HDR.#outputs
            Max_U = BLK_HDR.#inputs
            Sub_optimal_block = I
        Endif
    Endif
End_Loop -- Selection of the last resort
If Sub_optimal_block = 0 Then
    Sub_optimal_block = First
Endif
-- Add Sup_optimal_block to Imp_Dyn_List:
LINK# = OBIV-Y(Sub_optimal_block)
Loop for J = Sub_optimal_block to First + 1 by -1
    OBIV-Y(J) = OBIV-Y(J-1)
End_Loop OBIV-Y(First) = LINK#
Adr = LINK_PTR(LINK#)
Overlay BLKLINK on LINK(Adr)
BLK_HDR = BLKLINK.HPTR
First = First + 1
-- Increment number of Implicit Blocks for RateID R
URIT(8,R) = URIT(8,R) + 1
-- Increment number of Implicit Signals
URIT(9,R) = URIT(9,R) + BLK_HDR.#outputs
```

TABLE 6D

PSEUDOCODE FOR GENERATING OBIV-X

```
Directory.OBIV-X.Addr = Directory.OBIV-Y.Addr +
                Directory.OBIV-Y.Row * Directory.OBIV-Y.Col
OBPTR = 1

Loop for R = 2 to #RateID

URIT(12,R) = OBPTR
```

```
    First    = URIT(2,R)
    Last     = URIT(2,R) + URIT(3,R) - 1
    ImpLast  = First + URIT(8,R) - 1

-- Loop through OBIV-Y for RateID = R and
    -- and select blocks with #state ≠ 0
    Loop for I = First to Last
        LINK# = OBIV-Y(I)
        Adr = LINK_PTR(LINK#)
        Overlay BLKLINK on LINK(Adr)
        BLK_HDR = BLKLINK.HPTR
        IF BLK_HDR.#states ≠ 0 Then
            OBIV-X(OBPTR) = LINK#
            OBPTR = OBPTR + 1
            URIT(13,R) = URIT(13,R) + 1
            If I ≤ ImpLast
                URIT(14,R) = URIT(14,R) + 1
                URIT(15,R) = URIT(15,R) + BLK_HDR.#states
            Endif
        End_Loop
End_Loop
Directory.OBIV-X.Row = OBPTR - 1
Directory.OBIV-X.Col = 1
```

TABLE 7

PSEUDOCODE FOR RELINKING SUBSYSTEMS

```
Ntasks = Directory.URIT.Col - 1          -- # of subsystems

-- Calculate Sample Frequency from Sample Period
Loop for I = 1 to Ntasks
    F(I)    = 1.0 / Rstack( URIT(1,I+1) )
    Skew(I) = Rstack( 1 + URIT(1,I+1) )
    Rate(I) = I + 1
End_Loop -- Sort subsystems by Sample Rate, with fastest subsystems
-- at the top of the list
Sort F(I), Skew(I), Rate(I) by F(I) in descending order
-- For equal Sample Rates, sort by increasing Skew
Sort F(I), Skew(I), Rate(I) by Skew(I) in ascending order for
equal F(I)

-- Calculate Integer Time Cycles for each Subsystem
Loop for I = 1 to Ntasks
    IC (I)  = Integer( F(1)/F(I) )
    IOFF(I) = Integer( Skew(I) * F(1) )
End_Loop -- Check that all rates and skews are within 1% of integer
-- multiple of fastest subsystem rate
FTOL = 0.01 * F(1)
Loop for I = 1 to Ntasks
    If (    abs( (F(1)/F(I)) - IC(I)) > FTOL
        OR  abs( (Skew(I) * F(1)) - IOFF(I) > FTOL )
        Then
        Print warning message
    Endif
End_Loop -- Sum state (X) and output (Y) signals for entire system
```

```
NumY = 0
NumX = 0
Loop for I = 1 to Ntasks
    NumY = NumY + URIT(7,I+1)
    NumX = NumX + URIT(5,I+1)
End_Loop -- Compute XY bus size
BusSize = NumX + NumY -- Number of external inputs and outputs to the system
NumIn  = #Ext.In  (for top level superblock)
NumOut = #Ext.Out (for top level superblock)
-- JBASU = location in bus where storage of external inputs
--         begins
JBASU = 1 + 2 * BusSize -- LUTEMP = base location in bus for Hold and Temporary areas
LUTEMP = 1 + JBASU + NumIN

-- ***   RELINK EXTERNAL INPUTS   ***

ICOUNT      = 0              -- Addr, relative to LUTEMP for
                             -- Hold area of next subsystem
ICNT        = 1              -- Index to LocExt array
PTRUEXT(1)  = 1              -- ptr for Locext array
NUMEXT(1)   = 0              -- Size of Hold Area
Loop for Subsys = 1 to Ntasks
    -- Loop through all the blocks for this Subsys -- OBIV-Y pointers
    JBEGIN = URIT(2,Subsys + 1)
    JEND   = JBEGIN + URIT(3,Subsys + 1) - 1

-- Pointer to base of Output bus area
    JBASY  = URIT(6,Subsys + 1)

-- Pointer to LocExt / Hold Area
    PUEXT               = PTRUEXT(Subsys) + NUMEXT(Subsys)
    PTRUEXT(Subsys+1)   = PUEXT -- Pointer to Hold area of bus for subsys
    LHOLD               = LUTEMP + ICOUNT
    LOCUIEXT(Subsys+1)  = LHOLD
    URIT(17,Subsys+1)   = LHOLD MaxIn = 0
    For J = JBEGIN to JEND
        Link# = OBIV-Y(J)
        Adr   = LINK_PTR(Link#)
        Overlay BLKLINK on LINK( Adr )

BlkPtr  = BLKLINK.HPTR
        #inputs = BlkPtr.#inputs
        Overlay INLINK on LINK( BLKLINK.UPTR - 3 )

-- Loop through all inputs for this block.
        Loop for K = 1 to #inputs
            -- If input is from this subsystem just map it to
            -- absolute bus address
            If INLINK.RateID(K) = Subsys+1 Then
                LTEMP =     JBASY + INLINK.BusAddr(K) - 1
```

```
                INLINK.BusAddr(K) = LTEMP
                LoopNext
            Endif
        -- Input is either External input to the control
        -- system or input from another subsystem.
        -- Map it into Hold area if this same input hasn't
        -- already been mapped into the Hold area for this
        -- subsystem JR = INLINK.RateID(K)
        If JR = 0 Then
            -- Calculate bus address for External input
            LTEMP = URIT(6,INLINK.RateID(K))
                    + INLINK.BusAddr(K) - 1
            JR = 1
        Else
            -- Calculate bus address for input from other
            -- subsystem
            LTEMP = JBASY + INLINK.BusAddr(K) - 1
        Endif -- Look for redundant use of this input
        Found = False
        -- index to LocExt for this subsystem
        Loop for KUIC = PUEXT to ICNT-1
            If LocExt(KUIC) = LTEMP Then
                Found = True
                KL = KUIC
                LoopExit
            Endif
        End_Loop -- If input is redundant, copy previous bus address
        If Found Then
            INLINK.BusAdddr(K) = LHOLD + (KL - PUEXT)
        -- otherwise map input into Hold area
        Else
            SubSystem_ID(ICNT)    = JR
            LocExt(ICNT)          = LTEMP
            INLINK.BusAddr(K)     = LHOLD + ICNT - 1

NUMEXT(Subsys+1)      = NUMEXT(Subsys+1) + 1
            ICNT                  = ICNT + 1
        Endif
    End_Loop -- Find Block with the most input signals
    If #inputs > MaxIn and (block requires temporary storage)
        Then
        MaxIn = #inputs
    Endif
End_Loop -- Location for Temporary Hold Area of Subsys:
LUI(Subsys+1) = LOCUIEXT(Subsys+1) + NUMEXT(Subsys+1)
URIT(18,Subsys+1) = NUMEXT(Subsys+1)
    -- Size of Temporary Hold Area = MaxIn for Subsys.
    -- Relative bus address for Hold Area of next subsystem:
    ICOUNT = ICOUNT + NUMEXT(Subsys+1) + MaxIn
End_Loop

-- ***  RELINK EXTERNAL OUTPUTS  ***
```

```
-- Bus address for External outputs:
JBASYE      = LUTEMP + ICOUNT
OFFYE       = ICNT - 1            -- Ptr to Yext portion of LocExt -- Overlay OUTLINK on Output Link for Top Superblock
Link#   = SBIM(1)
OLink   = LINK_PTR( Link# )
Overlay OUTLINK on LINK( OLink )

-- Loop through outputs for Top Superblock and Map them into
-- External Output area of software bus
Loop for J = 1 to NumOut
    JR                  = OUTLINK.RateID(J)
    SubSystem_ID(ICNT)  = JR -- Calculate bus address of output's source
    JBASY               = URIT(6,JR)
    LocExt(ICNT)        = JBASY + OUTLINK.BusAddr(J) - 1

-- Increment Bus pointer
    ICNT  = ICNT + 1
End_Loop

BUS_STORAGE     = 2*BusSize + NumIn + 1 + ICOUNT + NumOut
RELINK_STORAGE  = ICNT - 1

-- End Relink
```

TABLE 8

PSEUDOCODE FOR SCHEDULER

```
Next_Time = Clock() + INITIAL_DELAY

Loop While True                     -- Main Loop cycles once per
                                    -- discrete time interval --------------------- Discrete Interval Timer -------------------

Current_Time = Clock()
If Next_Time > Current_Time Then
    Delay_Interval = Next_Time - Current_Time
    delay Delay_Interval
    Next_Time = Current_Time + Delay_Interval
              + Scheduler_Interval
Else
    Fatal_Error SCHEDULER_OVERFLOW
Endif ---------------- Check for Subsystem Overflow -------------------

Loop for Ntsk = 1 to NTASK          -- NTASK = # of subsystems
    If Start_Table(Ntsk) = 0 Then
        If Ready(Ntsk) Then
            Subsys = Rate(Ntsk)
            BusFlag(Subsys) = 1 - BusFlag(Subsys)
        Else
            Error Subsystem_Ready_Error, Ntsk
        Endif
    Exception
        When Subsystem_Ready_Error:
            Start_Table(Ntsk) = Scheduling_Count(Ntsk) + 1
```

```
            End
End_Loop

---------- Copy Outputs to Software Bus Output Buffer ---------

-- OFFYE  = LocExt address for External Outputs
                -- JBASYE = BUS address for External Outputs
                -- Use BusFlag(subsystem#) to get outputs from
                -- proper side of zero order hold.

Loop for J = 1 to NumOut
    Offset = BusFlag( Subsystem_ID( J+OFFYE ) ) * BusSize
    BUS( J + JBASYE -1 ) = BUS( Offset + LocExt( J + OFFYE ) )
End_Loop
---------- Call External Input and Output Drivers -------------

Call EXTERNAL_INPUT (BUS, JBASUE, NumIn)

Call EXTERNAL_OUTPUT (BUS, JBASYE, NumOut)

----- Copy Sample and Hold Inputs for Scheduled Subsystems -----

Loop for Ntsk = 1 to NTASK
    If Start_Table(Ntsk) = 0 Then
        Subsys = Rate(Ntsk)
        Hbuff  = LOCUIEXT(Subsys) - 1   -- Ptr for Hold Buffer
        Source = PTRUEXT (Subsys) - 1   -- Ptr to LocExt Loop for J = 1 to NUMEXT(Subsys)
            Offset = BusFlag( Subsystem_ID( Source+J) )*BusSize
            BUS( Hbuff + J ) = BUS( Offset + LocExt( Source+J ) )
        End_Loop
    Endif
End_Loop -------- Initiate Execution of Scheduled Subsystem Tasks --------

Loop for Ntsk = 1 to NTASK
    If Start_Table(Ntsk) = 0 Then
        Ready(Ntsk) = False
        Wake_Up SUBSYSTEM.Ntsk
    Endif
End_Loop -------------------------- Subsystem Timer ----------------------

Loop for Ntsk = 1 to NTASK
    If Start_Table(Ntsk) = 0 Then
        Start_Table(Ntsk) = Scheduling_Count(Ntsk)
    Else
        Start_Table(Ntsk) = Start_Table(Ntsk) - 1
    Endif
End_Loop

----------

-- End of Main Loop

End_Loop
```

TABLE 9

PSEUDOCODE FOR STAND-ALONE SCHEDULER

```
-- Scheduler is called by hardware interrupt once each discrete
-- time interval. If this interrupts an executing task, that
-- task is saved until the scheduler exits.

-- NTASK = # of subsystem tasks
Priority = NTASK + 1        -- Priority of currently running task
                            -- Highest Priority is = 1
Pdepth   = 0                -- # of subsystem tasks currently running Clear Interrupts
Disable Interrupts ------------------------ Subsystem Timer ------------------------

Loop for Ntsk = 1 to NTASK
    If Start_Table(Ntsk) = 0 Then
        Start_Table(Ntsk) = Scheduling_Count(Ntsk)
    Else
        Start_Table(Ntsk) = Start_Table(Ntsk) - 1
    Endif
End_Loop ----------------- Check for Subsystem Overflow -------------------

Loop for Ntsk = 1 to NTASK          -- NTASK = # of subsystems
    If Start_Table(Ntsk) = 0 Then
        If Ready(Ntsk) Then
            Subsys           = Rate(Ntsk)
            Ready(Ntsk)      = False
            BusFlag(Subsys)  = 1 - BusFlag(Subsys)
        Else
            Error Subsystem_Ready_Error, Ntsk
        Endif
    Exception
        When Subsystem_Ready_Error:
            Start_Table(Ntsk) = Scheduling_Count(Ntsk) + 1
        End
End_Loop ----------- Copy Outputs to Software Bus Output Buffer ----------

Loop for J = 1 to NumOut
    Offset = BusFlag( Subsystem_ID( J+OFFYE ) ) * BusSize
    BUS( J + JBASYE -1 ) = BUS( Offset + LocExt( J + OFFYE ) )
End_Loop
----------- Call External Input and Output Drivers -------------

Call EXTERNAL_INPUT (BUS, JBASUE, NumIn)

Call EXTERNAL_OUTPUT (BUS, JBASYE, NumOut)

----- Copy Sample and Hold Inputs for Scheduled Subsystems -----

Loop for Ntsk = 1 to NTASK
    If Start_Table(Ntsk) = 0 Then
        Subsys = Rate(Ntsk)
```

```
        Hbuff  = LOCUIEXT(Subsys) - 1    -- Ptr for Hold Buffer
        Source = PTRUEXT (Subsys) - 1    -- Ptr to LocExt Loop for J = 1 to NUMEXT(Subsys)
            Offset = BusFlag( Subsystem_ID( Source+J) )*BusSize
            BUS( Hbuff + J ) = BUS( Offset + LocExt( Source+J ) )
        End_Loop
    Endif
End_Loop -------- Initiate Execution of Scheduled Subsystem Tasks --------

Loop for Ntsk = 1 to NTASK
    If ( NOT Ready(Ntsk) = 0 AND Ntsk < Priority ) Then
        Pdepth = Pdepth + 1
        OldPrio(Pdepth) = Priority
        Priority = Ntsk Enable Interrupts
        Call Subsystem.Ntsk (Error)
        Disable Interrupts If Error ≠ 0 Then
        Fatal_Error( Ntsk, Error )
            Return
        Endif Priority = OldPrio(Pdepth)
        Pdepth = Pdepth - 1
        Ready(Ntsk) = True
    Endif
End_Loop

----------

-- Exit: resume execution of interrupted task, if any.

Return
```

TABLE 10

PSEUDOCODE FOR GENERATING SUBSYSTEM TASKS

```
Parameters: R              -- Subsystem #

OBIVaddr = URIT(2,R) + 2
Nblock   = URIT(3,R)
Last     = OBIVaddr + Nblock - 1

-- Calculate Bus and Parameter Pointers for each block in subsys

Loop for J = OBIVaddr to Last
    Link#    = LINK_PTR( OBIV-Y(J) )
    Overlay BLKLINK on LINK( Link# )
    IL(J)    = BLKLINK.UPTR         -- ptr to Input Link for
                                    -- this block
    #state(J) = Hdr.#states
    #input(J) = HDR.#inputs
    Type(J)   = BLKLINK.TYPE        -- Block Type
    Iparm(J)  = BLKLINK.IPTR        -- Integer Parameters
    Rparm(J)  = BLKLINK.RPTR        -- Real Parameters
```

```
            Xptr(J)  = BLKLINK.XPTR + URIT(4,R)     -- States
            Yptr(J)  = BLKLINK.YPTR + URIT(6,R)     -- Outputs
            Hptr(J)  = BLKLINK.HPTR                 -- Block Header
End_Loop -- Write generated control software to predesignated disk file:
Write ("-- Subsystem Task ", R, " --", newline, newline)
Write (subsystem preface statements)
Write ("If BusFlag(Subsys) = 0 Then ", newline)

BusFlag = 0
Loop for Pass = 1 to 2
        -- Pass 1: use BUS1 for new outputs and states
        --          other subsystems use outputs in BUS0
        -- Pass 2: use BUS0 for new outputs and states
    If Pass = 2 Then
        BusFlag = 1
        Write (newline, "Else", newline)
    Endif OFFX = BusFlag * BusSize          -- BusSize = Size of BUS0
    OFFY = (1 - BusFlag) * BusSize
    Loop for Mode = 1 to 2
            -- Mode 1 - write output calculations
            -- Mode 2 - write state calculations Loop for J = OBIVaddr to Last
            -- Skip state calculations
            If (Mode=2 and #state(J)=0) Then LoopExit -- For USER blocks, copy inputs into Temp buffer
            If Type = USER Then
                (Copy Inputs for this Block in Temporary bus
                    buffer for this subsystem)
            Endif -- Build Input address list
            Loop for I = 1 to #input(J)
                Overlay INLINK on LINK( IL(J) - 3 )
                If INLINK.RateID = R
                    Ilist(I) = OFFY + LINK( IL(J) + I - 1)
                Else
                    Ilist(I) = LINK( IL(J) + I - 1)
                Endif
            End_Loop Call BLOCK_GEN ( Mode, Ilist, #input(J), Iparm(J),
            Rparm(J), Yptr(J)+OFFY, Xptr(J)+OFFX, Xptr(J)+OFFY,
            Hptr(J) )
                -- see Table 11

End_Loop
    End_Loop
End_Loop

Write (newline, "Ready(", R, ") = True")       -- reset Ready Flag
```

TABLE 11

PSEUDOCODE FOR GENERATING BLOCK COMPUTATIONS,
see BLOCK_GEN in Tables 12D and 12E Parameters: Mode, Ilist, #input, Iparm, Rparm, Yptr, X_old,
    X_new, Hptr -- Mode    = 1: Generate Code for Output Computations
               = 2: Generate Code for State Computations
    -- Hptr    = ptr to Header for block in Catalog
               = ptr to Block Type and SubType
    -- Ilist   = list of bus addresses for block inputs
    -- #input  = number of input signals for block
    -- Iparm   = ptr to Interger Parameters
    -- Rparm   = ptr to Real Parameters
    -- Yptr    = bus address for new outputs
    -- X_old   = bus address for states from last cycle
    -- X_new   = bus address for new state values Block_type = Istack(Hptr+2)
SubType    = Istack(Hptr+3)

CASE Block_type, SubType
--
-- Example of code generation: for block which implements
--      Y1 = R1 * Input1 + X1 + Iparm1
--      Y2 = X1 * Y1
--      X1 = X1 + 0.1 * Y1

Write (name of block and comment - from Cstack for Block)

If Mode = 1 Then
--      Y1 = R1 * Input1 + X1 + Iparm1
    Write ( "BUS(", Yptr, ") = " )
    Write ( Rstack(Rparm) )
    Write ( "* BUS(", Ilist(1), ") + BUS(", X_old, ") + ")
    I1 = Istack(Iparm)
    Write (I1, newline)

--      Y2 = X1 * Y1
    Write ( "BUS(", Yptr+1, ") = BUS(", X_old, ") * BUS(")
    Write ( Yptr, ")", newline)

Else
--      X1 = X1 + 0.1 * Y1
    Write ( "BUS(", X_new, ") = BUS(", X_old, ") + 0.1 * BUS(")
    Write ( Yptr, ")", newline)
Endif

TABLE 12

Code Generator

```
with TYPES;            use TYPES;
with GLOBALS;          use GLOBALS;
with TASKGEN;          use TASKGEN;
with CODGEN_TOOLS;     use CODGEN_TOOLS;
with CODE_SEGMENT_MANAGER; use CODE_SEGMENT_MANAGER;
with INTERACTIVE;      use INTERACTIVE;
with BUS_PRINT;        use BUS_PRINT;
with GEN_RUN_TIME;     use GEN_RUN_TIME;
with TEXT_IO;          use TEXT_IO;

package body CODGEN is procedure GENERATE_CODE (MODEL          : in out STRING_DESCRIPTOR;
                         BUS_STORAGE    : in     RT_INTEGER;
                         IB_STORAGE     : in     RT_INTEGER;
                         IC             : in     INTG_ARRAY;
                         IOFF           : in     INTG_ARRAY;
                         USER_BLOCK     : in     BOOLEAN;
                         BLOCK_FLAG     : in     BOOLEAN_ARRAY) is OFILE              : FILE_TYPE;
  UPDATE_FILE        : FILE_TYPE;
  TASK_PRIORITY      : RT_INTEGER;
  SCHEDULER_PRIORITY : constant := 14;
  LINE_LEN           : NATURAL;
  MAX_LEN            : constant RT_INTEGER := 80;
  GEN_FILE           : STRING_DESCRIPTOR( MAX_LENGTH => 80);
  LINE_OF_TEXT       : STRING(1..MAX_LEN);
  SPEC_FILE_NAME     : STRING(1..80);
  HEADER_FILE_NAME   : STRING(1..80);
  STAND_ALONE        : BOOLEAN;

begin
  INQUIRE(" Do you want to generate a stand alone application [Y/N]? ",
                                                          STAND_ALONE);
  REMOVE_DEFAULT_FILE_TYPE(MODEL);
  ASSIGN_DEFAULT_FILE_TYPE(MODEL, ".ADA");
  INQUIRE(" Please enter output file name " & (default is " &
          MODEL.NAME(1..MODEL.LENGTH) & ") ",GEN_FILE);
  if GEN_FILE.LENGTH = 0 then
    GEN_FILE.NAME   := MODEL.NAME;
    GEN_FILE.LENGTH := MODEL.LENGTH;
  end if;
  ASSIGN_DEFAULT_FILE_TYPE(GEN_FILE, ".ADA");
  CREATE( OFILE, OUT_FILE, GEN_FILE.NAME(1..GEN_FILE.LENGTH));

if STAND_ALONE then
    PUT_LINE(" Printing Bus Map ...");
    PRINT_BUS( OFILE );
```

Resulting Generated Code

```
                                                      -- BUS MAP --
                                                      -- ------- --
BUS(  1):  SUBSYS 2 { SB ROLL    Blk 1},  FILTER   State   # 1  BUS 0
BUS(  2):  SUBSYS 2 { SB ROLL    Blk 1},  FILTER   Output  # 1
BUS(  3):  SUBSYS 2 { SB ROLL    Blk 2},  SUM      Output  # 1
BUS(  4):  SUBSYS 2 { SB ROLL    Blk 3},  DBAND    Output  # 1
BUS(  5):  SUBSYS 2 { SB CONTRL  Blk 3},  SUMMER   Output  # 1
BUS(  6):  SUBSYS 2 { SB CONTRL  Blk 4},  GAIN1    Output  # 1
BUS(  7):  SUBSYS 1 { SB R-RATE  Blk 1},  FILTER   State   # 1
BUS(  8):  SUBSYS 1 { SB R-RATE  Blk 1},  FILTER   Output  # 1
BUS(  9):  SUBSYS 1 { SB R-RATE  Blk 2},  ABSVAL   Output  # 1
BUS( 10):  SUBSYS 1 { SB R-RATE  Blk 3},  LIMIT    Output  # 1
BUS( 11):  SUBSYS 1 { SB R-RATE  Blk 4},  PROD     Output  # 1
BUS( 12):  SUBSYS 1 { SB R-RATE  Blk 5},  GAIN     Output  # 1
                                                                BUS 1
BUS( 13):  SUBSYS 2 { SB ROLL    Blk 1},  FILTER   State   # 1
BUS( 14):  SUBSYS 2 { SB ROLL    Blk 1},  FILTER   Output  # 1
BUS( 15):  SUBSYS 2 { SB ROLL    Blk 2},  SUM      Output  # 1
BUS( 16):  SUBSYS 2 { SB ROLL    Blk 3},  DBAND    Output  # 1
BUS( 17):  SUBSYS 2 { SB CONTRL  Blk 3},  SUMMER   Output  # 1
BUS( 18):  SUBSYS 2 { SB CONTRL  Blk 4},  GAIN1    Output  # 1
BUS( 19):  SUBSYS 1 { SB R-RATE  Blk 1},  FILTER   State   # 1
BUS( 20):  SUBSYS 1 { SB R-RATE  Blk 1},  FILTER   Output  # 1
BUS( 21):  SUBSYS 1 { SB R-RATE  Blk 2},  ABSVAL   Output  # 1
BUS( 22):  SUBSYS 1 { SB R-RATE  Blk 3},  LIMIT    Output  # 1
BUS( 23):  SUBSYS 1 { SB R-RATE  Blk 4},  PROD     Output  # 1
BUS( 24):  SUBSYS 1 { SB R-RATE  Blk 5},  GAIN     Output  # 1
                                                     -- EXTERNAL INPUTS
BUS( 25):  System External Input # 1
BUS( 26):  System External Input # 2
BUS( 27):  System External Input # 3
BUS( 28):  Disconnected Inputs Assigned To Zero
BUS( 29):  SUBSYS 2   External Input # 1                       SUBSYS 2
BUS( 30):  SUBSYS 2   External Input # 2
BUS( 31):  SUBSYS 2   External Input # 3
BUS( 32):  SUBSYS 1   External Input # 1                       SUBSYS 1
                                                     -- EXTERNAL OUTPUTS
BUS( 33):  System External Output # 1
```

Code Generator

```
------------------------------------------
-- Code generation for package SA_GLOBALS --
------------------------------------------
GENERATE_RUN_TIME_DATA(OFILE, BUS_STORAGE, IOFF, IC);
```

Resulting Generated Code

```
with SA_TYPES; use SA_TYPES;
with CALENDAR; use CALENDAR;
package SA_GLOBALS is
   BUS     : REAL_ARRAY(1..33) := (1..33 => 1.0E-10);
   R_P     : REAL_ARRAY(1..42) :=
    ( 5.000000E-02, 0.000000E+00, -1.000000E+00,  2.500000E+00,
      5.000000E-02, 0.000000E+00, -1.000000E+00,  8.187000E-01,  1.000000E+00,
      1.810000E-01, -1.000000E+00,  1.000000E+00,  1.005000E+00,  5.000000E-03,
      5.000000E-03,  1.005000E+00,  0.000000E+00,  0.000000E+00,  0.000000E+00,
      1.000000E+00,  2.500000E-02,  0.000000E+00,  0.000000E+00,  9.048000E-01,
      1.000000E+00,  9.500000E-03, -1.000000E+00,  0.000000E+00,  1.000000E+00,
      1.000000E+00,  0.000000E+00,  0.000000E+00, -2.000000E+00,  1.000000E+00,
      1.000000E+00,  2.000000E+00, -1.000000E+00, -1.000000E+00,  1.000000E+00,
      1.000000E+00,  2.500000E+02);

BUS_FLAG    : INTG_ARRAY(1..3) :=
     (0, 1, 1);
   READY_FLAG  : array(1..2) of BOOLEAN :=(1..2 => TRUE);
   LOCUEXT     : constant INTG_ARRAY(1..3) :=
     (0, 29, 32);
   PTRUEXT     : constant INTG_ARRAY(1..3) :=
     (1, 1, 4);
   RATE        : constant INTG_ARRAY(1..2) :=
     (3, 2);
   NUMEXT      : constant INTG_ARRAY(1..3) :=
     (0, 3, 1);
   SUBSYSTEM_ID: constant INTG_ARRAY(1..5) :=
     (1, 1, 3, 1, 2);
   LOCEXT      : constant INTG_ARRAY(1..5) :=
     (26, 25, 12, 27, 6);
   FREQ        : constant REAL_ARRAY(1..2) :=
     (4.000000E+01, 2.000000E+01);

START_TABLE     : INTG_ARRAY(1..2) :=
     (0, 0);
   SCHEDULING_COUNT  : constant INTG_ARRAY(1..2) :=
     (0, 1);
   SCHEDULER_INTERVAL : DURATION := DURATION( 1.0/FREQ(1) );
   SCHEDULER_TICK     : RT_FLOAT := ( 1.0/FREQ(1) );

NCYCLES  : constant := 2;
   NTASKS   : constant := 2;
   JBASUE   : constant := 25;
   JBASYE   : constant := 33;
   NUMIN    : constant := 3;
   NUMOUT   : constant := 1;
   BUSIZE   : constant := 12;
   OFFYE    : constant := 4;
   IERR     : RT_INTEGER;
   T        : RT_FLOAT;

end SA_GLOBALS;

package body SA_GLOBALS is
begin
   BUS(1) := R_P(8);
   BUS(7) := R_P(24);
end SA_GLOBALS;
```

Code Generator

```
                 ---------------------------------------------
                 -- Begin code generation for driver program --
                 ---------------------------------------------
if USER_BLOCK then
    WRITE(OFILE, "with SA_USERADA;     use SA_USERADA;");
end if;

COPY_FROM_TEMPLET( TEMPLET_FILE, OFILE, MAIN_PROCEDURE_WITH_CLAUSES );
REMOVE_DEFAULT_FILE_TYPE(GEN_FILE);
WRITE(OFILE, "procedure " & GEN_FILE_NAME(1..GEN_FILE_LENGTH) & " is" );
COPY_FROM_TEMPLET( TEMPLET_FILE, OFILE, PRIORITY_OF_SCHEDULER );
for NTSK in 1..NTASKS loop
    TASK_PRIORITY := SCHEDULER_PRIORITY - 1 - NTSK;
    WRITE(OFILE, "  PRIORITY_", TASK_PRIORITY, " : constant := ",
                  TASK_PRIORITY, ";" );
end loop;

for NTSK in 1..NTASKS loop
    NEW_LINE(OFILE);
    TASK_PRIORITY := SCHEDULER_PRIORITY - 1 - NTSK;
    WRITE(OFILE, "  -- SUBSYSTEM0", NTSK, "_TYPE (task) --");
    WRITE(OFILE, "  -- SUBSYSTEM0", NTSK, "_TYPE (task) --");
    WRITE(OFILE, "  task type SUBSYSTEM0", NTSK, "_TYPE is ");
    WRITE(OFILE, "    pragma PRIORITY (PRIORITY_", TASK_PRIORITY,
                  ");");

WRITE(OFILE, "    entry INITIALIZE;");
    WRITE(OFILE, "    entry WAKEUP;");
    WRITE(OFILE, "  end SUBSYSTEM0", NTSK, "_TYPE;");
end loop;
NEW_LINE(OFILE);

COPY_FROM_TEMPLET( TEMPLET_FILE, OFILE, SCHEDULER_SPECIFICATION );

for NTSK in 1..NTASKS loop
    WRITE(OFILE, "  type SUBSYSTEM0", NTSK,
                  "_ALLOCATOR is access SUBSYSTEM0", NTSK, "_TYPE; ");
end loop;
NEW_LINE(OFILE);

COPY_FROM_TEMPLET( TEMPLET_FILE, OFILE, SCHEDULER_ALLOCATOR );

for NTSK in 1..NTASKS loop
    WRITE(OFILE, "  SUBSYSTEM", NTSK,
                  "   : SUBSYSTEM0", NTSK, "_ALLOCATOR;");
end loop;

NEW_LINE( OFILE );
NEW_LINE( OFILE );
else
    WRITE(OFILE, "package body SUBSYSTEM is ");
end if;
```

Resulting Generated Code

```
with SA_IMPLEMENTATION_SPECIFIC;   use SA_IMPLEMENTATION_SPECIFIC;
with SA_TYPES;                     use SA_TYPES;
with SA_GLOBALS;                   use SA_GLOBALS;
with SA_FLOAT_MATH_LIB;            use SA_FLOAT_MATH_LIB;
with SA_MATH_LIB;                  use SA_MATH_LIB;
with CALENDAR;                     use CALENDAR;
with SA_FLOAT_TEXT_IO;             use SA_FLOAT_TEXT_IO;
with SA_INTEGER_TEXT_IO;           use SA_INTEGER_TEXT_IO;
with TEXT_IO;                      use TEXT_IO;
procedure contrl is PRIORITY_14 : constant := 14;
PRIORITY_12 : constant := 12;
PRIORITY_11 : constant := 11;

-- SUBSYSTEM01_TYPE (task) --
task type SUBSYSTEM01_TYPE is
    pragma PRIORITY (PRIORITY_12);
    entry INITIALIZE;
    entry WAKEUP;
end SUBSYSTEM01_TYPE;

-- SUBSYSTEM02_TYPE (task) --
task type SUBSYSTEM02_TYPE is
    pragma PRIORITY (PRIORITY_11);
    entry INITIALIZE;
    entry WAKEUP;
end SUBSYSTEM02_TYPE;

-- SCHEDULER (task) --
task type SCHEDULER is
    pragma PRIORITY (PRIORITY_14);
    entry STARTUP;
    entry QUIT;
end SCHEDULER;

type SCHEDULER_ALLOCATOR   is access SCHEDULER;
type SUBSYSTEM01_ALLOCATOR is access SUBSYSTEM01_TYPE;
type SUBSYSTEM02_ALLOCATOR is access SUBSYSTEM02_TYPE;

SCHEDULER_TASK   : SCHEDULER_ALLOCATOR;
SUBSYSTEM1       : SUBSYSTEM01_ALLOCATOR;
SUBSYSTEM2       : SUBSYSTEM02_ALLOCATOR;
```

Code Generator

```
for NTSK in 1..NTASKS loop
  WRITE(CURRENT_OUTPUT," Code generation for subsystem tasks --
  if STAND_ALONE then                  Generating subsystem ", NTSK, "...");
    NEW_PAGE(OFILE);
  end if;
  WRITE(OFILE, "                       -- SUBSYSTEM0", NTSK, "_TYPE (task) --");
  WRITE(OFILE, "                       ------------------------------------");
  WRITE(OFILE, "task body SUBSYSTEM0", NTSK, "_TYPE is ");
  WRITE_DECLARATIONS(OFILE,NTSK,BLOCK_FLAG);
  WRITE(OFILE, "    SUBSYS       : RT_INTEGER;");
  WRITE(OFILE, "begin ");
  NEW_LINE(OFILE);
  if STAND_ALONE and SRATE then
    WRITE(OFILE, "    accept INITIALIZE do ");
    WRITE(OFILE, "       SUBSYS := RATE;");
  else
    WRITE(OFILE, "    SUBSYS := RATE(", NTSK, ");");
  end if;
  WRITE(OFILE, "    end INITIALIZE;");
  NEW_LINE(OFILE);
  WRITE(OFILE, "    loop");
  WRITE(OFILE, "       select");
  WRITE(OFILE, "          accept WAKEUP;");
  WRITE(OFILE, "       or");
  WRITE(OFILE, "          terminate;");
  WRITE(OFILE, "       end select;");
  NEW_LINE(OFILE);

TASK_GEN (RATE(NTSK), BUS_STORAGE, IB_STORAGE, OFILE);
  if STAND_ALONE and SRATE then
    WRITE(OFILE, "    READY_FLAG := TRUE; ");
  else
    WRITE(OFILE, "    READY_FLAG(", NTSK, ") := TRUE; ");
  end if;
  WRITE(OFILE, "    end loop; ");
  NEW_LINE(OFILE);
  WRITE(OFILE, "    exception ");
  WRITE(OFILE, "       when others => raise; ");
  WRITE(OFILE, "end SUBSYSTEM0", NTSK, "_TYPE;");
  NEW_LINE( OFILE, 2 );
end loop;

if not STAND_ALONE then
  WRITE(OFILE, "end SUBSYSTEM;");
  goto END_OF_CODE_GENERATOR;
end if;
```

Resulting Generated Code

```
--                    -- SUBSYSTEM01_TYPE (task) --
--                    ------------------------------
task body SUBSYSTEM01_TYPE is
    SUBSYS       : RT_INTEGER;
begin
    accept INITIALIZE do
       SUBSYS := RATE(1);
    end INITIALIZE;

loop
       select
          accept WAKEUP;
       or
          terminate;
       end select;

if BUS_FLAG(SUBSYS) = 0  then

-- ( SB R-RATE BLK 1}, 'FILTER' Numerator/Denominator
          BUS(20) := 0.0095*BUS(7);

-- ( SB R-RATE BLK 2}, 'ABSVAL' Absolute Value
          BUS( 21):= abs(BUS( 20));

-- ( SB R-RATE BLK 3}, 'LIMIT ' Absolute Saturation Limit
          if BUS( 21) >= 0.0  then
             if BUS( 21) < R_P( 36)  then
                BUS( 22):= BUS( 21);
             else
                BUS( 22):= R_P( 36);
             end if;
          else
             if BUS( 21) > R_P( 35)  then
                BUS( 22):= BUS( 21);
             else
                BUS( 22):= R_P( 35);
             end if;

-- ( SB R-RATE BLK 4}, 'PROD ' Elementwise Product
          BUS( 23):= BUS( 22)*BUS( 20);

-- ( SB R-RATE BLK 5}, 'GAIN ' Gain Block
          BUS(24) := R_P(42) * BUS(23);

-- ( SB R-RATE BLK 1}, 'FILTER' Numerator/Denominator
          BUS(19) := 0.9048*BUS(7) + 1.0*BUS(32);

else

-- ( SB R-RATE BLK 1}, 'FILTER' Numerator/Denominator
          BUS(8) := 0.0095*BUS(19);

-- ( SB R-RATE BLK 2}, 'ABSVAL' Absolute Value
          BUS( 9):= abs(BUS( 8));

-- ( SB R-RATE BLK 3}, 'LIMIT ' Absolute Saturation Limit
          if BUS( 9) >= 0.0  then
             if BUS( 9) < R_P( 36)  then
                BUS( 10):= BUS( 9);
             else
                BUS( 10):= R_P( 36);
             end if;
          else
```

Code Generator

Resulting Generated Code

```
        if  BUS(  9) > R_P(  35)  then
            BUS( 10):= BUS(  9);
        else
            BUS( 10):= R_P( 35);
        end if;
--{ SB R-RATE BLK 4}, 'PROD ' Elementwise Product
        BUS( 11):= BUS( 10)*BUS(  8);
--{ SB R-RATE BLK 5}, 'GAIN ' Gain Block
        BUS(12) := R_P(42) * BUS(11).
--{ SB R-RATE BLK 1}, 'FILTER' Numerator/Denominator
        BUS(7) := 0.9048*BUS(19) + 1.0*BUS(32);

end if;
        READY_FLAG(1) := TRUE;
    end loop;

exception
        when others => raise;
end SUBSYSTEM01_TYPE;

-- ----------------------------------------
-- SUBSYSTEM02_TYPE (task) --
-- ----------------------------------------
task body SUBSYSTEM02_TYPE is
    SUBSYS   : RT_INTEGER;
begin
    accept INITIALIZE do
        SUBSYS := RATE(2);
    end INITIALIZE;
    loop
        select
            accept WAKEUP;
        or
            terminate;
        end select;
        if BUS_FLAG(SUBSYS) = 0  then
--{ SB ROLL  BLK 1}, 'FILTER' Numerator/Denominator
        BUS(14) := 0.181*BUS(1);
--{ SB ROLL  BLK 2}, 'SUM   ' Summing Junction
        BUS( 15):=-BUS( 14);
        BUS( 15):= BUS( 15)+BUS( 30);
--{ SB ROLL  BLK 3}, 'DBAND ' Dead Band
        if abs(BUS( 15)) >= R_P( 16) then
            if BUS( 15) > 0.0 then
                BUS( 16):= BUS( 15) - abs(R_P( 16));
            else
                BUS( 16):= BUS( 15) + abs(R_P( 16));
            end if;
        else
            BUS( 16):= 0.0;
        end if;
--{ SB CONTRL BLK 3}, 'SUMMER' Summing Junction
        BUS( 17):= BUS( 16);
        BUS( 17):= BUS( 17)-BUS( 31);
```

Resulting Generated Code

```
--{ SB CONTRL BLK 4}, 'GAIN1 ' Gain Block
  BUS(18) := R_P(5) * BUS(17);
--{ SB ROLL BLK 1}, 'FILTER' Numerator/Denominator
  BUS(13) := 0.8187*BUS(1) + 1.0*BUS(29);
else
--{ SB ROLL BLK 1}, 'FILTER' Numerator/Denominator
  BUS(2) := 0.181*BUS(13);
--{ SB ROLL BLK 2}, 'SUM   ' Summing Junction
  BUS(  3):=-BUS(   2);
  BUS(  3) := BUS(   3)+BUS( 30);
--{ SB ROLL BLK 3}, 'DBAND ' Dead Band
  if abs(BUS(   3)) >= R_P( 16) then
     if BUS(   3) > 0.0 then
        BUS(  4) := BUS(   3) - abs(R_P( 16));
     else
        BUS(  4) := BUS(   3) + abs(R_P( 16));
     end if;
  else
     BUS(   4) := 0.0;
  end if;
--{ SB CONTRL BLK 3}, 'SUMMER' Summing Junction
  BUS(  5) := BUS(   4);
  BUS(  5) := BUS(   5)-BUS( 31);
--{ SB CONTRL BLK 4}, 'GAIN1 ' Gain Block
  BUS(6) := R_P(5) * BUS(5);
--{ SB ROLL BLK 1}, 'FILTER' Numerator/Denominator
  BUS(1) := 0.8187*BUS(13) + 1.0*BUS(29);
  end if;
  READY_FLAG(2) := TRUE;
end loop;
exception
  when others => raise;
end SUBSYSTEM02_TYPE;
```

Code Generator

Code Generator

```
NEW_LINE(OFILE);
NEW_PAGE(OFILE);
COPY_FROM_TEMPLET( TEMPLET_FILE, OFILE, START_OF_SCHEDULER );

If SRATE then
    COPY_FROM_TEMPLET( TEMPLET_FILE, OFILE, SRATE_SUBSYSTEM_READY_CHECK );
else
    COPY_FROM_TEMPLET( TEMPLET_FILE, OFILE, MRATE_SUBSYSTEM_READY_CHECK );
end if;

If OFEYE*NUMOUT = 1 then
    COPY_FROM_TEMPLET( TEMPLET_FILE, OFILE, PREPARE_OUTPUT_1 );
else
    COPY_FROM_TEMPLET( TEMPLET_FILE, OFILE, PREPARE_OUTPUT_2 );
end if;

COPY_FROM_TEMPLET( TEMPLET_FILE, OFILE, EXTERNAL_INPUT_OUTPUT );

If not SRATE then
    COPY_FROM_TEMPLET( TEMPLET_FILE, OFILE,
                      MRATE_COPY_INPUTS_TO_HOLD_MEMORY );
end if;

If SRATE then
    COPY_FROM_TEMPLET( TEMPLET_FILE, OFILE, SRATE_WAKEUP );
else
    for NTSK in 1..NTASKS loop
        WRITE(OFILE, "            If START_TABLE(", NTSK, ") = 0 then " );
        WRITE(OFILE, "                READY_FLAG(", NTSK, ") := FALSE; " );
        WRITE(OFILE, "                SUBSYSTEM", NTSK, ".WAKEUP;" );
        WRITE(OFILE, "            end if;" );
        NEW_LINE(OFILE);
    end loop;
end if;

If not SRATE then
    COPY_FROM_TEMPLET( TEMPLET_FILE, OFILE, MRATE_START_TABLE_DECREMENT );
end if;

COPY_FROM_TEMPLET( TEMPLET_FILE, OFILE, END_OF_SCHEDULER );
COPY_FROM_TEMPLET( TEMPLET_FILE, OFILE, SCHEDULER_EXCEPTIONS );
```

Resulting Generated Code

```
-------------------------------
-- SCHEDULER (task) --
-------------------------------
task body SCHEDULER is INITIAL_WAIT          : constant DURATION := 0.5;
    DELAY_INTERVAL        : DURATION;
    NEXT_TIME             : TIME;
    CURRENT_TIME          : TIME;
    TIME_COUNTER          : RT_INTEGER := 0;
    OFFSET                : RT_INTEGER;
    OFEUE                 : RT_INTEGER;
    OFEUIE                : RT_INTEGER;
    SUBSYS                : RT_INTEGER;
    NTSK                  : RT_INTEGER;
    ERROR_NUMBER          : RT_INTEGER;
    SCHEDULER_OVERFLOW    : exception;
    SUBSYSTEM_READY_ERROR : exception;
    EXIT_SCHEDULER        : exception;

begin
    accept STARTUP;                        -- START SCHEDULER --
    NEXT_TIME := CLOCK + INITIAL_WAIT;
    loop
        begin
            CURRENT_TIME := CLOCK;
            If NEXT_TIME > CURRENT_TIME then
                DELAY_INTERVAL := NEXT_TIME - CURRENT_TIME;
                delay DELAY_INTERVAL;
                NEXT_TIME := CURRENT_TIME+ DELAY_INTERVAL
                             + SCHEDULER_INTERVAL;
            else
                raise SCHEDULER_OVERFLOW;
            end if;
            T := RT_FLOAT((SCHEDULER_INTERVAL*TIME_COUNTER));

NTSK := 1;
            while NTSK <= NTASKS loop
                begin
                    If START_TABLE(NTSK) = 0   then
                        If READY_FLAG(NTSK)   then
                            SUBSYS := RATE(NTSK);
                            BUS_FLAG(SUBSYS) := 1 - BUS_FLAG(SUBSYS);
                        else
                            ERROR_NUMBER := NTSK;
                            raise SUBSYSTEM_READY_ERROR;
                        end if;
                    end if;
                exception
                    when SUBSYSTEM_READY_ERROR =>
                        START_TABLE(NTSK) := SCHEDULING_COUNT(NTSK) + 1;
                end;
                NTSK := NTSK + 1;
            end loop;

for J in 1..NUMOUT        loop
                OFFSET    := BUS_FLAG( SUBSYSTEM_ID(J+OFFYE) )*BUSIZE;
                BUS(J+JBASYE-1) := BUS( OFFSET+LOCEXT(J+OFFYE) );
            end loop;

EXTERNAL_INPUT( BUS, JBASUE, NUMIN);
            EXTERNAL_OUTPUT(BUS, JBASYE, NUMOUT);
```

Code Generator

Resulting Generated Code

```
for NTSK in 1..NTASKS  loop
    if START_TABLE(NTSK) = 0  then
        SUBSYS := RATE(NTSK);
        OFUIE := LOCU1EXT(SUBSYS) - 1;
        OFUIE := PTRUEXT(SUBSYS) - 1;
        for J in 1..NUMEXT(SUBSYS) loop
            OFESET := BUS_FLAG( SUBSYSTEM_ID(J+OFEUE) )*BUSIZE;
            BUS(J+OFEUIE) := BUS( OFFSET+LOCEXT(J+OFEUE) );
        end loop;
    end if;

if START_TABLE(1) = 0 then
        READY_FLAG(1) := FALSE;
        SUBSYSTEM1.WAKEUP;
    end if;

if START_TABLE(2) = 0 then
        READY_FLAG(2) := FALSE;
        SUBSYSTEM2.WAKEUP;
    end if;

for NTSK in 1..NTASKS loop
        if START_TABLE(NTSK) = 0 then
            START_TABLE(NTSK) := SCHEDULING_COUNT(NTSK);
        else
            START_TABLE(NTSK) := START_TABLE(NTSK) - 1;
        end if;
    end loop;

TIME_COUNTER := (TIME_COUNTER + 1) mod NCYCLES;
end loop;

exception
    when SCHEDULER_OVERFLOW =>
        NEXT_TIME := NEXT_TIME + SCHEDULER_INTERVAL;
    when IO_ERROR =>
        raise EXIT_SCHEDULER;
    when EXIT_CONDITION =>
        raise EXIT_SCHEDULER;

end;
end loop;

exception
    when EXIT_SCHEDULER =>
        loop
            select
                accept QUIT;
            or
                terminate;
            end select;
        end loop;

end SCHEDULER;
```

Code Generator

```
                   -----------------------------------------------
                   -- Code generation for body of driver program --
                   -----------------------------------------------
NEW_PAGE(OFILE);
COPY_FROM_TEMPLET( TEMPLET_FILE, OFILE, BEGINING_OF_MAIN_PROCEDURE );

COPY_FROM_TEMPLET( TEMPLET_FILE, OFILE, IMPLEMENTATION_SPECIFIC_INITIALIZE);

for NTSK in 1..NTASKS loop
    WRITE(OFILE, "          SUBSYSTEM", NTSK, " := new SUBSYSTEM0",
                 NTSK,  "_TYPE; " );
end loop;

COPY_FROM_TEMPLET( TEMPLET_FILE, OFILE, CREATE_SCHEDULER );

for NTSK in 1..NTASKS loop
    WRITE(OFILE, "          SUBSYSTEM", NTSK, ".INITIALIZE;" );
end loop;

COPY_FROM_TEMPLET( TEMPLET_FILE, OFILE, SCHEDULER_STARTUP_AND_QUIT );

for NTSK in 1..NTASKS loop
    WRITE(OFILE, "          SUBSYSTEM", NTSK, " := null; " );
end loop;

COPY_FROM_TEMPLET( TEMPLET_FILE, OFILE, IMPLEMENTATION_SPECIFIC_TERMINATE );
WRITE(OFILE,"end " & GEN_FILE.NAME(1..GEN_FILE.LENGTH) & ";" );
CLOSE ( OFILE );

NEW_LINE;
PUT_LINE(" End of Code Generation");

-------------------------------------
<<END_OF_CODE_GENERATOR>> null;
-------------------------------------
end GENERATE_CODE;
end CODGEN;
```

Resulting Generated Code

```
begin        --  MAIN --
             ---------------------------------------------------------
             IMPLEMENTATION_SPECIFIC_INITIALIZE(NUMIN, NUMOUT, SCHEDULER_TICK);
             --                                                      --
             --                    CREATE TASKS                      --
             --                                                      --
             SUBSYSTEM1 := new SUBSYSTEM01_TYPE;
             SUBSYSTEM2 := new SUBSYSTEM02_TYPE;
             SCHEDULER_TASK := new SCHEDULER;
             --                                                      --
             --            Task parameter initialization              --
             --                                                      --
             SUBSYSTEM1.INITIALIZE;
             SUBSYSTEM2.INITIALIZE;
             SCHEDULER_TASK.STARTUP;
             SCHEDULER_TASK.QUIT;
             --                                                      --
             --                    Stop Tasks                        --
             --                                                      --
             SUBSYSTEM1 := null;
             SUBSYSTEM2 := null;
             IMPLEMENTATION_SPECIFIC_TERMINATE(NUMOUT);
end contrl;
```

TABLE 12A

```
with CODGEN_TOOLS;         use CODGEN_TOOLS;
with STRING_TOOLS;         use STRING_TOOLS;
with GLOBALS;              use GLOBALS;
with BUSINI;               use BUSINI;
with RT_FLOAT_TEXT_IO;     use RT_FLOAT_TEXT_IO;
with RT_INTEGER_TEXT_IO;   use RT_INTEGER_TEXT_IO;
package body GEN_RUN_TIME is
procedure GENERATE_RUN_TIME_DATA( OFILE      : in FILE_TYPE;
                                  BUS_STORAGE: in RT_INTEGER;
                                  IOFF       : in INTG_ARRAY; IC : in INTG_ARRAY) is
TEMP                    : INTG_ARRAY(1..NTASKS);
LNKPTR, LOBIV, NS, NUMBL: RT_INTEGER;
NDX, LOCL, BPTR         : RT_INTEGER;
procedure FILL_ARRAY(ITEM : in INTG_ARRAY; SIZE : in RT_INTEGER) is separate;
procedure FILL_ARRAY(ITEM : in REAL_ARRAY; SIZE : in RT_INTEGER) is separate;
begin
  WRITE( OFILE, "with SA_TYPES;  use SA_TYPES;");
  WRITE( OFILE, "with CALENDAR;  use CALENDAR;");
  WRITE( OFILE, "package SA_GLOBALS is ");
  WRITE( OFILE, "   BUS          : REAL_ARRAY(1.." BUS_STORAGE
               ,") := (1..", BUS_STORAGE, " => 1.0E-10);");
  NEW_LINE(OFILE);
  WRITE( OFILE, "   R_P          : REAL_ARRAY(1..", SLENR, ") := "   ");
  FILL_ARRAY(R_P, SLENR);
  NEW_LINE(OFILE);
  WRITE( OFILE, "   BUS_FLAG     : INTG_ARRAY(1..", NTASKS+1, ") := "   ");
  BUS_FLAG(1) := 0;
  for I in 2..NTASKS+1 loop
    BUS_FLAG(I) := 1;
  end loop;
  FILL_ARRAY( BUS_FLAG, NTASKS+1);
  if SRATE then
    WRITE( OFILE, "   READY_FLAG   : BOOLEAN := TRUE; ");
  else
    WRITE( OFILE, "   READY_FLAG   : array(1..", NTASKS, ") of BOOLEAN"
                 ,"  := (1..", NTASKS, " => TRUE); ");
  end if;
  NEW_LINE(OFILE);
  WRITE( OFILE, "   LOCUIEXT     : constant INTG_ARRAY(1..", NTASKS+1, ") := "   ");
  FILL_ARRAY(LOCUIEXT, NTASKS+1);
  WRITE( OFILE, "   PTRUEXT      : constant INTG_ARRAY(1..", NTASKS+1, ") := "   ");
  FILL_ARRAY(PTRUEXT, NTASKS+1);
  if SRATE then
    WRITE( OFILE, "   RATE         : constant := ", RATE(1), ";");
  else
    WRITE( OFILE, "   RATE         : constant INTG_ARRAY(1.."
                 ,", NTASKS, ") := "   ");
    FILL_ARRAY(RATE, NTASKS);
  end if;
  WRITE( OFILE, "   NUMEXT       : constant INTG_ARRAY(1.."
               , NTASKS+1, ") := "   ");
  if OEFYE+NUMOUT > 1 then
    WRITE( OFILE, "   SUBSYSTEM_ID : constant INTG_ARRAY("
                 ,"  OEFYE+NUMOUT, ") := "   ");
    FILL_ARRAY(SUBSYSTEM_ID, OEFYE+NUMOUT);
    WRITE( OFILE, "   LOCEXT       : constant INTG_ARRAY(1.."
                 , OEFYE+NUMOUT, ") := "   ");
    FILL_ARRAY(LOCEXT, OEFYE+NUMOUT);
  else
    WRITE( OFILE, "   SUBSYSTEM_ID : constant := "
                 ,"  SUBSYSTEM_ID(1), ");");
    WRITE( OFILE, "   LOCEXT       : constant := "
                 ,"  LOCEXT(1), ");");
  end if;
  if SRATE then
```

```
    PUT( OFILE, "   FREQ         "); PUT( OFILE, FREQ(1)); PUT( OFILE, "; constant := "); NEW_LINE( OFILE);
  else
    WRITE( OFILE, "   FREQ         : constant REAL_ARRAY(1.."
                 , NTASKS, ") := "   ");
    FILL_ARRAY(FREQ, NTASKS);
  end if;
  NEW_LINE(OFILE);
  if not SRATE then
    WRITE( OFILE, "   START_TABLE  : INTG_ARRAY(1.."
                 , NTASKS, ") := "   ");
  FILL_ARRAY( IOFF, NTASKS);
  WRITE( OFILE, "   SCHEDULING_COUNT : constant INTG_ARRAY(1.."
               , NTASKS, ") := "   ");
  for I in 1..NTASKS loop
    TEMP(I) := IC(I) -1;
  end loop;
  FILL_ARRAY( TEMP, NTASKS);
  end if;
  if not SRATE then
    WRITE( OFILE, "   SCHEDULER_INTERVAL    : DURATION := DURATION"
                 ,"&"( 1.0/FREQ(1) );");
    WRITE( OFILE, "   SCHEDULER_TICK        : RT_FLOAT := "
                 ,"&"( 1.0/FREQ(1) );");
  else
    WRITE( OFILE, "   SCHEDULER_INTERVAL    : DURATION := DURATION"
                 ,"&"( 1.0/FREQ );");
    WRITE( OFILE, "   SCHEDULER_TICK        : RT_FLOAT := "
                 ,"&"( 1.0/FREQ );");
  end if;
  NEW_LINE(OFILE);
  WRITE( OFILE, "   NCYCLES      : constant := ", NCYCLES, ";");
  WRITE( OFILE, "   NTASKS       : constant := ", NTASKS, ";");
  WRITE( OFILE, "   JBASUE       : constant := ", JBASUE, ";");
  WRITE( OFILE, "   JBASYE       : constant := ", JBASYE, ";");
  WRITE( OFILE, "   NUMIN        : constant := ", NUMIN, ";");
  WRITE( OFILE, "   NUMOUT       : constant := ", NUMOUT, ";");
  WRITE( OFILE, "   BUSIZE       : constant := ", BUSIZE, ";");
  WRITE( OFILE, "   OFFYE        : constant := ", OFFYE, ";");
  WRITE( OFILE, "   IERR         : RT_INTEGER;");
  WRITE( OFILE, "   T            : RT_FLOAT;");
  NEW_LINE(OFILE);
  WRITE( OFILE, "end SA_GLOBALS;  ");
  NEW_LINE(OFILE);
  NEW_LINE(OFILE);
  LNKPTR  := SIPAR(SLENI+14);
  LOBIV   := SIPAR(SLENI+20);
  NUMBL   := SIPAR(SLENI+21);
  for I in 1..NUMBL loop
    NDX   := SIPAR(LOBIV+I-1);
    LOCL  := SIPAR(LNKPTR+NDX-1);
    BPTR  := SIPAR(LOCL+2);
    NS    := SNS (BPTR);
    if NS > 0 then
      WRITE(OFILE, "package body SA_GLOBALS is");
      NEW_LINE(OFILE);
      WRITE(OFILE, "begin");
      NEW_LINE(OFILE);
      GEN_BLKINI(OFILE);
      NEW_LINE(OFILE);
      WRITE(OFILE, "end SA_GLOBALS;  ");
      exit;
    end if;
  end loop;
  NEW_PAGE(OFILE);
end GENERATE_RUN_TIME_DATA;
end GEN_RUN_TIME;
```

TABLE 12B

```
with TYPES;              use TYPES;
with GLOBALS;            use GLOBALS;
with BLKGEN;             use BLKGEN;
with RT_INTEGER_TEXT_IO; use RT_INTEGER_TEXT_IO;
package body TASKGEN is procedure TASK_GEN (SUBSYS      : in RT_INTEGER;
                    BUS_STORAGE : in RT_INTEGER;
                    IB_STORAGE  : in RT_INTEGER;
                    OFILE       : in FILE_TYPE) is BUSIZE, OFEX,   OFFY,
NUMXD,  NUMYD,  JBASX,   JBASY,
JBEGIN, JEND,   JNUMBL,  JBLK,
LUTEMP, LUT,    LSEL,    NSEL,
LURIT,  MURIT,  JURIT,   LNKPTR, LOBIV      : RT_INTEGER;
IERR,   PASS                                : RT_INTEGER;
BLK_TYPE, SUB_TYPE                          : RT_INTEGER;
LLI     : INTG_ARRAY(1..MAXBLK);
LLR     : INTG_ARRAY(1..MAXBLK);
LLU     : INTG_ARRAY(1..MAXBLK);
LLX     : INTG_ARRAY(1..MAXBLK);
LLY     : INTG_ARRAY(1..MAXBLK);
LOCL    : INTG_ARRAY(1..MAXBLK);
LBPTR   : INTG_ARRAY(1..MAXBLK);
IB      : INTG_ARRAY(1..IB_STORAGE);
SKIP    : array (1..MAXBLK) of BOOLEAN;
T       : RT_FLOAT := 0.0;

begin
  LURIT   := SIPAR(SLENI+11);
  MURIT   := SIPAR(SLENI+12);
  LNKPTR  := SIPAR(SLENI+14);
  LOBIV   := SIPAR(SLENI+20);
  JURIT   := LURIT + (SUBSYS-1)*MURIT;
  JBEGIN  := SIPAR(JURIT+1);
  JNUMBL  := SIPAR(JURIT+2);
  JBASX   := SIPAR(JURIT+3);
  NUMXD   := SIPAR(JURIT+4);
  JBASY   := SIPAR(JURIT+5);
  NUMYD   := SIPAR(JURIT+6);
  BUSIZE  := NUMX * NUMY;
  LUTEMP  := LUI(SUBSYS);
  JEND    := JBEGIN + JNUMBL - 1;
  for J in 1..LUT loop
    IB(J) := J;
  end loop;
  for J in JBEGIN..JEND loop
    JBLK      := SIPAR(LOBIV+J-1);
    LOCL(J)   := SIPAR(LNKPTR+JBLK-1);
    LBPTR(J)  := SIPAR(LOCL(J)+2);
    LLI(J)    := SIPAR(LOCL(J)+3) - 1;
    LLU(J)    := SIPAR(LOCL(J)+4) - 1;
    LLY(J)    := SIPAR(LOCL(J)+5) - 1;
    LLX(J)    := ( SIPAR(LOCL(J)+6) + JBASX - 1 ) - 1;
    LLY(J)    := ( SIPAR(LOCL(J)+7) + JBASY - 1 ) - 1;
    SKIP(J)   := FALSE;
    if SNS(LBPTR(J)) <= 0 then
      SKIP(J) := TRUE;
    end if;
  end loop;
  BUS_FLAG(SUBSYS) := 0;
  PUT_LINE( OFILE, " if BUS_FLAG(SUBSYS) = 0 then");
```

```
  for PASS in 1..2 loop
    if PASS = 2 then
      BUS_FLAG(SUBSYS) := 1;
      NEW_LINE( OFILE );
      PUT_LINE( OFILE, "                else");
      PUT_LINE( OFILE, " ");
      PUT_LINE( OFILE, " ");
      NEW_LINE( OFILE );
    end if;
    OFEX := BUS_FLAG(SUBSYS)*BUSIZE;
    OFFY := (1-BUS_FLAG(SUBSYS))*BUSIZE;
    for MODE in 1..2 loop
      for J in JBEGIN..JEND loop
        if not ( MODE = 2 and SKIP(J) ) then     -- COPY INPUTS -- ");
          BLK_TYPE := SIPAR(LOCL(J));
          SUB_TYPE := abs( SICON(LBPTR(J)) );
          NSEL     := LLU(J) + SNI(LBPTR(J));

if BLK_TYPE = 6 then
            NEW_LINE( OFILE );
            PUT_LINE( OFILE, "         ");
          end if;
          for I in 1..SNI(LBPTR(J)) loop
            if SIPAR(I+NSEL) = SUBSYS then
              if BLK_TYPE = 6 then
                PUT( OFILE, "        BUS(" );
                PUT( OFILE, I+LUT, 4);
                PUT( OFILE, ") := BUS(");
                PUT( OFILE, OFFY+SIPAR(I+LLU(J)), 4);
                PUT( OFILE, ");");
                NEW_LINE( OFILE );
              else
                IB(I+LUT) := OFFY + SIPAR(I+LLU(J));
              end if;
            else
              if BLK_TYPE = 6 then
                PUT( OFILE, "        BUS(" );
                PUT( OFILE, I+LUT, 4);
                PUT( OFILE, ") := BUS(");
                PUT( OFILE, "     ");
                PUT( OFILE, SIPAR(I+LLU(J)), 4);
                PUT( OFILE, ");");
                NEW_LINE( OFILE );
              else
                IB(I+LUT) := SIPAR(I+LLU(J));
              end if;
            end if;
          end loop;
          BLOCK_GEN (MODE, LOCL(J), LBPTR(J),
                     SIPAR, R_P, LLY(J)+OFFY, LLX(J)+OFEX,
                     LLX(J)+OFFY, LUT, LLI(J), LLR(J),
                     IB, BUS_STORAGE, OFILE);
        end if;
      end loop;
    end loop;
    NEW_LINE( OFILE );
    PUT_LINE( OFILE, "                end if;");
  end loop;
  NEW_LINE( OFILE );
  PUT_LINE( OFILE, " ");
end TASK_GEN;

end TASKGEN;
```

TABLE 12C

```
%MAIN_PROCEDURE_WITH_CLAUSES
with SA_IMPLEMENTATION_SPECIFIC;    use SA_IMPLEMENTATION_SPECIFIC;
with SA_TYPES;                       use SA_TYPES;
with SA_GLOBALS;                     use SA_GLOBALS;
with SA_FLOAT_MATH_LIB;              use SA_FLOAT_MATH_LIB;
with SA_MATH_LIB;                    use SA_MATH_LIB;
with CALENDAR;                       use CALENDAR;
with SA_FLOAT_TEXT_IO;               use SA_FLOAT_TEXT_IO;
with SA_INTEGER_TEXT_IO;             use SA_INTEGER_TEXT_IO;
with TEXT_IO;                        use TEXT_IO;
%PRIORITY_OF_SCHEDULER PRIORITY_14 : constant := 14;
%SCHEDULER_SPECIFICATION
    -- SCHEDULER (task) --
    -- ---------------- --
    task type SCHEDULER is
         pragma PRIORITY (PRIORITY_14);
         entry STARTUP;
         entry QUIT;
    end SCHEDULER;

type SCHEDULER_ALLOCATOR      is access SCHEDULER;
%SCHEDULER_ALLOCATOR
    SCHEDULER_TASK              : SCHEDULER_ALLOCATOR;
%START_OF_SCHEDULER -- SCHEDULER (task) --
    -- ---------------- --
    task body SCHEDULER is INITIAL_WAIT             : constant DURATION := 0.5;
         DELAY_INTERVAL           : DURATION;
         NEXT_TIME                : TIME;
         CURRENT_TIME             : TIME;
         TIME_COUNTER             : RT_INTEGER := 0;
         OFFSET                   : RT_INTEGER;
         OFFUE                    : RT_INTEGER;
         OFFUIE                   : RT_INTEGER;
         SUBSYS                   : RT_INTEGER;
         NTSK                     : RT_INTEGER;
         ERROR_NUMBER             : RT_INTEGER;
         SCHEDULER_OVERFLOW       : exception;
         SUBSYSTEM_READY_ERROR    : exception;
         EXIT_SCHEDULER           : exception;

begin                    -- START SCHEDULER -- accept STARTUP;
         NEXT_TIME := CLOCK + INITIAL_WAIT;
         loop
           begin
             CURRENT_TIME := CLOCK;
             if NEXT_TIME > CURRENT_TIME then
                 DELAY_INTERVAL := NEXT_TIME - CURRENT_TIME;
                 delay DELAY_INTERVAL;
                 NEXT_TIME := CURRENT_TIME + DELAY_INTERVAL
                                         + SCHEDULER_INTERVAL;
             else
                 raise SCHEDULER_OVERFLOW;
```

```
             end if;
             T := RT_FLOAT((SCHEDULER_INTERVAL*TIME_COUNTER));
%SRATE_SUBSYSTEM_READY_CHECK
           begin
             if  READY_FLAG  then
                 SUBSYS := RATE;
                 BUS_FLAG(SUBSYS) := 1 - BUS_FLAG(SUBSYS);
             else
                 ERROR_NUMBER := 1;
                 raise SUBSYSTEM_READY_ERROR;
             end if;
           exception
             when SUBSYSTEM_READY_ERROR =>
                 raise EXIT_SCHEDULER;
           end;
%MRATE_SUBSYSTEM_READY_CHECK NTSK := 1;
             while NTSK <= NTASKS loop
               begin
                 if START_TABLE(NTSK) = 0 then
                     if READY_FLAG(NTSK) then
                         SUBSYS := RATE(NTSK);
                         BUS_FLAG(SUBSYS) := 1 - BUS_FLAG(SUBSYS);
                     else
                         ERROR_NUMBER := NTSK;
                         raise SUBSYSTEM_READY_ERROR;
                     end if;
                 end if;
               exception
                 when SUBSYSTEM_READY_ERROR =>
                     START_TABLE(NTSK) := SCHEDULING_COUNT(NTSK) + 1;
               end;
               NTSK := NTSK + 1;
             end loop;
%PREPARE_OUTPUT_1

OFFSET     := BUS_FLAG( SUBSYSTEM_ID )*BUSIZE;
             BUS(JBASYE) := BUS( OFFSET+LOCEXT );
%PREPARE_OUTPUT_2 for J in 1..NUMOUT loop
                 OFFSET := BUS_FLAG( SUBSYSTEM_ID(J+OFFYE) )*BUSIZE;
                 BUS(J+JBASYE-1) := BUS( OFFSET+LOCEXT(J+OFFYE) );
             end loop;
%EXTERNAL_INPUT_OUTPUT EXTERNAL_INPUT ( BUS, JBASUE, NUMIN);
             EXTERNAL_OUTPUT(BUS, JBASYE, NUMOUT);
%MRATE_COPY_INPUTS_TO_HOLD_MEMORY for NTSK in 1..NTASKS loop
                 if START_TABLE(NTSK) = 0 then
                     SUBSYS := RATE(NTSK);
                     OFFUIE := LOCUIEXT(SUBSYS) - 1;
                     OFFUE  := PTRUEXT(SUBSYS) - 1;
                     for J in 1..NUMEXT(SUBSYS) loop
                         OFFSET := BUS_FLAG( SUBSYSTEM_ID(J+OFFUE) )*BUSIZE;
                         BUS(J+OFFUIE) := BUS( OFFSET+LOCEXT(J+OFFUE) );
                     end loop;
                 end if;
             end loop;
```

```
%SRATE_WAKEUP          READY_FLAG := FALSE;
                       SUBSYSTEM1.WAKEUP;
%MRATE_START_TABLE_DECREMENT
                       for NTSK in 1..NTASKS loop
                           if START_TABLE(NTSK) = 0 then
                              START_TABLE(NTSK) := SCHEDULING_COUNT(NTSK);
                           else
                              START_TABLE(NTSK) := START_TABLE(NTSK) - 1;
                           end if;
                       end loop;

%END_OF_SCHEDULER
                       TIME_COUNTER := (TIME_COUNTER + 1) mod NCYCLES;
                   end loop;
%SCHEDULER_EXCEPTIONS
               exception
                   when SCHEDULER_OVERFLOW =>
                        NEXT_TIME := NEXT_TIME + SCHEDULER_INTERVAL;
                   when IO_ERROR =>
                        raise EXIT_SCHEDULER;
                   when EXIT_CONDITION =>
                        raise EXIT_SCHEDULER;
               end;

end loop;

exception
                when EXIT_SCHEDULER =>
                   loop
                       select
                          accept QUIT;
                       or
                          terminate;
                       end select;
                   end loop;

end SCHEDULER;

%BEGINING_OF_MAIN_PROCEDURE
begin                                         -- MAIN --
%IMPLEMENTATION_SPECIFIC_INITIALIZE
       IMPLEMENTATION_SPECIFIC_INITIALIZE(NUMIN, NUMOUT, SCHEDULER_TICK);
       --------------------------------------- CREATE TASKS ---------------
%CREATE_SCHEDULER
       SCHEDULER_TASK := new SCHEDULER;
       --------------------------------------- Task parameter initialization --
%SCHEDULER_STARTUP_AND_QUIT
       SCHEDULER_TASK.STARTUP;
       SCHEDULER_TASK.QUIT;
       --------------------------------------- Stop Tasks -----------------
%IMPLEMENTATION_SPECIFIC_TERMINATE
       IMPLEMENTATION_SPECIFIC_TERMINATE(NUMOUT);
```

TABLE 12D

```
with GENALG;            use GENALG;
with GENPWL;            use GENPWL;
with GENDYN;            use GENDYN;
with GENTRG;            use GENTRG;
with GENUSR;            use GENUSR;
with GENGAIN;           use GENGAIN;
with GENFUN;            use GENFUN;
with GENTRN;            use GENTRN;
with GENLOG;            use GENLOG;
with GENSGN;            use GENSGN;
with GLOBALS;           use GLOBALS;
with RT_INTEGER_TEXT_IO;use RT_INTEGER_TEXT_IO;
with TEXT_IO;           use TEXT_IO;
package body BLKGEN is procedure BLOCK_GEN (MODE        : in   RT_INTEGER;
                     LOCL        : in   RT_INTEGER;
                     LBPTR       : in   RT_INTEGER;
                     IPARM       : in   INTG_ARRAY;
                     RPARM       : in   REAL_ARRAY;
                     LY          : in   RT_INTEGER;
                     LX          : in   RT_INTEGER;
                     LXDOT       : in   RT_INTEGER;
                     LU          : in   RT_INTEGER;
                     LI          : in   RT_INTEGER;
                     LR          : in   RT_INTEGER;
                     IB          : in   INTG_ARRAY;
                     BUS_STORAGE : in   RT_INTEGER_ARRAY(1..MAXBUS);
                     OFILE       : in   FILE_TYPE)          is NI, NO, NS         : RT_INTEGER;
BLOCK_TYPE, SUB_TYPE : RT_INTEGER;
ISS                : INTG_ARRAY(1..MAXBUS);

begin
  NI := SNI(LBPTR);
  NO := SNO(LBPTR);
  NS := SNS(LBPTR);

BLOCK_TYPE := SIPAR(LOCL);
  SUB_TYPE   := abs( SICON(LBPTR) );

case BLOCK_TYPE is
    when 1  => return;
    when 2  => GENERATE_ALG (LOCL, LBPTR, IPARM, RPARM, LY, LX,
                             LXDOT, LU, LI, LR, IB, OFILE);
    when 3  => GENERATE_PWL (LOCL, LBPTR, IPARM, RPARM, LY, LU, LI, LR,
                             IB, OFILE);
    when 4  => GENERATE_DYN (MODE, LOCL, LBPTR, IPARM,
                             RPARM, LY, LX, LXDOT, LU, LI, LR, IB,
                             BUS_STORAGE, OFILE);
    when 5  => GENERATE_TRG (LOCL, LBPTR, LY, LU, IB, OFILE);
    when 6  => GENERATE_USR (MODE, LOCL, LBPTR, LY, LX, LXDOT, LU, LI,
                             LR, OFILE);
    when 7  => GENERATE_GAIN (LOCL, LBPTR, IPARM, RPARM, LY, LU, LR,
                             OFILE);
    when 8  => GENERATE_FUN (LOCL, LBPTR, IPARM, RPARM, LY, LU, LI, LR,
                             IB, OFILE);
    when 9  => GENERATE_TRN (LOCL, LBPTR, IPARM, LY,
                             LU, LI, LR, IB, OFILE);
    when 10 => GENERATE_SGN (LOCL, LBPTR, IPARM, LY, LI, LR, IB, OFILE);
    when 11 => GENERATE_LOG (MODE, LOCL, LBPTR, IPARM, RPARM, LY,
                             LX, LXDOT, LU, LI, LR, IB, OFILE);
    when others => PUT(">>> BLOCK TYPE (");
                   PUT( BLOCK_TYPE, 3);
                   PUT(") NOT IMPLEMENTED <<<");
                   NEW_LINE;
                   return;
  end case;

end BLOCK_GEN;

end BLKGEN;
```

TABLE 12E

```
with GLOBALS;              use GLOBALS;
with CODGEN_TOOLS;         use CODGEN_TOOLS;
with EQNALG;               use EQNALG;
with RT_INTEGER_TEXT_IO;   use RT_INTEGER_TEXT_IO;
with RT_FLOAT_TEXT_IO;     use RT_FLOAT_TEXT_IO;
with TEXT_IO;              use TEXT_IO;

package body GENALG is procedure GENERATE_ALG      (LOCL       : in  RT_INTEGER;
                             LBPTR      : in  RT_INTEGER;
                             IPARM      : in  INTG_ARRAY;
                             RPARM      : in  REAL_ARRAY;
                             LY         : in  RT_INTEGER;
                             LX         : in  RT_INTEGER;
                             LXDOT      : in  RT_INTEGER;
                             LU         : in  RT_INTEGER;
                             LI         : in  RT_INTEGER;
                             LR         : in  RT_INTEGER;
                             IB         : in  INTG_ARRAY;
                             OFILE      : in  FILE_TYPE)    is NI, NO, NS                : RT_INTEGER;
BLOCK_TYPE, SUB_TYPE      : RT_INTEGER;
ISS                       : INTG_ARRAY(1..MAXBUS);

begin

NI := SNI(LBPTR);
NO := SNO(LBPTR);
NS := SNS(LBPTR);

SUB_TYPE    := abs( SICON(LBPTR) );

case SUB_TYPE is
     when 2      => goto SUMMING_JUNCTION;
     when 4      => goto ELEMENTWISE_PRODUCT;
     when others => PUT(">>> BLOCK / SUBTYPE ("); PUT( BLOCK_TYPE, 3); PUT("/"); PUT( SUB_TYPE, 3);
                    PUT(") NOT IMPLEMENTED <<<");
                    NEW_LINE;
                    return;
end case;

----------------------
<<SUMMING_JUNCTION>>  null;
----------------------
declare
   NB, K : RT_INTEGER;
begin
   PRINT_HEADER( OFILE, LOCL, " Summing Junction " );
   NB := NI/NO;
   K := 1;
   for J in 1..NB loop
       if RPARM(K+LR) = 1.0 then
          for I in 1..NO loop
              --Y(I+LY) := Y(I+LY) + U(K+LU);--
              if J = 1 then
                 PUT( OFILE, "    BUS(" );
                 PUT( OFILE, IB(I+LY), 4); PUT( OFILE, ") := BUS(" );
                 PUT( OFILE, IB(I+LY), 4); PUT( OFILE, ");" );
                 PUT( OFILE, IB(K+LU), 4); PUT( OFILE, ");" );
                 NEW_LINE( OFILE );
              else
                 PUT( OFILE, "    BUS(" );
                 PUT( OFILE, IB(I+LY), 4); PUT( OFILE, ") := BUS(" );
                 PUT( OFILE, IB(I+LY), 4); PUT( OFILE, ")+BUS(" );
                 PUT( OFILE, IB(K+LU), 4); PUT( OFILE, ");" );
                 PUT( OFILE, IB(K+LU), 4); PUT( OFILE, ");" );
                 NEW_LINE( OFILE );
              end if;
              K := K + 1;
          end loop;
       else
          for I in 1..NO loop
              --Y(I+LY) := Y(I+LY) - U(K+LU);--
              if J = 1 then
                 PUT( OFILE, "    BUS(" );
                 PUT( OFILE, IB(I+LY), 4); PUT( OFILE, "):=-BUS(" );
                 PUT( OFILE, IB(K+LU), 4); PUT( OFILE, ");" );
                 NEW_LINE( OFILE );
              else
                 PUT( OFILE, "    BUS(" );
                 PUT( OFILE, IB(I+LY), 4); PUT( OFILE, "):=BUS(" );
                 PUT( OFILE, IB(I+LY), 4); PUT( OFILE, ")-BUS(" );
                 PUT( OFILE, IB(K+LU), 4); PUT( OFILE, ");" );
                 NEW_LINE( OFILE );
              end if;
              K := K + 1;
          end loop;
       end if;
   end loop;
end;
return;

-------------------------
<<ELEMENTWISE_PRODUCT>>   null;
-------------------------
declare
   IU    : RT_INTEGER;
begin
   PRINT_HEADER( OFILE, LOCL, " Elementwise Product " );
   for I in 1..NO loop
       IU := I + LU;
       --Y(I+LY) := U(IU)*U(IU+NO);--
       PUT( OFILE, "    BUS(" );
       PUT( OFILE, IB(I+LY), 4); PUT( OFILE, ") := BUS(" );
       PUT( OFILE, IB(I+LY), 4); PUT( OFILE, ")*BUS(" );   PUT( OFILE, IB(I+LY), 4);
       PUT( OFILE, IB(IU), 4);                              PUT( OFILE, IB(IU), 4);
       PUT( OFILE, IB(IU+NO), 4);                           PUT( OFILE, IB(IU+NO), 4);
       NEW_LINE( OFILE );
   end loop;
end;
return;

end GENERATE_ALG;

end GENALG;
```

```
with GLOBALS;           use GLOBALS;
with CODGEN_TOOLS;      use CODGEN_TOOLS;
with STRING_TOOLS;      use STRING_TOOLS;
with CONVERSION;        use CONVERSION;
with RT_INTEGER_TEXT_IO; use RT_INTEGER_TEXT_IO;
with RT_FLOAT_TEXT_IO;  use RT_FLOAT_TEXT_IO;
with TEXT_IO;           use TEXT_IO;

package body GENDYN is procedure GENERATE_DYN (MODE     in   RT_INTEGER;
                        LCCL     in   RT_INTEGER;
                        LBPTR    in   RT_INTEGER;
                        IPARM    in   INTG_ARRAY;
                        RPARM    in   REAL_ARRAY;
                        LY       in   RT_INTEGER;
                        LX       in   RT_INTEGER;
                        LXDOT    in   RT_INTEGER;
                        LU       in   RT_INTEGER;
                        LI       in   RT_INTEGER;
                        LR       in   RT_INTEGER;
                        IB       in   INTG_ARRAY;
                        BUS_STORAGE : in INTG_ARRAY;
                        OFILE    in   FILE_TYPE)  is U     : INTG_ARRAY(1..(IB'LENGTH - LU));
Y     : INTG_ARRAY(1..(IB'LENGTH - LY));
XDOT  : INTG_ARRAY(1..(IB'LENGTH - LXDOT));
X     : INTG_ARRAY(1..(IB'LENGTH - LX));
RPAR  : REAL_ARRAY(1..(RPARM'LENGTH - LR));
O     : INTG_ARRAY(1..(IPARM'LENGTH - LI));
FILE_TYPE renames OFILE;
NI, NO, NS       : RT_INTEGER;
ISS              : INTG_ARRAY(1..BUS_STORAGE);
STATE, OUTPUT    : BOOLEAN;

begin

U    := IB((1+LU)..IB'LENGTH);
Y    := IB((1+LY)..IB'LENGTH);
XDOT := IB((1+LXDOT)..IB'LENGTH);
X    := IB((1+LX)..IB'LENGTH);
RPAR := RPARM((1+LR)..RPARM'LENGTH);
IPAR := IPARM((1+LI)..IPARM'LENGTH);

NI := SNI(LBPTR);
NO := SNO(LBPTR);
NS := SNS(LBPTR);

STATE  := MODE = 2;
OUTPUT := MODE = 1;

BLOCK_TYPE := SIPAR(LCCL);
SUB_TYPE   := abs( SICON(LBPTR) );

case SUB_TYPE is
  when 1      => goto STATE_SPACE;
  when 2      => goto NUM_DEN;
  when 3      => goto POLES_ZEROS;
  when 4      => goto DAMP_FREQ;
  when others => PUT(">>> BLOCK/ SUBTYPE ("); PUT( SUB_TYPE, 3);
                 PUT(" ") ; PUT( BLOCK_TYPE, 3); PUT("/"); PUT( SUB_TYPE, 3);
                 PUT(" NOT IMPLEMENTED <<<");
                 NEW_LINE;
                 return;
```

```
end case;

<<STATE_SPACE>>                    null;
    PRINT_HEADER(OFILE, LCCL, " State Space System ");
    goto RT_2;
<<NUM_DEN>>                        null;
    PRINT_HEADER(OFILE, LCCL, " Numerator/Denominator ");
    goto RT_2;
<<POLES_ZEROS>>                    null;
    PRINT_HEADER(OFILE, LCCL, " Pole-Zeros ");
    goto RT_2;
<<DAMP_FREQ>>                      null;

<<RT_2>>
declare
  NUMA, NUMB, NUMC, NUMD                                     : RT_INTEGER;
  LA, LB, LC, LD, LAMAX, LBMAX, LCMAX, LDMAX                 : RT_INTEGER;
  LAI, LAJ, LBI, LBJ, LCI, LCJ, LDI, LDJ                     : RT_INTEGER;
  NOS, NSS, I, J, K, L, IOLD, NTERMC                         : RT_INTEGER;
  I1, I2, N , BUS_INDEX                                      : RT_INTEGER;

FIRST       : BOOLEAN;
  CHAR_BUFF   : STRING_DESCRIPTOR( MAX_LENGTH =>512 );
  BLANK_LINE  : STRING(1..512) := (1..512=> ' ');
  VAL         : RT_FLOAT;
begin
  if STATE then
    if IPAR(1) /= 0 then
      I1 := 1;
    else
      I1 := 2;
    end if;
    if IPAR(2) /= 0 then
      I2 := 2;
    else
      I2 := 1;
    end if;
    N := NS;
  elsif OUTPUT then
    if IPAR(3) /= 0 then
      I1 := 1;
    else
      I1 := 3;
    end if;
    if IPAR(4) /= 0 then
      I2 := 4;
    else
      I2 := 3;
    end if;
    N := NO;
  end if;

for LL in 1..N loop
    CHAR_BUFF := CHAR_BUFF & "BUS(";
    if STATE then
      K := NS - 4;
    CHAR_BUFF := CHAR_BUFF & XDOT(LL) & ") := " ;
```

```
with CODGEN_TOOLS;              use CODGEN_TOOLS;
with GLOBALS;                   use GLOBALS;
with STRING_TOOLS;              use STRING_TOOLS;
with RT_INTEGER_TEXT_IO;        use RT_INTEGER_TEXT_IO;
with TEXT_IO;                   use TEXT_IO;

package body GENPWL is procedure GENERATE_PWL (LOCL       : in   RT_INTEGER;
                        LBPTR      : in   RT_INTEGER;
                        IPARM      : in   INTG_ARRAY;
                        RPARM      : in   REAL_ARRAY;
                        LY         : in   RT_INTEGER;
                        LU         : in   RT_INTEGER;
                        LI         : in   RT_INTEGER;
                        LR         : in   RT_INTEGER;
                        IB         : in   INTG_ARRAY;
                        OFILE      : in   FILE_TYPE)   is NI, NO, NS               : RT_INTEGER;
   BLOCK_TYPE, SUB_TYPE     : RT_INTEGER;
   ISS                      : INTG_ARRAY(1..IB'LENGTH);
   U                        : INTG_ARRAY(1..(IB'LENGTH - LU));
   Y                        : INTG_ARRAY(1..(IB'LENGTH - LY));
   IPAR                     : INTG_ARRAY(1..(IPARM'LENGTH - LI));
   RPAR                     : REAL_ARRAY(1..(RPARM'LENGTH - LR));
   O                        : FILE_TYPE renames OFILE;

begin
   U      := IB((1+LU)..IB'LENGTH);
   Y      := IB((1+LY)..IB'LENGTH);
   IPAR   := IPARM((1+LI)..IPARM'LENGTH);
   RPAR   := RPARM((1+LR)..RPARM'LENGTH);
   NI     := SNI(LBPTR);
   NO     := SNO(LBPTR);
   NS     := SNS(LBPTR);

BLOCK_TYPE := SIPAR(LOCL);
   SUB_TYPE   := abs( SICON(LBPTR) );

case SUB_TYPE is
      when 2      => goto DEAD_BAND;
      when 3      => goto ABSOLUTE_SATURATION;
      when 4      => goto BOUNDED_LIMITER;
      when 5      => goto ABSOLUTE_VALUE;
      when others => PUT(">>> BLOCK / SUBTYPE ("); PUT( SUB_TYPE, 3);
                     NB := IPARM(1+LI);
                     PUT(") BLOCK_TYPE, 3); PUT("/");
                     PUT(") NOT IMPLEMENTED <<<");
                     NEW_LINE;
                     return;
   end case;

--------
<<DEAD_BAND>>         null;
--------
   declare
      NDX, NB : RT_INTEGER;
   begin
      PRINT_HEADER(OFILE, LOCL, "  Dead Band  ");
      NB  := IPARM(1+LI);
      NDX := 3;
      for I in 1..NO loop
         -- if abs( U(1+LU) ) >= RPARM(NDX+LR) then
         --    if U(1+LU) > 0.0 then
         --       Y(I+LY) := U(I+LU) - abs( RPARM(NDX+LR) );
         --    else
```

```
      elsif OUTPUT then
         K := NS - 4 - ( IPAR(1) + IPAR(2) );
         L :=           ( IPAR(1) + IPAR(2) ) * 2;
         CHAR_BUFF := CHAR_BUFF & " " & Y(LL) & " " ;
      end if;
      FIRST := TRUE;
      for I in I1..I2 loop
         for INDEX in L+1..L+IPAR(I) loop
            if IPAR(INDEX) = LL then
               VAL := RPAR(INDEX+K);
               if not FIRST then
                  if VAL >= 0.0 then
                     CHAR_BUFF := CHAR_BUFF & " + ";
                  else
                     CHAR_BUFF := CHAR_BUFF & " - ";
                     VAL := - VAL;
                  end if;
               else
                  if VAL < 0.0 then
                     CHAR_BUFF := CHAR_BUFF & " - ";
                     VAL := - VAL;
                  end if;
                  FIRST := FALSE;
               end if;
               J := IPAR(INDEX+IPAR(I));
               if I = I1 then
                  BUS_INDEX := IB(LX+J);
               else
                  BUS_INDEX := IB(LU+J);
               end if;
               CHAR_BUFF := CHAR_BUFF & VAL & "*BUS(" & BUS_INDEX
                                              & ")";
            end if;
         end loop;
         K := K + IPAR(I);
         L := L + IPAR(I)*2;
      end loop;
      CHAR_BUFF := CHAR_BUFF & ";";
      WRITE_LINE(O, CHAR_BUFF.NAME, CHAR_BUFF.LENGTH );
      CHAR_BUFF.NAME   := BLANK_LINE;
      CHAR_BUFF.LENGTH := 0;
   end loop;
end;
return;
end GENERATE_DYN;

end GENDYN;
```

```
                Y(I+LY) := U(I+LU) + abs( RPARM(NDX+LR) );--
              end if;
           --else Y(I+LY) := 0.0;
           --end if;
           PUT( OFILE, "                if abs(BUS("  ); PUT( OFILE, IB(I+LU), 4);
           PUT( OFILE, ")  >= R_P("                    ); PUT( OFILE, NDX+LR, 4);
           PUT( OFILE, ") then"                         );
           NEW_LINE( OFILE );
           PUT( OFILE, "                   if BUS("    ); PUT( OFILE, IB(I+LU), 4);
           PUT( OFILE, ") > 0.0 then"                   );
           NEW_LINE( OFILE );
           PUT( OFILE, "                      BUS("    ); PUT( OFILE, IB(I+LY), 4);
           PUT( OFILE, ") := BUS("                      ); PUT( OFILE, IB(I+LU), 4);
           PUT( OFILE, ") + abs(R_P("                   ); PUT( OFILE, NDX+LR, 4);
           PUT( OFILE, "));"                            );
           NEW_LINE( OFILE );
           PUT( OFILE, "                   else"        );
           NEW_LINE( OFILE );
           PUT( OFILE, "                      BUS("    ); PUT( OFILE, IB(I+LY), 4);
           PUT( OFILE, ") := BUS("                      ); PUT( OFILE, IB(I+LU), 4);
           PUT( OFILE, ") + abs(R_P("                   ); PUT( OFILE, NDX+LR, 4);
           PUT( OFILE, "));"                            );
           NEW_LINE( OFILE );
           PUT( OFILE, "                   end if;"    );
           NEW_LINE( OFILE );
           PUT( OFILE, "                else"           );
           NEW_LINE( OFILE );
           PUT( OFILE, "                   BUS("        ); PUT( OFILE, IB(I+LY), 4);
           PUT( OFILE, ") := 0.0;"                      );
           NEW_LINE( OFILE );
           PUT( OFILE, "                end if;"        );
           NDX := NDX + NB;
        end loop;
     end;
     return;

<<ABSOLUTE_SATURATION>> null;
------------------------------------------
     PRINT_HEADER(OFILE, LOCL, " Absolute Saturation Limit ");
     goto RT_1;
<<BOUNDED_LIMITER>> null;
------------------------------------------
     PRINT_HEADER(OFILE, LOCL, " Bounded Limiter ");
<<RT_1>>
     declare
        NDX, NB : RT_INTEGER;
     begin
        NB   := IPARM(1+LI);
        NDX  := 2 + LR;
        for I in 1..NO loop
        --if U(I+LU) >= 0.0 then
        --   if U(I+LU) < RPARM(NDX+1) then
        --      Y(I+LY) := U(I+LU);
        --   else
        --      Y(I+LY) := RPARM(NDX+1);
        --   end if;
        --else
        --   if U(I+LU) > RPARM(NDX) then
        --      Y(I+LY) := U(I+LU);
        --   else
        --      Y(I+LY) := RPARM(NDX);
        --   end if;
```

```
              --end if;
              PUT( OFILE, "                if BUS("    ); PUT( OFILE, IB(I+LU), 4);
              PUT( OFILE, ") >= 0.0 then"               );
              NEW_LINE( OFILE );
              PUT( OFILE, "                   if BUS(" ); PUT( OFILE, IB(I+LU), 4);
              PUT( OFILE, ") < R_P("                    ); PUT( OFILE, NDX+1, 4);
              PUT( OFILE, ") then"                      );
              NEW_LINE( OFILE );
              PUT( OFILE, "                      BUS(" ); PUT( OFILE, IB(I+LY), 4);
              PUT( OFILE, ") := BUS("                   ); PUT( OFILE, IB(I+LU), 4);
              PUT( OFILE, ");"                          );
              NEW_LINE( OFILE );
              PUT( OFILE, "                   else"     );
              NEW_LINE( OFILE );
              PUT( OFILE, "                      BUS(" ); PUT( OFILE, IB(I+LY), 4);
              PUT( OFILE, ") := R_P("                   ); PUT( OFILE, NDX+1, 4);
              PUT( OFILE, ");"                          );
              NEW_LINE( OFILE );
              PUT( OFILE, "                   end if;" );
              NEW_LINE( OFILE );
              PUT( OFILE, "                else"        );
              NEW_LINE( OFILE );
              PUT( OFILE, "                   if BUS(" ); PUT( OFILE, IB(I+LU), 4);
              PUT( OFILE, ") > R_P("                    ); PUT( OFILE, NDX, 4);
              PUT( OFILE, ") then"                      );
              NEW_LINE( OFILE );
              PUT( OFILE, "                      BUS(" ); PUT( OFILE, IB(I+LY), 4);
              PUT( OFILE, ") := BUS("                   ); PUT( OFILE, IB(I+LU), 4);
              PUT( OFILE, ");"                          );
              NEW_LINE( OFILE );
              PUT( OFILE, "                   else"     );
              NEW_LINE( OFILE );
              PUT( OFILE, "                      BUS(" ); PUT( OFILE, IB(I+LY), 4);
              PUT( OFILE, ") := R_P("                   ); PUT( OFILE, NDX, 4);
              PUT( OFILE, ");"                          );
              NEW_LINE( OFILE );
              PUT( OFILE, "                   end if;" );
              NEW_LINE( OFILE );
              PUT( OFILE, "                end if;"    );
              NEW_LINE( OFILE );
              NDX := NDX + NB;
           end loop;
        end;
        return;

<<ABSOLUTE_VALUE>>     null;
------------------------------------------
     begin
        PRINT_HEADER(OFILE, LOCL, " Absolute Value ");
        for I in 1..NO loop
        --Y(I+LY) := abs( U(I+LU) );
           PUT( OFILE, "                BUS("           ); PUT( OFILE, IB(I+LY), 4);
           PUT( OFILE, ") := abs(BUS("                  ); PUT( OFILE, IB(I+LU), 4);
           PUT( OFILE, "));"                            );
           NEW_LINE( OFILE );
        end loop;
        return;

end GENERATE_PWL;

end GENPWL;
```

```ada
with GLOBALS;        use GLOBALS;
with CODGEN_TOOLS;   use CODGEN_TOOLS;

package body GENGAIN is procedure GENERATE_GAIN (LOCL   : in   RT_INTEGER;
                         LBPTR  : in   RT_INTEGER;
                         RPARM  : in   REAL_ARRAY;
                         LY     : in   RT_INTEGER;
                         LU     : in   RT_INTEGER;
                         LR     : in   RT_INTEGER;
                         IB     : in   INTG_ARRAY;
                         OFILE  : in   FILE_TYPE) is

NO  : INTEGER;

begin
   NO := SNO(LBPTR);
   for I in 1..NO loop
      --Y(I+LY) := RPARM(I+LR)*U(I+LU);
      PRINT_HEADER (OFILE, LOCL, " Gain Block  ");
      WRITE (OFILE, " BUS(", IB(I+LY), ") := R_P(", I+LR,
                    ") * BUS(", IB(I+LU), ");");
   end loop;

end GENERATE_GAIN;

end GENGAIN;
```

TABLE 13

CATALOG AND LINK TIME DATA STRUCTURES FOR EXAMPLE IN FIGURE 2

```
=================================================================
|                         CATALOG DUMP                          |
=================================================================
== <0> =====|  INTERNALS OF SUPER_BLOCK ==> CONTRL <==========

SB-HEADER : Vers  Head  Visib  Attr  #E.In  #E.Out  On/Off
I0  =   1:     0    7     0     1     3      1       0
R0  =   1:
C0  =   1:    CONTRL||

SB-SECTION-OFFSETS
IOS=    8:     22   24    25    26   156    (Integer)
                0    0     0     2     5    (Real)
                8    8     8     8    37    (Character)

SB-CONNECTION-SECTION
I1  =  23:      4    1

SB-DIAGRAM-SECTION
I2  =  25:      0

SB-RUN-TIME-SECTION
I3  =  26:      0
R3  =   1:     5.00000E-02   0.00000E+00

SB-BLOCK-OFFSETS
I4  =  27:     12   39    64   102    (Integer)
R4  =   3:      0    0     0     2    (Real)
C4  =   9:      0    6    14    22    (Character)

-----------------------------------------------------------------
-- <1> -----|  INTERNALS OF BASIC_BLOCK --> ROLL <-------------

BLOCK-HEADER : Vers  Head  Type  Sub_T  #Inps  #Outs  #States
I0  =  39:     0    7     1     1      2      1       0
R0  =   3:
C0  =   9:    ROLL||

B-SECTION-OFFSETS
IOS=   46:     19   23    25    27    (Integer)
                0    0     0     0    (Real)
                6    6     6     6    (Character)

B-CONNECTION-SECTION
I1  =  58:      0    0     1     2

B-DIAGRAM-SECTION
I2  =  62:      0    1

B-RUN-TIME-SECTION
I3  =  64:      0    0

-----------------------------------------------------------------
-- <2> -----|  INTERNALS OF BASIC_BLOCK --> R-RATE <----------

BLOCK-HEADER : Vers  Head  Type  Sub_T  #Inps  #Outs  #States
I0  =  66:     0    7     1     1      1      1       0
R0  =   3:
```

```
C0 =   15:         R-RATE||

B-SECTION-OFFSETS
I0S=   73:         19      21      23      25      (Integer)
                    0       0       0       0      (Real)
                    8       8       8       8      (Character)

B-CONNECTION-SECTION
I1 =   85:          0       3

B-DIAGRAM-SECTION
I2 =   87:          0       2

B-RUN-TIME-SECTION
I3 =   89:          0       0

-----------------------------------------------------------------
-- <3> -----| INTERNALS OF BASIC_BLOCK --> SUMMER <----------

BLOCK-HEADER : Vers   Head   Type   Sub_T   #Inps   #Outs   #States
I0 =   91:      0      7      2       2       2       1       0
R0 =    3:
C0 =   23:         SUMMER||

B-SECTION-OFFSETS
I0S=   98:         19      23      25      27      (Integer)
                    0       0       0       0      (Real)
                    8       8       8       8      (Character)

B-CONNECTION-SECTION
I1 =  110:          1       2       1       1

B-DIAGRAM-SECTION
I2 =  114:          1       3

B-RUN-TIME-SECTION
I3 =  116:          0       0

B-PARAMETER-OFFSETS
I4 =  118:          3      (Integer)
R4 =    3:          0      (Real)
C4 =   31:          0      (Character)

PARAMETER-1
I5 =  121:          0       0       0       2       1       1       1       2
R5 =    3:       1.00000E+00   -1.00000E+00

-----------------------------------------------------------------
-- <4> -----| INTERNALS OF BASIC_BLOCK --> GAIN1 <----------

BLOCK-HEADER : Vers   Head   Type   Sub_T   #Inps   #Outs   #States
I0 =  129:      0      7      7       1       1       1       0
R0 =    5:
C0 =   31:         GAIN1||

B-SECTION-OFFSETS
I0S=  136:         19      21      23      25      (Integer)
                    0       0       0       0      (Real)
                    7       7       7       7      (Character)

B-CONNECTION-SECTION
I1 =  148:          3       1
```

```
B-DIAGRAM-SECTION
I2 = 150:        0      4

B-RUN-TIME-SECTION
I3 = 152:        0      0

B-PARAMETER-OFFSETS
I4 = 154:        3      (Integer)
R4 =   5:        0      (Real)
C4 =  38:        0      (Character)

PARAMETER-1
R5 =   5:        2.50000E+00
```

======================================================================
== <0> =====|  INTERNALS OF SUPER_BLOCK ==> ROLL <=============

```
SB-HEADER : Vers  Head  Visib  Attr  #E.In  #E.Out  On/Off
I0 = 157:    0     7      0     1      2      1       0
R0 =   6:
C0 =  38:    ROLL||

SB-SECTION-OFFSETS
IOS= 164:       22     24     25     26    145     (Integer)
                 0      0      0      2     16     (Real)
                 6      6      6      6     26     (Character)

SB-CONNECTION-SECTION
I1 = 179:        3      1

SB-DIAGRAM-SECTION
I2 = 181:        0

SB-RUN-TIME-SECTION
I3 = 182:        0
R3 =   6:        5.00000E-02    0.00000E+00
SB-BLOCK-OFFSETS
I4 = 183:        9     49     87    (Integer)
R4 =   8:        0      4      6    (Real)
C4 =  44:        0      8     13    (Character)
```

----------------------------------------------------------------------
-- <1> -----|  INTERNALS OF BASIC_BLOCK --> FILTER <----------

```
BLOCK-HEADER : Vers  Head  Type  Sub_T  #Inps  #Outs  #States
I0 = 192:       0     7     4     2      1      1      1
R0 =   8:
C0 =  44:       FILTER||

B-SECTION-OFFSETS
IOS= 199:      19     21     23     27    (Integer)
                0      0      0      1    (Real)
                8      8      8      8    (Character)

B-CONNECTION-SECTION
I1 = 211:        0      2

B-DIAGRAM-SECTION
I2 = 213:        0      1

B-RUN-TIME-SECTION
I3 = 215:        0      1      0      1
```

```
R3 =    8:          0.00000E+00

B-PARAMETER-OFFSETS
I4 = 219:       3       (Integer)
R4 =   9:       0       (Real)
C4 =  52:       0       (Character)

PARAMETER-1
I5 = 222:       1   1   1   0   1   1   1   1   1   1
R5 =   9:       8.18700E-01   1.00000E+00   1.81000E-01
```

---

-- <2> -----| INTERNALS OF BASIC_BLOCK --> SUM <--------------

```
BLOCK-HEADER : Vers  Head  Type  Sub_T  #Inps  #Outs  #States
I0 = 232:       0     7     2     2      2      1      0
R0 =  12:
C0 =  52:       SUM| |

B-SECTION-OFFSETS
I0S= 239:      19    23    25    27    (Integer)
                0     0     0     0    (Real)
                5     5     5     5    (Character)

B-CONNECTION-SECTION
I1 = 251:       1     0     1     1
B-DIAGRAM-SECTION
I2 = 255:       1     2

B-RUN-TIME-SECTION
I3 = 257:       0     0

B-PARAMETER-OFFSETS
I4 = 259:       3       (Integer)
R4 =  12:       0       (Real)
C4 =  57:       0       (Character)

PARAMETER-1
I5 = 262:       0   0   0   2   1   1   1   2
R5 =  12:      -1.00000E+00   1.00000E+00
```

---

-- <3> -----| INTERNALS OF BASIC_BLOCK --> DBAND <------------

```
BLOCK-HEADER : Vers  Head  Type  Sub_T  #Inps  #Outs  #States
I0 = 270:       0     7     3     2      1      1      0
R0 =  14:
C0 =  57:       DBAND| |

B-SECTION-OFFSETS
I0S= 277:      19    21    23    25    (Integer)
                0     0     0     0    (Real)
                7     7     7     7    (Character)

B-CONNECTION-SECTION
I1 = 289:       2     1

B-DIAGRAM-SECTION
I2 = 291:       0     3

B-RUN-TIME-SECTION
I3 = 293:       0     0
```

```
B-PARAMETER-OFFSETS
I4 =  295:         3       (Integer)
R4 =   14:         0       (Real)
C4 =   64:         0       (Character)

PARAMETER-1
I5 =  298:         4      1       4       1
R5 =   14:        -1.00500E+00   -5.00000E-03    5.00000E-03
                   1.00500E+00   -1.00000E+00    0.00000E+00
                   0.00000E+00    1.00000E+00
```

================================================================
== <0> =====| INTERNALS OF SUPER_BLOCK ==> R-RATE <==========

```
SB-HEADER : Vers  Head  Visib Attr  #E.In  #E.Out  On/Off
I0 =  302:    0     7     0     1      1      1       0
R0 =   22:
C0 =   64:    R-RATE||

SB-SECTION-OFFSETS
IOS=  309:    22    24    25    26   200    (Integer)
               0     0     0     2    21    (Real)
               8     8     8     8    43    (Character)

SB-CONNECTION-SECTION
I1 =  324:     5     1

SB-DIAGRAM-SECTION
I2 =  326:     0

SB-RUN-TIME-SECTION
I3 =  327:     0
R3 =   22:     2.50000E-02   0.00000E+00

SB-BLOCK-OFFSETS
I4 =  328:    15    55    87   119   146    (Integer)
R4 =   24:     0     4    10    18    18    (Real)
C4 =   72:     0     8    16    23    29    (Character)
```

----------------------------------------------------------------
-- <1> -----| INTERNALS OF BASIC_BLOCK --> FILTER <----------

```
BLOCK-HEADER : Vers  Head  Type  Sub_T  #Inps  #Outs  #States
I0 =  343:      0     7     4      2      1      1      1
R0 =   24:
C0 =   72:      FILTER||

B-SECTION-OFFSETS
IOS=  350:     19    21    23    27    (Integer)
                0     0     0     1    (Real)
                8     8     8     8    (Character)

B-CONNECTION-SECTION
I1 =  362:      0     1

B-DIAGRAM-SECTION
I2 =  364:      0     1

B-RUN-TIME-SECTION
I3 =  366:      0     1     0     1
R3 =   24:      0.00000E+00
```

```
B-PARAMETER-OFFSETS
I4 =  370:        3        (Integer)
R4 =   25:        0        (Real)
C4 =   80:        0        (Character)

PARAMETER-1
I5 =  373:        1   1   1   0   1   1   1   1   1   1
R5 =   25:        9.04800E-01    1.00000E+00    9.50000E-03
```

---
-- <2> -----| INTERNALS OF BASIC_BLOCK --> ABSVAL <----------

```
BLOCK-HEADER : Vers  Head  Type  Sub_T  #Inps  #Outs  #States
I0 =  383:      0     7     3     5      1      1      0
R0 =   28:
C0 =   80:     ABSVAL||

B-SECTION-OFFSETS
I0S=  390:      19    21    23    25   (Integer)
                0     0     0     0    (Real)
                8     8     8     8    (Character)

B-CONNECTION-SECTION
I1 =  402:       1     1

B-DIAGRAM-SECTION
I2 =  404:       0     2

B-RUN-TIME-SECTION
I3 =  406:       0     0

B-PARAMETER-OFFSETS
I4 =  408:       3        (Integer)
R4 =   28:       0        (Real)
C4 =   88:       0        (Character)

PARAMETER-1
I5 =  411:       3    1    3    1
R5 =   28:      -1.00000E+00    0.00000E+00    1.00000E+00
                 1.00000E+00    0.00000E+00    1.00000E+00
```

---
-- <3> -----| INTERNALS OF BASIC_BLOCK --> LIMIT <----------

```
BLOCK-HEADER : Vers  Head  Type  Sub_T  #Inps  #Outs  #States
I0 =  415:      0     7     3     3      1      1      0
R0 =   34:
C0 =   88:     LIMIT||

B-SECTION-OFFSETS
I0S=  422:      19    21    23    25   (Integer)
                0     0     0     0    (Real)
                7     7     7     7    (Character)
B-CONNECTION-SECTION
I1 =  434:       2     1

B-DIAGRAM-SECTION
I2 =  436:       0     3

B-RUN-TIME-SECTION
I3 =  438:       0     0
```

```
B-PARAMETER-OFFSETS
I4 =  440:         3      (Integer)
R4 =   34:         0      (Real)
C4 =   95:         0      (Character)

PARAMETER-1
I5 =  443:         4      1       4       1
R5 =   34:       -2.00000E+00  -1.00000E+00   1.00000E+00
                  2.00000E+00  -1.00000E+00  -1.00000E+00
                  1.00000E+00   1.00000E+00

------------------------------------------------------------
-- <4> -----| INTERNALS OF BASIC_BLOCK --> PROD <-----------

BLOCK-HEADER : Vers  Head  Type  Sub_T  #Inps  #Outs  #States
I0 =  447:      0     7     2     4       2      1      0
R0 =   42:
C0 =   95:    PROD||

B-SECTION-OFFSETS
I0S=  454:        19     23     25     27    (Integer)
                   0      0      0      0    (Real)
                   6      6      6      6    (Character)

B-CONNECTION-SECTION
I1 =  466:         3      1      1      1

B-DIAGRAM-SECTION
I2 =  470:         1      4

B-RUN-TIME-SECTION
I3 =  472:         0      0

------------------------------------------------------------
-- <5> -----| INTERNALS OF BASIC_BLOCK --> GAIN <-----------

BLOCK-HEADER : Vers  Head  Type  Sub_T  #Inps  #Outs  #States
I0 =  474:      0     7    -7     1       1      1      0
R0 =   42:
C0 =  101:    GAIN||

B-SECTION-OFFSETS
I0S=  481:        19     21     23     25    (Integer)
                   0      0      0      0    (Real)
                   6      6      6      6    (Character)
B-CONNECTION-SECTION
I1 =  493:         4      1

B-DIAGRAM-SECTION
I2 =  495:         0      5

B-RUN-TIME-SECTION
I3 =  497:         0      0

B-PARAMETER-OFFSETS
I4 =  499:         3      (Integer)
R4 =   42:         0      (Real)
C4 =  107:         0      (Character)

PARAMETER-1
R5 =   42:       2.50000E+02
```

| LINK DATA STRUCTURE DUMP |
|===|

```
Iaddr = 502 :      #Data Sections = 8
Iaddr = 503 :      Data Section Directory
                   Address  #Rows  #Cols
      ----------- |-----------------------
     (1) SBRM     |   524      7      3
     (2) SBIM     |   545     18      1
     (3) URIT     |   563     19      3
     (4) LINK_PTR |   620     25      1
     (5) LINK     |   645    183      1
     (6) OBIV_Y   |   828     10      1
     (7) OBIV_X   |   838      2      1
     (8) SEIO     |   840     10      1
```

---

Iaddr = 524 : (SBRM) Super-Block Reference Map

|               |   | CONTRL | ROLL | R-RATE |
|---------------|---|--------|------|--------|
| Rate_ID       | 1 | 2      | 2    | 3      |
| Level         | 2 | 1      | 2    | 2      |
| Block #       | 3 | 0      | 1    | 2      |
| I ptr         | 4 | 1      | 157  | 302    |
| R ptr         | 5 | 1      | 6    | 22     |
| C ptr         | 6 | 1      | 38   | 64     |
| SBIM_Offset   | 7 | 0      | 6    | 11     |

---

Iaddr = 545 : (SBIM) Super-Block Index Map

| SBIM_Offset |    | CONTRL | ROLL | R-RATE |
|-------------|----|--------|------|--------|
|             |    | 0      | 6    | 11     |
| Ext.Out     | +1 | 25     | 8    | 20     |
| Ext.In      | +2 | 0      | 1    | 9      |
| Block 1     | +3 | 8      | 3    | 11     |
| Block 2     | +4 | 20     | 5    | 13     |
| Block 3     | +5 | 22     | 7    | 15     |
| Block 4     | +6 | 24     | -    | 17     |
| Block 5     | +7 | -      | -    | 19     |

---

Iaddr = 563 : (URIT) Unique Rate Information Table

|                      | Rate_ID => | 1 | 2 | 3 |
|----------------------|------------|---|---|---|
| Rstack_Samp_Ptr      | 1          | 0 | 1 | 22 |
| OBIV_Y_Start_Index   | 2          | 1 | 1 | 6 |
| OBIV_Y_#_Blocks      | 3          | 0 | 5 | 5 |
| sBus_X_Base_Address  | 4          | 1 | 1 | 7 |
| sBus_X_#_Signals     | 5          | 0 | 1 | 1 |
| sBus_Y_Base_Address  | 6          | 1 | 2 | 8 |
| sBus_Y_#_Signals     | 7          | 0 | 5 | 5 |
| OBIV_Y_#_Imp_Blocks  | 8          | 0 | 0 | 0 |
| sBus_Y_#_Imp_Signals | 9          | 0 | 0 | 0 |
| OBIV_Y_#_Alg_Blocks  | 10         | 0 | 4 | 4 |
| sBus_Y_#_Alg_Signals | 11         | 0 | 4 | 4 |
| OBIV_X_Start_Index   | 12         | 1 | 1 | 2 |
| OBIV_X_#_Blocks      | 13         | 0 | 1 | 1 |

```
                      OBIV_X_#_Imp_Blocks      14 |    0        0        0
                      sBUS_X_#_Imp_Signals     15 |    0        0        0
                      D/A_Affects_Continuous   16 |    1        0        0
                      Subsys_Ext_IO_Info_Addr  17 |    1        1        8
                      Subsys_#_Ext.In          18 |    0        3        1
                      Subsys_#_Ext.Out         19 |    0        1        1

---------------------------------------------------------------------------
Iaddr = 620 : (LINK_PTR) Block and Connection Link Pointers 1      8     13     23     30     40     45     55     60     65
        70     80     85     95    100    110    117    127    132    142
       147    154    164    169    179

---------------------------------------------------------------------------
Iaddr = 645 : (LINK) Block and Connection Link Data Link types <= 0    | Bus_Addr_List           Rate_ID_List
              Link types => 1    | Iptr Rptr Uptr Xptr    Yptr Rate Hptr
      PTR:  Type  SB.ndx  Block# |
      ---------------------------+----------------------------------------
        1:   -1      1      1    |   1    2    0    0
        8:   -1      2      1    |   2    0
       13:    4      2      1    | 222    9   11    1     1    2   192
       23:   -1      2      2    |   1    1    2    0
       30:    2      2      2    | 262   12   26    2     2    2   232
       40:   -1      2      3    |   2    2
       45:    3      2      3    | 298   14   43    2     3    2   270
       55:    0      2      0    |   3    2
       60:   -1      1      2    |   3    0
       65:   -1      3      1    |   3    0
       70:    4      3      1    | 373   25   68    1     1    3   343
       80:   -1      3      2    |   1    3
       85:    3      3      2    | 411   28   83    2     2    3   383
       95:   -1      3      3    |   2    3
      100:    3      3      3    | 443   34   98    2     3    3   415
      110:   -1      3      4    |   3    1    3    3
      117:    2      3      4    | 474   42  113    2     4    3   447
      127:   -1      3      5    |   4    3
      132:    7      3      5    | 502   42  130    2     5    3   474
      142:    0      3      0    |   5    3
      147:   -1      1      3    |   3    5    2    3
      154:    2      1      3    | 121    3  150    2     4    2    91
      164:   -1      1      4    |   4    2
      169:    7      1      4    | 157    5  167    2     5    2   129
      179:    0      1      0    |   5    2

---------------------------------------------------------------------------
Iaddr = 828 : (OBIV_Y) Ordered Block Index Vector (Y-Blocks)

3      5      7     22     24        11     13     15     17     19
       +-----+----------------------+       +-----+----------------------+
       | Exp |       Alg_Out        |       | Exp |       Alg_Out        |
       +-----+----------------------+       +-----+----------------------+
       |<-------- Rate_ID=2 ------>|        |<-------- Rate_ID=3 ------>|

---------------------------------------------------------------------------
Iaddr = 838 : (OBIV_X) Ordered Block Index Vector (X-Blocks)

3     11
       +-----+-----+
       | R=2 | R=3 |
       +-----+-----+
```

```
Iaddr = 840 : (SEIO) Subsystem External IO Information

Addr:  | E.In_Bus_Addrs  | E.In_Rate_IDs  | E.Out_Bus_Addrs
    ------ |-----------------|----------------|------------------
       1:  |                 |                |
       1:  |   2    1    5   |    0    0    3 |    5
       8:  |   3             |    0           |    5
    -------+-----------------+----------------+------------------
```

What is claimed is:

1. An automatic computer software code generator for multirate real time control systems, comprising:
   (a) functional library means for defining a multiplicity of functional blocks, including means for defining for each functional block a software template for generating a set of software statements for performing one or more logical and/or mathematical computations each time the software associated with said functional block is executed, and parametric variables to be used in said computations;
   (b) catalog means coupled to said functional library means, for describing a specified multirate real time control system having specified external input signals and specified external output signals, including a first database for representing computational relationships between said external input signals and said external output signals of said specified multirate real time control system;
   said computational relationships being defined by specified combinations of said functional blocks, specified parametric values for said specified functional blocks, and specified computation initiation conditions; said computation initiation conditions including computational trigger conditions for asynchronous computations, and computational repetition rates and computational skew periods for periodic computations;
   (c) linking means coupled to said catalog means for organizing said first database into a plurality of separate subsystems, each said subsystem including all the specified functional blocks with a given specified computation initiation condition, a separate subsystem being used for each unique specified computation initiation condition; and
   (d) code generation means coupled to said catalog means for generating software for use in said specified control system, including means for generating:
   a subsystem software routine for each said subsystem for performing computations corresponding to said computational relationships specified in said first database for said subsystem;
   a scheduler program for initiating execution of said subsystem software routines in accordance with the specified computation initiation condition for each corresponding subsystem; and
   software interface means for holding input, output and temporary data values for said specified multirate real time control system, including zero order hold means for each said subsystem, for holding output values generated by said subsystem during each execution of said subsystem for use as input signals to other ones of said subsystems; and
   sample and hold means for each said subsystem, including a sample and hold buffer and sampling means,for copying into said sample and hold buffer specified input data signals to said subsystem from other ones of said subsystems and specified ones of said specified external input data signals.

2. An automatic computer software code generator as set forth in claim 1, wherein
   said zero order hold means includes for each subsystem,
   two equal size buffers, each for holding output signals and internal state values of said subsystem during any one execution of the corresponding subsystem software routine; and
   busflag means for storing a value indicating which of said two equal size buffers is to be used during each execution of said corresponding subsystem software routine; and
   said scheduler program includes
   busflag updating means for changing the value stored by said busflag means when execution of the corresponding subsystem software routine is initiated.

3. An automatic computer software code generator as set forth in claim 1, wherein
   said specified control system includes a digital central processing unit with a multitasking operating system that supports preemptive priority based execution of tasks; and
   each said subsystem software routine is defined as a separate task and is assigned a fixed priority in accordance with said specified computation initiation condition for the functional blocks in the corresponding subsystem, so that said subsystem software routines with the highest computational repetition rates are assigned the highest priorities.

4. An atuomatic computer software code generator as set forth in claim 3, wherein
   subsystem software routines for subsystems with computation initiation conditions having equal repetition rates are assigned priorities in accordance with said skew periods, so that said routines for subsystems with smaller skew periods are assigned higher priority than those with larger skew periods.

5. An automatic computer software code generator as set forth in claim 1, wherein
   said software interface includes
   an output buffer for storing signal values and means for storing said specified external output signals in said output buffer by copying into said output buffer signal values from specified locations in said zero order hold means for at least one of said subsystems; and an input buffer for receiving said specified external input signals; and said scheduler program includes means for periodically initiating execution of predefined external input and external output signal programs for depositing external input signals into said input buffer and for transmitting said signal values stored in said output buffer to a system being controlled by said specified multirate real time control system.

6. An automatic computer software code generator as set forth in claim 1, wherein said specified control system includes clock means for generating an interrupt signal at a specified periodic rate;

a digital central processing unit coupled to said clock means with an interrupt handling mechanism for interrupting, when said clock means generates each said interrupt signal, a task running in said central processing unit and then initiating execution of said scheduler program;

each said subsystem software routine is defined as a subroutine which can be called by said scheduler program;

each said subsystem software routine is assigned a priority in accordance with said computation initiation condition specified for the functional blocks in the corresponding subsystem; and said scheduler program includes timer means for determining, in accordance with said specified computation initiation condition for the functional blocks in each said subsystem, when each said subsystem software routine is scheduled to begin execution;

sampling control means for initiating the operation of said sampling means for each said subsystem when said subsystem software routine is scheduled to begin execution; and subsystem calling means for calling each software routine scheduled to begin execution after said sampling means has completed its operation, including means for calling said software routines in an order corresponding to said assigned priorities.

7. An automatic computer software code generator as set forth in claim 1, wherein said linking means includes OBIV (order Block Index Vector) means for generating a second database including for each said subsystem an OBIV vector for storing a list of all the functional blocks specified for said subsystem, computational order determining means for ordering said list of functional blocks stored in said OBIV vector so that, to the extent possible, the functional blocks whose computations generate intermediate values used in the computations of other functional blocks in the same subsystem are listed before said other functional blocks; and said code generation means generates each said subsystem software routine with the specified computations for said subsystem ordered in the same order as said list of corresponding functional blocks stored in said OBIV vector for said subsystem in said second database.

8. An automatic computer software code generator as set forth in claim 7, wherein said computational order determining means includes means for dividing said functional blocks in said OBIV vector for each said subsystem into three ordered lists, Imp_Dyn_List, Exp_Dyn_List and Alg_Out_List, in that order, wherein the blocks in said OBIV vector are allocated to said lists as follows:

first, selected blocks from said OBIV vector are sequentially added to the beginning of said Alg_Out_List, wherein each selected block is a block whose computations include no internal state variables and whose outputs affect, either directly or indirectly, only blocks in other subsystems and/or blocks previously selected for inclusion in said Alg_Out_List;

second, selected blocks from said OBIV vector are sequentially added to the end of said Exp_Dyn_List, by sequentially selecting from the blocks not already in Imp_Dyn_List, Exp_Dyn_List and Alg_Out_List, blocks whose computations produce outputs which can be generated using only the block's internal state variables and inputs which come either from other subsystems or blocks which have already been added to the Imp_Dyn_List or Exp_Dyn_List; and third, if said second selection step fails to allocate all the blocks not in Alg_Out_List to Exp_Dyn_List,
(a) a selected block from said OBIV vector is added to the end of said Imp_Dyn_List, by selecting from the blocks not already in Imp_Dyn_List, Exp_Dyn_List and Alg_Out_List, wherein
(1) said selected block is selected by selecting from among the blocks, if any, which if added to the Imp_Dyn_List would allow the addition of at least one other block to Exp_Dyn_List; and
(2) if the selection in (a)(1) results in a multiplicity of selected blocks which if added to the Imp_Dyn_List would allow the addition of at least one other block to the Exp_Dyn_List, the block selected is the block with the fewest output signals, and, if there are two of more blocks with said fewest number of output signals, the block with the most input signals; or
(3) if the selection in (a)(1) does not result in the selection of a block, said selected block is selected in accordance another predefined selection criteria; and
(b) then the selection of blocks for addition to Exp_Dyn_List resumes, and said selections continue until each of said blocks is included in one of said ordered lists.

* * * * *